US011676590B2

(12) United States Patent
Lambourne et al.

(10) Patent No.: US 11,676,590 B2
(45) Date of Patent: *Jun. 13, 2023

(54) HOME GRAPH

(71) Applicant: Sonos, Inc., Santa Barbara, CA (US)

(72) Inventors: Robert Lambourne, Santa Barbara, CA (US); Dayn Wilberding, Santa Barbara, CA (US); Jeffrey Torgerson, Seattle, WA (US)

(73) Assignee: Sonos, Inc., Santa Barbara, CA (US)

( * ) Notice: Subject to any disclaimer, the term of this patent is extended or adjusted under 35 U.S.C. 154(b) by 327 days.

This patent is subject to a terminal disclaimer.

(21) Appl. No.: 17/077,974

(22) Filed: Oct. 22, 2020

(65) Prior Publication Data

US 2021/0110826 A1    Apr. 15, 2021

Related U.S. Application Data

(63) Continuation of application No. 16/216,357, filed on Dec. 11, 2018, now Pat. No. 10,818,290.

(Continued)

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/167* (2013.01); *G10L 15/08* (2013.01); *H04R 3/005* (2013.01);
(Continued)

(58) Field of Classification Search
CPC .......... G10L 15/22; G10L 15/30; G10L 15/32
See application file for complete search history.

(56) References Cited

U.S. PATENT DOCUMENTS 4,741,038 A    4/1988    Elko et al.
4,941,187 A    7/1990    Slater
(Continued)

FOREIGN PATENT DOCUMENTS

AU    2017100486 A4    6/2017
AU    2017100581 A4    6/2017
(Continued)

OTHER PUBLICATIONS

US 9,299,346 B1, 03/2016, Hart et al. (withdrawn)
(Continued)

*Primary Examiner* — Daniel Abebe
(74) *Attorney, Agent, or Firm* — Fortem IP LLP; Benjamin Urban

(57) ABSTRACT

Example techniques involve a control hierarchy for a "smart" home having smart appliances and related devices, such as wireless illumination devices, home-automation devices (e.g., thermostats, door locks, etc.), and audio playback devices, among others. An example home includes various rooms in which smart devices might be located. Under the example control hierarchy described herein and referred to as "home graph," a name of a room (e.g., "Kitchen") may represent a smart device (or smart devices) within that room. In other words, from the perspective of a user, the smart devices within a room are that room. This hierarchy permits a user to refer to a smart device within a given room by way of the name of the room when controlling smart devices within the home using a voice user interface (VUI) or graphical user interface (GUI).

20 Claims, 31 Drawing Sheets

Related U.S. Application Data

(60) Provisional application No. 62/597,355, filed on Dec. 11, 2017.

(51) Int. Cl.

| | | |
|---|---|---|
| *H04R 3/12* | (2006.01) | |
| *H04R 5/04* | (2006.01) | |
| *G10L 15/08* | (2006.01) | |
| *H04R 3/00* | (2006.01) | |
| *G06F 3/16* | (2006.01) | |

(52) U.S. Cl.
CPC .................. *H04R 3/12* (2013.01); *H04R 5/04* (2013.01); *G10L 2015/088* (2013.01); *G10L 2015/223* (2013.01)

(56) References Cited

U.S. PATENT DOCUMENTS

| | | |
|---|---|---|
| 4,974,213 A | 11/1990 | Siwecki |
| 5,036,538 A | 7/1991 | Oken et al. |
| 5,440,644 A | 8/1995 | Farinelli et al. |
| 5,588,065 A | 12/1996 | Tanaka et al. |
| 5,740,260 A | 4/1998 | Odom |
| 5,761,320 A | 6/1998 | Farinelli et al. |
| 5,923,902 A | 7/1999 | Inagaki |
| 5,949,414 A | 9/1999 | Namikata et al. |
| 6,032,202 A | 2/2000 | Lea et al. |
| 6,088,459 A | 7/2000 | Hobelsberger |
| 6,256,554 B1 | 7/2001 | DiLorenzo |
| 6,301,603 B1 | 10/2001 | Maher et al. |
| 6,311,157 B1 | 10/2001 | Strong |
| 6,366,886 B1 | 4/2002 | Dragosh et al. |
| 6,404,811 B1 | 6/2002 | Cvetko et al. |
| 6,408,078 B1 | 6/2002 | Hobelsberger |
| 6,469,633 B1 | 10/2002 | Wachter et al. |
| 6,522,886 B1 | 2/2003 | Youngs et al. |
| 6,594,347 B1 | 7/2003 | Calder et al. |
| 6,594,630 B1 | 7/2003 | Zlokarnik et al. |
| 6,611,537 B1 | 8/2003 | Edens et al. |
| 6,611,604 B1 | 8/2003 | Irby et al. |
| 6,631,410 B1 | 10/2003 | Kowalski et al. |
| 6,757,517 B2 | 6/2004 | Chang |
| 6,778,869 B2 | 8/2004 | Champion |
| 6,937,977 B2 | 8/2005 | Gerson |
| 7,099,821 B2 | 8/2006 | Visser et al. |
| 7,103,542 B2 | 9/2006 | Doyle |
| 7,130,608 B2 | 10/2006 | Hollstrom et al. |
| 7,130,616 B2 | 10/2006 | Janik |
| 7,143,939 B2 | 12/2006 | Henzerling |
| 7,174,299 B2 | 2/2007 | Fujii et al. |
| 7,228,275 B1 | 6/2007 | Endo et al. |
| 7,236,773 B2 | 6/2007 | Thomas |
| 7,295,548 B2 | 11/2007 | Blank et al. |
| 7,356,471 B2 | 4/2008 | Ito et al. |
| 7,383,297 B1 | 6/2008 | Atsmon et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,577,757 B2 | 8/2009 | Carter et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,661,107 B1 | 2/2010 | Van et al. |
| 7,702,508 B2 | 4/2010 | Bennett |
| 7,792,311 B1 | 9/2010 | Holmgren et al. |
| 7,853,341 B2 | 12/2010 | McCarty et al. |
| 7,961,892 B2 | 6/2011 | Fedigan |
| 7,987,294 B2 | 7/2011 | Bryce et al. |
| 8,014,423 B2 | 9/2011 | Thaler et al. |
| 8,019,076 B1 | 9/2011 | Lambert |
| 8,032,383 B1 | 10/2011 | Bhardwaj et al. |
| 8,041,565 B1 | 10/2011 | Bhardwaj et al. |
| 8,045,952 B2 | 10/2011 | Qureshey et al. |
| 8,073,125 B2 | 12/2011 | Zhang et al. |
| 8,073,681 B2 | 12/2011 | Baldwin et al. |
| 8,103,009 B2 | 1/2012 | McCarty et al. |
| 8,136,040 B2 | 3/2012 | Fleming |
| 8,165,867 B1 | 4/2012 | Fish |
| 8,234,395 B2 | 7/2012 | Millington |
| 8,239,206 B1 | 8/2012 | Lebeau et al. |
| 8,255,224 B2 | 8/2012 | Singleton et al. |
| 8,284,982 B2 | 10/2012 | Bailey |
| 8,290,603 B1 | 10/2012 | Lambourne |
| 8,340,975 B1 | 12/2012 | Rosenberger |
| 8,364,481 B2 | 1/2013 | Strope et al. |
| 8,385,557 B2 | 2/2013 | Tashev et al. |
| 8,386,261 B2 | 2/2013 | Mellott et al. |
| 8,386,523 B2 | 2/2013 | Mody et al. |
| 8,423,893 B2 | 4/2013 | Ramsay et al. |
| 8,428,758 B2 | 4/2013 | Naik et al. |
| 8,453,058 B1 | 5/2013 | Coccaro et al. |
| 8,473,618 B2 | 6/2013 | Spear et al. |
| 8,483,853 B1 | 7/2013 | Lambourne |
| 8,484,025 B1 | 7/2013 | Moreno et al. |
| 8,588,849 B2 | 11/2013 | Patterson et al. |
| 8,600,443 B2 | 12/2013 | Kawaguchi et al. |
| 8,710,970 B2 | 4/2014 | Delrich et al. |
| 8,738,925 B1 | 5/2014 | Park et al. |
| 8,775,191 B1 | 7/2014 | Sharifi et al. |
| 8,831,761 B2 | 9/2014 | Kemp et al. |
| 8,831,957 B2 | 9/2014 | Taubman et al. |
| 8,848,879 B1 | 9/2014 | Coughlan et al. |
| 8,861,756 B2 | 10/2014 | Zhu |
| 8,874,448 B1 | 10/2014 | Kauffmann et al. |
| 8,938,394 B1 | 1/2015 | Faaborg et al. |
| 8,942,252 B2 | 1/2015 | Balassanian et al. |
| 8,983,383 B1 | 3/2015 | Haskin |
| 8,983,844 B1 | 3/2015 | Thomas et al. |
| 9,015,049 B2 | 4/2015 | Baldwin et al. |
| 9,042,556 B2 | 5/2015 | Kallai et al. |
| 9,060,224 B1 | 6/2015 | List |
| 9,094,539 B1 | 7/2015 | Noble |
| 9,098,467 B1 | 8/2015 | Blanksteen et al. |
| 9,124,650 B2 | 9/2015 | Maharajh et al. |
| 9,124,711 B2 | 9/2015 | Park et al. |
| 9,148,742 B1 | 9/2015 | Koulomzin et al. |
| 9,190,043 B2 | 11/2015 | Krisch et al. |
| 9,208,785 B2 | 12/2015 | Ben-David et al. |
| 9,215,545 B2 | 12/2015 | Dublin et al. |
| 9,245,527 B2 | 1/2016 | Lindahl |
| 9,251,793 B2 | 2/2016 | Lebeau et al. |
| 9,253,572 B2 | 2/2016 | Beddingfield, Sr. et al. |
| 9,262,612 B2 | 2/2016 | Cheyer |
| 9,263,042 B1 | 2/2016 | Sharifi |
| 9,275,637 B1 | 3/2016 | Salvador et al. |
| 9,288,597 B2 | 3/2016 | Carlsson et al. |
| 9,300,266 B2 | 3/2016 | Grokop |
| 9,304,736 B1 | 4/2016 | Whiteley et al. |
| 9,307,321 B1 | 4/2016 | Unruh |
| 9,318,107 B1 | 4/2016 | Sharifi |
| 9,319,816 B1 | 4/2016 | Narayanan |
| 9,324,322 B1 | 4/2016 | Torok et al. |
| 9,335,819 B1 | 5/2016 | Jaeger et al. |
| 9,361,878 B2 | 6/2016 | Boukadakis |
| 9,368,105 B1 | 6/2016 | Freed et al. |
| 9,373,329 B2 | 6/2016 | Strope et al. |
| 9,374,634 B2 | 6/2016 | Macours |
| 9,386,154 B2 | 7/2016 | Baciu et al. |
| 9,390,708 B1 | 7/2016 | Hoffmeister |
| 9,401,058 B2 | 7/2016 | De La Fuente et al. |
| 9,412,392 B2 | 8/2016 | Lindahl et al. |
| 9,426,567 B2 | 8/2016 | Lee et al. |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,484,030 B1 | 11/2016 | Meaney et al. |
| 9,489,948 B1 | 11/2016 | Chu et al. |
| 9,494,683 B1 | 11/2016 | Sadek |
| 9,509,269 B1 | 11/2016 | Rosenberg |
| 9,510,101 B1 | 11/2016 | Polleros |
| 9,514,476 B2 | 12/2016 | Kay et al. |
| 9,514,752 B2 | 12/2016 | Sharifi |

(56) References Cited

U.S. PATENT DOCUMENTS

| | | |
|---|---|---|
| 9,516,081 B2 | 12/2016 | Tebbs et al. |
| 9,536,541 B2 | 1/2017 | Chen et al. |
| 9,548,053 B1 | 1/2017 | Basye et al. |
| 9,548,066 B2 | 1/2017 | Jain et al. |
| 9,552,816 B2 | 1/2017 | Vanlund et al. |
| 9,554,210 B1 | 1/2017 | Ayrapetian et al. |
| 9,560,441 B1 | 1/2017 | McDonough, Jr. et al. |
| 9,576,591 B2 | 2/2017 | Kim et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 9,626,695 B2 | 4/2017 | Balasubramanian et al. |
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,661 B1 | 4/2017 | Typrin et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,648,564 B1 | 5/2017 | Cui et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,674,587 B2 | 6/2017 | Triplett et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,566 B2 | 8/2017 | Newendorp et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,736,578 B2 | 8/2017 | Iyengar et al. |
| 9,743,204 B1 | 8/2017 | Welch et al. |
| 9,743,207 B1 | 8/2017 | Hartung |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,749,760 B2 | 8/2017 | Lambourne |
| 9,754,605 B1 | 9/2017 | Chhetri |
| 9,762,967 B2 | 9/2017 | Clarke et al. |
| 9,769,420 B1 | 9/2017 | Moses |
| 9,779,725 B2 | 10/2017 | Sun et al. |
| 9,779,735 B2 | 10/2017 | Civelli et al. |
| 9,811,314 B2 | 11/2017 | Plagge et al. |
| 9,813,810 B1 | 11/2017 | Nongpiur |
| 9,813,812 B2 | 11/2017 | Berthelsen et al. |
| 9,818,407 B1 | 11/2017 | Secker-Walker et al. |
| 9,820,036 B1 | 11/2017 | Tritschler et al. |
| 9,820,039 B2 | 11/2017 | Lang |
| 9,826,306 B2 | 11/2017 | Lang |
| 9,865,259 B1 | 1/2018 | Typrin et al. |
| 9,865,264 B2 | 1/2018 | Gelfenbeyn |
| 9,881,616 B2 | 1/2018 | Beckley et al. |
| 9,900,723 B1 | 2/2018 | Choisel et al. |
| 9,916,839 B1 | 3/2018 | Scalise et al. |
| 9,947,316 B2 | 4/2018 | Millington et al. |
| 9,947,333 B1 | 4/2018 | David |
| 9,972,318 B1 | 5/2018 | Kelly et al. |
| 9,972,343 B1 | 5/2018 | Thorson et al. |
| 9,973,849 B1 | 5/2018 | Zhang et al. |
| 9,979,560 B2 | 5/2018 | Kim et al. |
| 10,013,381 B2 | 7/2018 | Mayman et al. |
| 10,013,995 B1 | 7/2018 | Lashkari et al. |
| 10,026,401 B1 | 7/2018 | Mutagi et al. |
| 10,048,930 B1 | 8/2018 | Vega et al. |
| 10,049,675 B2 | 8/2018 | Haughay |
| 10,051,366 B1 | 8/2018 | Buoni et al. |
| 10,051,600 B1 | 8/2018 | Zhong et al. |
| 10,057,698 B2 | 8/2018 | Drinkwater et al. |
| RE47,049 E | 9/2018 | Zhu et al. |
| 10,068,573 B1 | 9/2018 | Aykac et al. |
| 10,074,369 B2 | 9/2018 | Devaraj et al. |
| 10,074,371 B1 | 9/2018 | Wang et al. |
| 10,079,015 B1 * | 9/2018 | Lockhart ................ G10L 15/26 |
| 10,108,393 B2 | 10/2018 | Millington et al. |
| 10,115,400 B2 | 10/2018 | Wilberding |
| 10,116,748 B2 | 10/2018 | Farmer et al. |
| 10,127,911 B2 | 11/2018 | Kim et al. |
| 10,134,399 B2 | 11/2018 | Lang et al. |
| 10,136,204 B1 | 11/2018 | Poole et al. |
| 10,152,969 B2 | 12/2018 | Reilly et al. |
| 10,181,323 B2 | 1/2019 | Beckhardt et al. |
| 10,186,265 B1 | 1/2019 | Lockhart et al. |
| 10,192,546 B1 | 1/2019 | Piersol et al. |
| 10,224,056 B1 | 3/2019 | Torok et al. |
| 10,225,651 B2 | 3/2019 | Lang |
| 10,248,376 B2 | 4/2019 | Keyser-Allen et al. |
| 10,276,161 B2 | 4/2019 | Hughes et al. |
| 10,297,256 B2 | 5/2019 | Reilly et al. |
| 10,339,917 B2 | 7/2019 | Aleksic et al. |
| 10,346,122 B1 | 7/2019 | Morgan |
| 10,354,650 B2 | 7/2019 | Gruenstein et al. |
| 10,365,887 B1 | 7/2019 | Mulherkar |
| 10,365,889 B2 | 7/2019 | Plagge et al. |
| 10,366,688 B2 | 7/2019 | Gunn et al. |
| 10,366,699 B1 | 7/2019 | Dharia et al. |
| 10,374,816 B1 | 8/2019 | Leblang et al. |
| 10,381,001 B2 | 8/2019 | Gunn et al. |
| 10,381,002 B2 | 8/2019 | Gunn et al. |
| 10,381,003 B2 * | 8/2019 | Wakisaka ................ B25J 13/003 |
| 10,388,272 B1 | 8/2019 | Thomson et al. |
| 10,433,058 B1 | 10/2019 | Torgerson et al. |
| 10,445,057 B2 | 10/2019 | Vega et al. |
| 10,469,966 B2 | 11/2019 | Lambourne |
| 10,499,146 B2 | 12/2019 | Lang et al. |
| 10,510,340 B1 | 12/2019 | Fu et al. |
| 10,511,904 B2 | 12/2019 | Buoni et al. |
| 10,522,146 B1 | 12/2019 | Tushinskiy |
| 10,546,583 B2 | 1/2020 | White et al. |
| 10,573,321 B1 | 2/2020 | Smith et al. |
| 10,586,540 B1 | 3/2020 | Smith et al. |
| 10,599,287 B2 | 3/2020 | Kumar et al. |
| 10,602,268 B1 | 3/2020 | Soto |
| 10,614,807 B2 | 4/2020 | Beckhardt et al. |
| 10,622,009 B1 | 4/2020 | Zhang et al. |
| 10,624,612 B2 | 4/2020 | Sumi et al. |
| 10,645,130 B2 | 5/2020 | Corbin et al. |
| 10,672,383 B1 | 6/2020 | Thomson et al. |
| 10,679,625 B1 | 6/2020 | Lockhart et al. |
| 10,681,460 B2 | 6/2020 | Woo et al. |
| 10,694,608 B2 | 6/2020 | Baker et al. |
| 10,712,997 B2 | 7/2020 | Wilberding et al. |
| 10,740,065 B2 | 8/2020 | Jarvis et al. |
| 10,762,896 B1 | 9/2020 | Yavagal et al. |
| 10,847,143 B2 | 11/2020 | Millington et al. |
| 10,848,885 B2 | 11/2020 | Lambourne |
| RE48,371 E | 12/2020 | Zhu et al. |
| 10,878,811 B2 | 12/2020 | Smith et al. |
| 10,897,679 B2 | 1/2021 | Lambourne |
| 10,943,598 B2 | 3/2021 | Singh et al. |
| 10,971,158 B1 | 4/2021 | Patangay et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0046023 A1 | 4/2002 | Fujii et al. |
| 2002/0072816 A1 | 6/2002 | Shdema et al. |
| 2002/0116196 A1 | 8/2002 | Tran |
| 2002/0124097 A1 | 9/2002 | Isely et al. |
| 2003/0015354 A1 | 1/2003 | Edwards et al. |
| 2003/0038848 A1 | 2/2003 | Lee et al. |
| 2003/0040908 A1 | 2/2003 | Yang et al. |
| 2003/0070182 A1 | 4/2003 | Pierre et al. |

(56) References Cited

U.S. PATENT DOCUMENTS

| | | |
|---|---|---|
| 2003/0070869 A1 | 4/2003 | Hlibowicki |
| 2003/0072462 A1 | 4/2003 | Hlibowicki |
| 2003/0095672 A1 | 5/2003 | Hobelsberger |
| 2003/0130850 A1 | 7/2003 | Badt et al. |
| 2003/0157951 A1 | 8/2003 | Hasty |
| 2003/0235244 A1 | 12/2003 | Pessoa et al. |
| 2004/0024478 A1 | 2/2004 | Hans et al. |
| 2004/0093219 A1 | 5/2004 | Shin et al. |
| 2004/0105566 A1 | 6/2004 | Matsunaga et al. |
| 2004/0127241 A1 | 7/2004 | Shostak |
| 2004/0128135 A1 | 7/2004 | Anastasakos et al. |
| 2004/0234088 A1 | 11/2004 | McCarty et al. |
| 2005/0031131 A1 | 2/2005 | Browning et al. |
| 2005/0031132 A1 | 2/2005 | Browning et al. |
| 2005/0031133 A1 | 2/2005 | Browning et al. |
| 2005/0031134 A1 | 2/2005 | Leske |
| 2005/0031137 A1 | 2/2005 | Browning et al. |
| 2005/0031138 A1 | 2/2005 | Browning et al. |
| 2005/0031139 A1 | 2/2005 | Browning et al. |
| 2005/0031140 A1 | 2/2005 | Browning |
| 2005/0047606 A1 | 3/2005 | Lee et al. |
| 2005/0077843 A1 | 4/2005 | Benditt |
| 2005/0164664 A1 | 7/2005 | DiFonzo et al. |
| 2005/0195988 A1 | 9/2005 | Tashev et al. |
| 2005/0201254 A1 | 9/2005 | Looney et al. |
| 2005/0207584 A1 | 9/2005 | Bright |
| 2005/0235334 A1 | 10/2005 | Togashi et al. |
| 2005/0268234 A1 | 12/2005 | Rossi et al. |
| 2005/0283330 A1 | 12/2005 | Laraia et al. |
| 2005/0283475 A1 | 12/2005 | Beranek et al. |
| 2006/0004834 A1 | 1/2006 | Pyhalammi et al. |
| 2006/0023945 A1 | 2/2006 | King et al. |
| 2006/0041431 A1 | 2/2006 | Maes |
| 2006/0093128 A1 | 5/2006 | Oxford |
| 2006/0104451 A1 | 5/2006 | Browning et al. |
| 2006/0147058 A1 | 7/2006 | Wang |
| 2006/0190269 A1 | 8/2006 | Tessel et al. |
| 2006/0190968 A1 | 8/2006 | Jung et al. |
| 2006/0247913 A1 | 11/2006 | Huerta et al. |
| 2006/0262943 A1 | 11/2006 | Oxford |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0071206 A1 | 3/2007 | Gainsboro et al. |
| 2007/0071255 A1 | 3/2007 | Schobben |
| 2007/0076131 A1 | 4/2007 | Li et al. |
| 2007/0076906 A1 | 4/2007 | Takagi et al. |
| 2007/0140058 A1 | 6/2007 | McIntosh et al. |
| 2007/0140521 A1 | 6/2007 | Mitobe et al. |
| 2007/0142944 A1 | 6/2007 | Goldberg et al. |
| 2007/0147651 A1 | 6/2007 | Mitobe et al. |
| 2007/0201639 A1 | 8/2007 | Park et al. |
| 2007/0254604 A1 | 11/2007 | Kim |
| 2008/0037814 A1 | 2/2008 | Shau |
| 2008/0090537 A1 | 4/2008 | Sutardja |
| 2008/0090617 A1 | 4/2008 | Sutardja |
| 2008/0146289 A1 | 6/2008 | Korneluk et al. |
| 2008/0182518 A1 | 7/2008 | Lo |
| 2008/0207115 A1 | 8/2008 | Lee et al. |
| 2008/0208594 A1 | 8/2008 | Cross et al. |
| 2008/0221897 A1 | 9/2008 | Cerra et al. |
| 2008/0247530 A1 | 10/2008 | Barton et al. |
| 2008/0248797 A1 | 10/2008 | Freeman et al. |
| 2008/0291896 A1 | 11/2008 | Tuubel et al. |
| 2008/0301729 A1 | 12/2008 | Broos et al. |
| 2009/0003620 A1 | 1/2009 | McKillop et al. |
| 2009/0005893 A1 | 1/2009 | Sugii et al. |
| 2009/0010445 A1 | 1/2009 | Matsuo |
| 2009/0018828 A1 | 1/2009 | Nakadai et al. |
| 2009/0043206 A1 | 2/2009 | Towfiq et al. |
| 2009/0052688 A1 | 2/2009 | Ishibashi et al. |
| 2009/0076821 A1 | 3/2009 | Brenner et al. |
| 2009/0153289 A1 | 6/2009 | Hope et al. |
| 2009/0191854 A1 | 7/2009 | Beason |
| 2009/0197524 A1 | 8/2009 | Haff et al. |
| 2009/0220107 A1 | 9/2009 | Every et al. |
| 2009/0228919 A1 | 9/2009 | Zott et al. |
| 2009/0238377 A1 | 9/2009 | Ramakrishnan et al. |
| 2009/0238386 A1 | 9/2009 | Usher et al. |
| 2009/0248397 A1 | 10/2009 | Garcia et al. |
| 2009/0249222 A1 | 10/2009 | Schmidt et al. |
| 2009/0264072 A1 | 10/2009 | Dai |
| 2009/0323907 A1 | 12/2009 | Gupta et al. |
| 2009/0326949 A1 | 12/2009 | Douthitt et al. |
| 2010/0014690 A1 | 1/2010 | Wolff et al. |
| 2010/0023638 A1 | 1/2010 | Bowman |
| 2010/0035593 A1 | 2/2010 | Franco et al. |
| 2010/0070922 A1 | 3/2010 | DeMaio et al. |
| 2010/0075723 A1 | 3/2010 | Min et al. |
| 2010/0088100 A1 | 4/2010 | Lindahl |
| 2010/0092004 A1 | 4/2010 | Kuze |
| 2010/0161335 A1 | 6/2010 | Whynot |
| 2010/0172516 A1 | 7/2010 | Lastrucci |
| 2010/0178873 A1 | 7/2010 | Lee et al. |
| 2010/0179874 A1 | 7/2010 | Higgins et al. |
| 2010/0185448 A1 | 7/2010 | Meisel |
| 2010/0211199 A1 | 8/2010 | Naik et al. |
| 2011/0033059 A1 | 2/2011 | Bhaskar et al. |
| 2011/0035580 A1 | 2/2011 | Wang et al. |
| 2011/0044461 A1 | 2/2011 | Kuech et al. |
| 2011/0044489 A1 | 2/2011 | Saiki et al. |
| 2011/0066634 A1 | 3/2011 | Phillips et al. |
| 2011/0091055 A1 | 4/2011 | Leblanc |
| 2011/0103615 A1 | 5/2011 | Sun |
| 2011/0145581 A1 | 6/2011 | Malhotra et al. |
| 2011/0170707 A1 | 7/2011 | Yamada et al. |
| 2011/0182436 A1 | 7/2011 | Murgia et al. |
| 2011/0202924 A1 | 8/2011 | Banguero et al. |
| 2011/0218656 A1 | 9/2011 | Bishop et al. |
| 2011/0267985 A1 | 11/2011 | Wilkinson et al. |
| 2011/0276333 A1 | 11/2011 | Wang et al. |
| 2011/0280422 A1 | 11/2011 | Neumeyer et al. |
| 2011/0285808 A1 | 11/2011 | Feng et al. |
| 2011/0289506 A1 | 11/2011 | Trivi et al. |
| 2011/0299706 A1 | 12/2011 | Sakai |
| 2012/0020486 A1 | 1/2012 | Fried et al. |
| 2012/0022863 A1 | 1/2012 | Cho et al. |
| 2012/0022864 A1 | 1/2012 | Leman et al. |
| 2012/0078635 A1 | 3/2012 | Rothkopf et al. |
| 2012/0086568 A1 | 4/2012 | Scott et al. |
| 2012/0123268 A1 | 5/2012 | Tanaka et al. |
| 2012/0128160 A1 | 5/2012 | Kim et al. |
| 2012/0131125 A1 | 5/2012 | Seidel et al. |
| 2012/0148075 A1 | 6/2012 | Goh et al. |
| 2012/0162540 A1 | 6/2012 | Ouchi et al. |
| 2012/0163603 A1 | 6/2012 | Abe et al. |
| 2012/0177215 A1 | 7/2012 | Bose et al. |
| 2012/0183149 A1 | 7/2012 | Hiroe |
| 2012/0224715 A1 | 9/2012 | Kikkeri |
| 2012/0297284 A1 | 11/2012 | Matthews, III et al. |
| 2012/0308044 A1 | 12/2012 | Vander Mey et al. |
| 2012/0308046 A1 | 12/2012 | Muza |
| 2013/0006453 A1 | 1/2013 | Wang et al. |
| 2013/0024018 A1 | 1/2013 | Chang et al. |
| 2013/0034241 A1 | 2/2013 | Pandey et al. |
| 2013/0039527 A1 | 2/2013 | Jensen et al. |
| 2013/0058492 A1 | 3/2013 | Silzle et al. |
| 2013/0066453 A1 | 3/2013 | Seefeldt |
| 2013/0080146 A1 | 3/2013 | Kato et al. |
| 2013/0124211 A1 | 5/2013 | McDonough |
| 2013/0148821 A1 | 6/2013 | Sorensen |
| 2013/0170647 A1 | 7/2013 | Reilly et al. |
| 2013/0179173 A1 | 7/2013 | Lee et al. |
| 2013/0183944 A1 | 7/2013 | Mozer et al. |
| 2013/0191119 A1 | 7/2013 | Sugiyama |
| 2013/0191122 A1 | 7/2013 | Mason |
| 2013/0198298 A1 | 8/2013 | Li et al. |
| 2013/0211826 A1 | 8/2013 | Mannby |
| 2013/0216056 A1 | 8/2013 | Thyssen |
| 2013/0262101 A1 | 10/2013 | Srinivasan |
| 2013/0315420 A1 | 11/2013 | You |
| 2013/0317635 A1 | 11/2013 | Bates et al. |
| 2013/0322462 A1 | 12/2013 | Poulsen |
| 2013/0322665 A1 | 12/2013 | Bennett et al. |

(56) References Cited

U.S. PATENT DOCUMENTS

| | | |
|---|---|---|
| 2013/0324031 A1 | 12/2013 | Loureiro |
| 2013/0329896 A1 | 12/2013 | Krishnaswamy et al. |
| 2013/0331970 A1 | 12/2013 | Beckhardt et al. |
| 2013/0332165 A1 | 12/2013 | Beckley et al. |
| 2013/0339028 A1 | 12/2013 | Rosner et al. |
| 2014/0003611 A1 | 1/2014 | Mohammad et al. |
| 2014/0003625 A1 | 1/2014 | Sheen et al. |
| 2014/0003635 A1 | 1/2014 | Mohammad et al. |
| 2014/0005813 A1 | 1/2014 | Reimann |
| 2014/0006026 A1 | 1/2014 | Lamb et al. |
| 2014/0006825 A1 | 1/2014 | Shenhav |
| 2014/0019743 A1 | 1/2014 | DeLuca |
| 2014/0034929 A1 | 2/2014 | Hamada et al. |
| 2014/0046464 A1 | 2/2014 | Reimann |
| 2014/0064501 A1 | 3/2014 | Olsen et al. |
| 2014/0073298 A1 | 3/2014 | Rossmann |
| 2014/0075306 A1 | 3/2014 | Rega |
| 2014/0075311 A1 | 3/2014 | Boettcher et al. |
| 2014/0094151 A1 | 4/2014 | Klappert et al. |
| 2014/0100854 A1 | 4/2014 | Chen et al. |
| 2014/0109138 A1 | 4/2014 | Cannistraro et al. |
| 2014/0122075 A1 | 5/2014 | Bak et al. |
| 2014/0136195 A1 | 5/2014 | Abdossalami et al. |
| 2014/0145168 A1 | 5/2014 | Ohsawa et al. |
| 2014/0146983 A1 | 5/2014 | Kim et al. |
| 2014/0163978 A1 | 6/2014 | Basye et al. |
| 2014/0164400 A1 | 6/2014 | Kruglick |
| 2014/0167931 A1 | 6/2014 | Lee et al. |
| 2014/0168344 A1 | 6/2014 | Shoemake et al. |
| 2014/0172953 A1 | 6/2014 | Blanksteen |
| 2014/0181271 A1 | 6/2014 | Millington |
| 2014/0192986 A1 | 7/2014 | Lee et al. |
| 2014/0195252 A1 | 7/2014 | Gruber et al. |
| 2014/0207457 A1 | 7/2014 | Biatov et al. |
| 2014/0214429 A1 | 7/2014 | Pantel |
| 2014/0215332 A1 | 7/2014 | Lee et al. |
| 2014/0219472 A1 | 8/2014 | Huang et al. |
| 2014/0222436 A1 | 8/2014 | Binder et al. |
| 2014/0229184 A1 | 8/2014 | Shires |
| 2014/0244013 A1 | 8/2014 | Reilly |
| 2014/0244712 A1 | 8/2014 | Walters et al. |
| 2014/0249817 A1 | 9/2014 | Hart et al. |
| 2014/0252386 A1 | 9/2014 | Ito et al. |
| 2014/0254805 A1 | 9/2014 | Su et al. |
| 2014/0258292 A1 | 9/2014 | Thramann et al. |
| 2014/0259075 A1 | 9/2014 | Chang et al. |
| 2014/0269757 A1 | 9/2014 | Park et al. |
| 2014/0270282 A1 | 9/2014 | Tammi et al. |
| 2014/0274185 A1 | 9/2014 | Luna et al. |
| 2014/0274203 A1 | 9/2014 | Ganong, III et al. |
| 2014/0274218 A1 | 9/2014 | Kadiwala et al. |
| 2014/0277650 A1 | 9/2014 | Zurek et al. |
| 2014/0291642 A1 | 10/2014 | Watabe et al. |
| 2014/0310002 A1 | 10/2014 | Nitz et al. |
| 2014/0310614 A1 | 10/2014 | Jones |
| 2014/0340888 A1 | 11/2014 | Ishisone et al. |
| 2014/0357248 A1 | 12/2014 | Tonshal et al. |
| 2014/0363022 A1 | 12/2014 | Dizon et al. |
| 2014/0363024 A1 | 12/2014 | Apodaca |
| 2014/0365227 A1 | 12/2014 | Cash et al. |
| 2014/0369491 A1 | 12/2014 | Kloberdans et al. |
| 2014/0372109 A1 | 12/2014 | Iyer et al. |
| 2015/0006176 A1 | 1/2015 | Pogue et al. |
| 2015/0006184 A1 | 1/2015 | Marti et al. |
| 2015/0010169 A1 | 1/2015 | Popova et al. |
| 2015/0014680 A1 | 1/2015 | Yamazaki et al. |
| 2015/0016642 A1 | 1/2015 | Walsh et al. |
| 2015/0018992 A1 | 1/2015 | Griffiths et al. |
| 2015/0019201 A1 | 1/2015 | Schoenbach |
| 2015/0019219 A1 | 1/2015 | Tzirkel-Hancock et al. |
| 2015/0036831 A1 | 2/2015 | Klippel |
| 2015/0039303 A1 | 2/2015 | Lesso et al. |
| 2015/0063580 A1 | 3/2015 | Huang et al. |
| 2015/0086034 A1 | 3/2015 | Lombardi et al. |
| 2015/0091709 A1 | 4/2015 | Reichert et al. |
| 2015/0092947 A1 | 4/2015 | Gossain et al. |
| 2015/0104037 A1 | 4/2015 | Lee et al. |
| 2015/0106085 A1 | 4/2015 | Lindahl |
| 2015/0110294 A1 | 4/2015 | Chen et al. |
| 2015/0112672 A1 | 4/2015 | Giacobello et al. |
| 2015/0124975 A1 | 5/2015 | Pontoppidan |
| 2015/0128065 A1 | 5/2015 | Torii et al. |
| 2015/0134456 A1 | 5/2015 | Baldwin |
| 2015/0154976 A1 | 6/2015 | Mutagi |
| 2015/0161990 A1 | 6/2015 | Sharifi |
| 2015/0169279 A1 | 6/2015 | Duga |
| 2015/0170645 A1 | 6/2015 | Di et al. |
| 2015/0172843 A1 | 6/2015 | Quan |
| 2015/0179181 A1 | 6/2015 | Morris et al. |
| 2015/0180432 A1 | 6/2015 | Gao et al. |
| 2015/0181318 A1 | 6/2015 | Gautama et al. |
| 2015/0189438 A1 | 7/2015 | Hampiholi et al. |
| 2015/0200454 A1 | 7/2015 | Heusdens et al. |
| 2015/0201271 A1 | 7/2015 | Diethorn et al. |
| 2015/0221678 A1 | 8/2015 | Yamazaki et al. |
| 2015/0222563 A1 | 8/2015 | Burns et al. |
| 2015/0222987 A1 | 8/2015 | Angel, Jr. et al. |
| 2015/0228274 A1 | 8/2015 | Leppanen et al. |
| 2015/0228803 A1 | 8/2015 | Koezuka et al. |
| 2015/0237406 A1 | 8/2015 | Ochoa et al. |
| 2015/0243287 A1 | 8/2015 | Nakano et al. |
| 2015/0245152 A1 | 8/2015 | Ding et al. |
| 2015/0245154 A1 | 8/2015 | Dadu et al. |
| 2015/0249889 A1 | 9/2015 | Iyer et al. |
| 2015/0253292 A1 | 9/2015 | Larkin et al. |
| 2015/0253960 A1 | 9/2015 | Lin et al. |
| 2015/0254057 A1 | 9/2015 | Klein et al. |
| 2015/0263174 A1 | 9/2015 | Yamazaki et al. |
| 2015/0271593 A1 | 9/2015 | Sun et al. |
| 2015/0277846 A1 | 10/2015 | Yen et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0319529 A1 | 11/2015 | Klippel |
| 2015/0325267 A1 | 11/2015 | Lee et al. |
| 2015/0331663 A1 | 11/2015 | Beckhardt et al. |
| 2015/0334471 A1 | 11/2015 | Innes et al. |
| 2015/0338917 A1 | 11/2015 | Steiner et al. |
| 2015/0341406 A1 | 11/2015 | Rockefeller et al. |
| 2015/0346845 A1 | 12/2015 | Di et al. |
| 2015/0348548 A1 | 12/2015 | Piernot et al. |
| 2015/0348551 A1 | 12/2015 | Gruber et al. |
| 2015/0355878 A1 | 12/2015 | Corbin |
| 2015/0363061 A1 | 12/2015 | De, III et al. |
| 2015/0363401 A1 | 12/2015 | Chen et al. |
| 2015/0370531 A1 | 12/2015 | Faaborg |
| 2015/0371657 A1 | 12/2015 | Gao |
| 2015/0371659 A1 | 12/2015 | Gao |
| 2015/0371664 A1 | 12/2015 | Bar-Or et al. |
| 2015/0380010 A1 | 12/2015 | Srinivasan et al. |
| 2015/0382047 A1 | 12/2015 | Van Os et al. |
| 2016/0007116 A1 | 1/2016 | Holman |
| 2016/0021458 A1 | 1/2016 | Johnson et al. |
| 2016/0026428 A1 | 1/2016 | Morganstern et al. |
| 2016/0029142 A1 | 1/2016 | Isaac et al. |
| 2016/0035321 A1 | 2/2016 | Cho et al. |
| 2016/0036962 A1 | 2/2016 | Rand et al. |
| 2016/0042748 A1 | 2/2016 | Jain et al. |
| 2016/0044151 A1 | 2/2016 | Shoemaker et al. |
| 2016/0050488 A1 | 2/2016 | Matheja et al. |
| 2016/0057522 A1 | 2/2016 | Choisel et al. |
| 2016/0072804 A1 | 3/2016 | Chien et al. |
| 2016/0077710 A1 | 3/2016 | Lewis et al. |
| 2016/0086609 A1 | 3/2016 | Yue et al. |
| 2016/0088392 A1 | 3/2016 | Huttunen et al. |
| 2016/0093304 A1 | 3/2016 | Kim et al. |
| 2016/0094718 A1 | 3/2016 | Mani et al. |
| 2016/0094917 A1 | 3/2016 | Wilk et al. |
| 2016/0098393 A1 | 4/2016 | Hebert |
| 2016/0098992 A1 | 4/2016 | Renard et al. |
| 2016/0103653 A1 | 4/2016 | Jang |
| 2016/0104480 A1 | 4/2016 | Sharifi |
| 2016/0111110 A1 | 4/2016 | Gautama et al. |
| 2016/0125876 A1 | 5/2016 | Schroeter et al. |

(56) References Cited

U.S. PATENT DOCUMENTS

| | | |
|---|---|---|
| 2016/0127780 A1 | 5/2016 | Roberts et al. |
| 2016/0133259 A1 | 5/2016 | Rubin et al. |
| 2016/0134966 A1 | 5/2016 | Fitzgerald et al. |
| 2016/0134982 A1 | 5/2016 | Iyer |
| 2016/0154089 A1 | 6/2016 | Altman |
| 2016/0155442 A1 | 6/2016 | Kannan et al. |
| 2016/0155443 A1 | 6/2016 | Khan et al. |
| 2016/0157035 A1 | 6/2016 | Russell et al. |
| 2016/0162469 A1 | 6/2016 | Santos |
| 2016/0171976 A1 | 6/2016 | Sun et al. |
| 2016/0173578 A1 | 6/2016 | Sharma et al. |
| 2016/0173983 A1 | 6/2016 | Berthelsen et al. |
| 2016/0180853 A1 | 6/2016 | Vanlund et al. |
| 2016/0189716 A1 | 6/2016 | Lindahl et al. |
| 2016/0196499 A1 | 7/2016 | Khan et al. |
| 2016/0203331 A1 | 7/2016 | Khan et al. |
| 2016/0210110 A1 | 7/2016 | Feldman |
| 2016/0212538 A1 | 7/2016 | Fullam et al. |
| 2016/0216938 A1 | 7/2016 | Millington |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0234615 A1 | 8/2016 | Lambourne |
| 2016/0239255 A1 | 8/2016 | Chavez et al. |
| 2016/0240192 A1 | 8/2016 | Raghuvir |
| 2016/0241976 A1 | 8/2016 | Pearson |
| 2016/0253050 A1 | 9/2016 | Mishra et al. |
| 2016/0260431 A1 | 9/2016 | Newendorp et al. |
| 2016/0283841 A1 | 9/2016 | Sainath et al. |
| 2016/0302018 A1 | 10/2016 | Russell et al. |
| 2016/0314782 A1 | 10/2016 | Klimanis |
| 2016/0316293 A1 | 10/2016 | Klimanis |
| 2016/0322045 A1 | 11/2016 | Hatfield et al. |
| 2016/0336519 A1 | 11/2016 | Seo et al. |
| 2016/0343866 A1 | 11/2016 | Koezuka et al. |
| 2016/0343949 A1 | 11/2016 | Seo et al. |
| 2016/0343954 A1 | 11/2016 | Seo et al. |
| 2016/0345114 A1 | 11/2016 | Hanna et al. |
| 2016/0352915 A1 | 12/2016 | Gautama |
| 2016/0353217 A1 | 12/2016 | Starobin et al. |
| 2016/0353218 A1 | 12/2016 | Starobin et al. |
| 2016/0357503 A1 | 12/2016 | Triplett et al. |
| 2016/0364206 A1 | 12/2016 | Keyser-Allen et al. |
| 2016/0366515 A1 | 12/2016 | Mendes et al. |
| 2016/0372688 A1 | 12/2016 | Seo et al. |
| 2016/0373269 A1 | 12/2016 | Okubo et al. |
| 2016/0373909 A1 | 12/2016 | Rasmussen et al. |
| 2016/0379634 A1 | 12/2016 | Yamamoto et al. |
| 2017/0003931 A1 | 1/2017 | Dvortsov et al. |
| 2017/0012207 A1 | 1/2017 | Seo et al. |
| 2017/0012232 A1 | 1/2017 | Kataishi et al. |
| 2017/0019732 A1 | 1/2017 | Mendes et al. |
| 2017/0025615 A1 | 1/2017 | Seo et al. |
| 2017/0025630 A1 | 1/2017 | Seo et al. |
| 2017/0026769 A1 | 1/2017 | Patel |
| 2017/0034263 A1 | 2/2017 | Archambault et al. |
| 2017/0039025 A1 | 2/2017 | Kielak |
| 2017/0040018 A1 | 2/2017 | Tormey |
| 2017/0041724 A1 | 2/2017 | Master et al. |
| 2017/0060526 A1 | 3/2017 | Barton et al. |
| 2017/0062734 A1 | 3/2017 | Suzuki et al. |
| 2017/0070478 A1 | 3/2017 | Park et al. |
| 2017/0076212 A1 | 3/2017 | Shams et al. |
| 2017/0076720 A1 | 3/2017 | Gopalan et al. |
| 2017/0078824 A1 | 3/2017 | Heo |
| 2017/0083285 A1 | 3/2017 | Meyers et al. |
| 2017/0084277 A1 | 3/2017 | Sharifi |
| 2017/0084292 A1 | 3/2017 | Yoo |
| 2017/0084295 A1 | 3/2017 | Tsiartas et al. |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0092299 A1 | 3/2017 | Matsuo |
| 2017/0092889 A1 | 3/2017 | Seo et al. |
| 2017/0092890 A1 | 3/2017 | Seo et al. |
| 2017/0094215 A1 | 3/2017 | Western |
| 2017/0103754 A1 | 4/2017 | Higbie et al. |
| 2017/0103755 A1 | 4/2017 | Jeon et al. |
| 2017/0110124 A1 | 4/2017 | Boesen et al. |
| 2017/0110144 A1 | 4/2017 | Sharifi et al. |
| 2017/0117497 A1 | 4/2017 | Seo et al. |
| 2017/0123251 A1 | 5/2017 | Nakada et al. |
| 2017/0125037 A1 | 5/2017 | Shin |
| 2017/0125456 A1 | 5/2017 | Kasahara |
| 2017/0133007 A1 | 5/2017 | Drewes |
| 2017/0133011 A1 | 5/2017 | Chen et al. |
| 2017/0134872 A1 | 5/2017 | Silva et al. |
| 2017/0139720 A1 | 5/2017 | Stein |
| 2017/0140449 A1 | 5/2017 | Kannan |
| 2017/0140748 A1 | 5/2017 | Roberts et al. |
| 2017/0140759 A1 | 5/2017 | Kumar et al. |
| 2017/0177585 A1 | 6/2017 | Rodger et al. |
| 2017/0178662 A1 | 6/2017 | Ayrapetian et al. |
| 2017/0180561 A1 | 6/2017 | Kadiwala et al. |
| 2017/0188150 A1 | 6/2017 | Brunet et al. |
| 2017/0188437 A1 | 6/2017 | Banta |
| 2017/0193999 A1 | 7/2017 | Aleksic et al. |
| 2017/0206896 A1 | 7/2017 | Ko et al. |
| 2017/0206900 A1 | 7/2017 | Lee et al. |
| 2017/0214996 A1 | 7/2017 | Yeo |
| 2017/0236512 A1 | 8/2017 | Williams et al. |
| 2017/0236515 A1 | 8/2017 | Pinsky et al. |
| 2017/0242649 A1 | 8/2017 | Jarvis et al. |
| 2017/0242651 A1 | 8/2017 | Lang et al. |
| 2017/0242653 A1 | 8/2017 | Lang et al. |
| 2017/0242657 A1 | 8/2017 | Jarvis et al. |
| 2017/0243576 A1 | 8/2017 | Millington et al. |
| 2017/0243587 A1 | 8/2017 | Plagge et al. |
| 2017/0245076 A1 | 8/2017 | Kusano et al. |
| 2017/0255612 A1 | 9/2017 | Sarikaya et al. |
| 2017/0257686 A1 | 9/2017 | Gautama et al. |
| 2017/0270919 A1 | 9/2017 | Parthasarathi et al. |
| 2017/0278512 A1 | 9/2017 | Pandya et al. |
| 2017/0287485 A1 | 10/2017 | Civelli et al. |
| 2017/0330565 A1 | 11/2017 | Daley et al. |
| 2017/0332168 A1 | 11/2017 | Moghimi et al. |
| 2017/0346872 A1 | 11/2017 | Naik et al. |
| 2017/0352357 A1 | 12/2017 | Fink |
| 2017/0353789 A1 | 12/2017 | Kim et al. |
| 2017/0357475 A1 | 12/2017 | Lee et al. |
| 2017/0357478 A1 | 12/2017 | Piersol et al. |
| 2017/0366393 A1 | 12/2017 | Shaker et al. |
| 2017/0374454 A1 | 12/2017 | Bernardini et al. |
| 2018/0018964 A1 | 1/2018 | Reilly et al. |
| 2018/0018967 A1 | 1/2018 | Lang et al. |
| 2018/0020306 A1 | 1/2018 | Sheen |
| 2018/0025733 A1 | 1/2018 | Qian et al. |
| 2018/0033428 A1 | 2/2018 | Kim et al. |
| 2018/0040324 A1 | 2/2018 | Wilberding |
| 2018/0047394 A1 | 2/2018 | Tian et al. |
| 2018/0053504 A1 | 2/2018 | Wang et al. |
| 2018/0054506 A1 | 2/2018 | Hart et al. |
| 2018/0061396 A1 | 3/2018 | Srinivasan et al. |
| 2018/0061402 A1 | 3/2018 | Devaraj et al. |
| 2018/0061404 A1 | 3/2018 | Devaraj et al. |
| 2018/0061419 A1 | 3/2018 | Melendo Casado et al. |
| 2018/0061420 A1 | 3/2018 | Patil et al. |
| 2018/0062871 A1 | 3/2018 | Jones et al. |
| 2018/0084367 A1 | 3/2018 | Greff et al. |
| 2018/0088900 A1 | 3/2018 | Glaser et al. |
| 2018/0091898 A1 | 3/2018 | Yoon et al. |
| 2018/0091913 A1 | 3/2018 | Hartung et al. |
| 2018/0096683 A1 | 4/2018 | James et al. |
| 2018/0096696 A1 | 4/2018 | Mixter |
| 2018/0107446 A1 | 4/2018 | Wilberding et al. |
| 2018/0108351 A1 | 4/2018 | Beckhardt et al. |
| 2018/0122372 A1 | 5/2018 | Wanderlust |
| 2018/0122378 A1 | 5/2018 | Mixter et al. |
| 2018/0130469 A1 | 5/2018 | Gruenstein et al. |
| 2018/0132217 A1 | 5/2018 | Stirling-Gallacher |
| 2018/0132298 A1 | 5/2018 | Birnam et al. |
| 2018/0137861 A1 | 5/2018 | Ogawa |
| 2018/0165055 A1 | 6/2018 | Yu et al. |
| 2018/0167981 A1 | 6/2018 | Jonna et al. |

(56) References Cited

U.S. PATENT DOCUMENTS

| | | |
|---|---|---|
| 2018/0174597 A1 | 6/2018 | Lee et al. |
| 2018/0182390 A1 | 6/2018 | Hughes et al. |
| 2018/0190285 A1 | 7/2018 | Heckman et al. |
| 2018/0197533 A1 | 7/2018 | Lyon et al. |
| 2018/0199146 A1 | 7/2018 | Sheen |
| 2018/0204569 A1 | 7/2018 | Nadkar et al. |
| 2018/0205963 A1 | 7/2018 | Matei et al. |
| 2018/0210698 A1 | 7/2018 | Park et al. |
| 2018/0218747 A1 | 8/2018 | Moghimi et al. |
| 2018/0219976 A1 | 8/2018 | Decenzo et al. |
| 2018/0225933 A1 | 8/2018 | Park et al. |
| 2018/0228006 A1 | 8/2018 | Baker et al. |
| 2018/0233136 A1 | 8/2018 | Torok et al. |
| 2018/0233137 A1 | 8/2018 | Torok et al. |
| 2018/0233139 A1 | 8/2018 | Finkelstein et al. |
| 2018/0234765 A1 | 8/2018 | Torok et al. |
| 2018/0262793 A1 | 9/2018 | Lau et al. |
| 2018/0262831 A1 | 9/2018 | Matheja et al. |
| 2018/0270565 A1 | 9/2018 | Ganeshkumar |
| 2018/0277107 A1 | 9/2018 | Kim |
| 2018/0277113 A1 | 9/2018 | Hartung et al. |
| 2018/0277119 A1 | 9/2018 | Baba et al. |
| 2018/0277133 A1 | 9/2018 | Deetz et al. |
| 2018/0293484 A1 | 10/2018 | Wang et al. |
| 2018/0308470 A1 | 10/2018 | Park et al. |
| 2018/0314552 A1 | 11/2018 | Kim et al. |
| 2018/0324756 A1 | 11/2018 | Ryu et al. |
| 2018/0335903 A1 | 11/2018 | Coffman et al. |
| 2018/0336274 A1 | 11/2018 | Choudhury et al. |
| 2018/0358009 A1 | 12/2018 | Daley et al. |
| 2018/0365567 A1 | 12/2018 | Kolavennu et al. |
| 2018/0367944 A1 | 12/2018 | Heo et al. |
| 2019/0012141 A1 | 1/2019 | Piersol et al. |
| 2019/0013019 A1 | 1/2019 | Lawrence |
| 2019/0014592 A1 | 1/2019 | Hampel et al. |
| 2019/0033446 A1 | 1/2019 | Bultan et al. |
| 2019/0042187 A1 | 2/2019 | Truong et al. |
| 2019/0043492 A1 | 2/2019 | Lang |
| 2019/0066672 A1 | 2/2019 | Wood et al. |
| 2019/0074025 A1 | 3/2019 | Lashkari et al. |
| 2019/0079724 A1 | 3/2019 | Feuz et al. |
| 2019/0081507 A1 | 3/2019 | Ide |
| 2019/0082255 A1 | 3/2019 | Tajiri et al. |
| 2019/0088261 A1 | 3/2019 | Lang et al. |
| 2019/0090056 A1 | 3/2019 | Rexach et al. |
| 2019/0098400 A1 | 3/2019 | Buoni et al. |
| 2019/0104119 A1 | 4/2019 | Giorgi et al. |
| 2019/0104373 A1 | 4/2019 | Wodrich et al. |
| 2019/0108839 A1 | 4/2019 | Reilly et al. |
| 2019/0115011 A1 | 4/2019 | Khellah et al. |
| 2019/0130906 A1 | 5/2019 | Kobayashi et al. |
| 2019/0163153 A1 | 5/2019 | Price et al. |
| 2019/0172452 A1 | 6/2019 | Smith et al. |
| 2019/0173687 A1 | 6/2019 | Mackay et al. |
| 2019/0179607 A1 | 6/2019 | Thangarathnam et al. |
| 2019/0179611 A1 | 6/2019 | Wojogbe et al. |
| 2019/0182072 A1 | 6/2019 | Roe et al. |
| 2019/0206412 A1 | 7/2019 | Li et al. |
| 2019/0220246 A1 | 7/2019 | Orr et al. |
| 2019/0237067 A1 | 8/2019 | Friedman et al. |
| 2019/0239008 A1 | 8/2019 | Lambourne |
| 2019/0239009 A1 | 8/2019 | Lambourne |
| 2019/0243603 A1 | 8/2019 | Keyser-Allen et al. |
| 2019/0243606 A1 | 8/2019 | Jayakumar et al. |
| 2019/0281397 A1 | 9/2019 | Lambourne |
| 2019/0287546 A1 | 9/2019 | Ganeshkumar |
| 2019/0295563 A1 | 9/2019 | Kamdar et al. |
| 2019/0297388 A1 | 9/2019 | Panchaksharaiah et al. |
| 2019/0304443 A1 | 10/2019 | Bhagwan |
| 2019/0311710 A1 | 10/2019 | Eraslan et al. |
| 2019/0311712 A1 | 10/2019 | Firik et al. |
| 2019/0311720 A1 | 10/2019 | Pasko |
| 2019/0317606 A1 | 10/2019 | Jain et al. |
| 2019/0342962 A1 | 11/2019 | Chang et al. |
| 2019/0364375 A1 | 11/2019 | Soto et al. |
| 2020/0007987 A1 | 1/2020 | Woo et al. |
| 2020/0034492 A1 | 1/2020 | Verbeke et al. |
| 2020/0051554 A1 | 2/2020 | Kim et al. |
| 2020/0092687 A1 | 3/2020 | Devaraj et al. |
| 2020/0105256 A1 | 4/2020 | Fainberg et al. |
| 2020/0175989 A1 | 6/2020 | Lockhart et al. |
| 2020/0184980 A1 | 6/2020 | Wilberding |
| 2020/0193973 A1 | 6/2020 | Tolomei et al. |
| 2020/0211556 A1* | 7/2020 | Mixter .................. G10L 15/22 |
| 2020/0213729 A1 | 7/2020 | Soto |
| 2020/0216089 A1 | 7/2020 | Garcia et al. |
| 2020/0336846 A1 | 10/2020 | Rohde et al. |
| 2020/0395006 A1 | 12/2020 | Smith et al. |
| 2020/0395010 A1 | 12/2020 | Smith et al. |
| 2020/0395013 A1 | 12/2020 | Smith et al. |
| 2020/0409652 A1 | 12/2020 | Wilberding et al. |
| 2021/0035561 A1 | 2/2021 | D'Amato et al. |
| 2021/0035572 A1 | 2/2021 | D'Amato et al. |
| 2021/0118429 A1 | 4/2021 | Shan |

FOREIGN PATENT DOCUMENTS

| | | |
|---|---|---|
| CN | 101310558 A | 11/2008 |
| CN | 101480039 A | 7/2009 |
| CN | 101661753 A | 3/2010 |
| CN | 101686282 A | 3/2010 |
| CN | 101907983 A | 12/2010 |
| CN | 102123188 A | 7/2011 |
| CN | 102256098 A | 11/2011 |
| CN | 102567468 A | 7/2012 |
| CN | 103052001 A | 4/2013 |
| CN | 103181192 A | 6/2013 |
| CN | 103210663 A | 7/2013 |
| CN | 103546616 A | 1/2014 |
| CN | 103811007 A | 5/2014 |
| CN | 104010251 A | 8/2014 |
| CN | 104035743 A | 9/2014 |
| CN | 104053088 A | 9/2014 |
| CN | 104092936 A | 10/2014 |
| CN | 104104769 A | 10/2014 |
| CN | 104538030 A | 4/2015 |
| CN | 104575504 A | 4/2015 |
| CN | 104635539 A | 5/2015 |
| CN | 104865550 A | 8/2015 |
| CN | 105187907 A | 12/2015 |
| CN | 105204357 A | 12/2015 |
| CN | 105206281 A | 12/2015 |
| CN | 105284076 A | 1/2016 |
| CN | 105493442 A | 4/2016 |
| CN | 106028223 A | 10/2016 |
| CN | 106375902 A | 2/2017 |
| CN | 106531165 A | 3/2017 |
| CN | 106708403 A | 5/2017 |
| CN | 107004410 A | 8/2017 |
| CN | 107919123 A | 4/2018 |
| EP | 1349146 A1 | 10/2003 |
| EP | 1389853 A1 | 2/2004 |
| EP | 2166737 A1 | 3/2010 |
| EP | 2683147 A1 | 1/2014 |
| EP | 3128767 A2 | 2/2017 |
| EP | 2351021 B1 | 9/2017 |
| EP | 3270377 A1 | 1/2018 |
| EP | 3285502 A1 | 2/2018 |
| JP | 2001236093 A | 8/2001 |
| JP | 2003223188 A | 8/2003 |
| JP | 2004347943 A | 12/2004 |
| JP | 2004354721 A | 12/2004 |
| JP | 2005242134 A | 9/2005 |
| JP | 2005250867 A | 9/2005 |
| JP | 2005284492 A | 10/2005 |
| JP | 2006092482 A | 4/2006 |
| JP | 2007013400 A | 1/2007 |
| JP | 2007142595 A | 6/2007 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |

(56) References Cited

FOREIGN PATENT DOCUMENTS

| | | |
|---|---|---|
| JP | 2015161551 A | 9/2015 |
| JP | 2015527768 A | 9/2015 |
| JP | 2016095383 A | 5/2016 |
| JP | 2017072857 A | 4/2017 |
| KR | 20100036351 A | 4/2010 |
| KR | 100966415 B1 | 6/2010 |
| KR | 20100111071 A | 10/2010 |
| KR | 20130050987 A | 5/2013 |
| KR | 20140035310 A | 3/2014 |
| KR | 20140112900 A | 9/2014 |
| WO | 200153994 | 7/2001 |
| WO | 2003093950 A2 | 11/2003 |
| WO | 2008048599 A1 | 4/2008 |
| WO | 2012166386 A2 | 12/2012 |
| WO | 2013184792 A1 | 12/2013 |
| WO | 2014064531 A1 | 5/2014 |
| WO | 2014159581 A1 | 10/2014 |
| WO | 2015017303 A1 | 2/2015 |
| WO | 2015037396 A1 | 3/2015 |
| WO | 2015131024 A1 | 9/2015 |
| WO | 2015178950 A1 | 11/2015 |
| WO | 2016014142 A1 | 1/2016 |
| WO | 2016022926 A1 | 2/2016 |
| WO | 2016033364 A1 | 3/2016 |
| WO | 2016057268 A1 | 4/2016 |
| WO | 2016085775 A2 | 6/2016 |
| WO | 2016165067 A1 | 10/2016 |
| WO | 2016171956 A1 | 10/2016 |
| WO | 2016200593 A1 | 12/2016 |
| WO | 2017039632 A1 | 3/2017 |
| WO | 2017058654 A1 | 4/2017 |
| WO | 2017138934 A1 | 8/2017 |
| WO | 2017147075 A1 | 8/2017 |
| WO | 2017147936 A1 | 9/2017 |
| WO | 2018027142 A1 | 2/2018 |
| WO | 2018067404 A1 | 4/2018 |

OTHER PUBLICATIONS

Notice of Allowance dated Apr. 27, 2020, issued in connection with U.S. Appl. No. 16/700,607, filed Dec. 2, 2019, 10 pages.
Notice of Allowance dated Mar. 27, 2019, issued in connection with U.S. Appl. No. 16/214,666, filed Dec. 10, 2018, 6 pages.
Notice of Allowance dated Mar. 28, 2018, issued in connection with U.S. Appl. No. 15/699,982, filed Sep. 8, 2017, 17 pages.
Notice of Allowance dated Dec. 29, 2017, issued in connection with U.S. Appl. No. 15/131,776, filed Apr. 18, 2016, 13 pages.
Notice of Allowance dated Jan. 29, 2021, issued in connection with U.S. Appl. No. 16/290,599, filed Mar. 1, 2019, 9 pages.
Notice of Allowance dated Jun. 29, 2020, issued in connection with U.S. Appl. No. 16/216,357, filed Dec. 11, 2018, 8 pages.
Notice of Allowance dated May 29, 2020, issued in connection with U.S. Appl. No. 16/148,879, filed Oct. 1, 2018, 6 pages.
Notice of Allowance dated Apr. 3, 2019, issued in connection with U.S. Appl. No. 16/160,107, filed Oct. 15, 2018, 7 pages.
Notice of Allowance dated Jul. 30, 2018, issued in connection with U.S. Appl. No. 15/098,718, filed Apr. 14, 2016, 5 pages.
Notice of Allowance dated Jul. 30, 2019, issued in connection with U.S. Appl. No. 15/131,254, filed Apr. 18, 2016, 9 pages.
Notice of Allowance dated Mar. 30, 2020, issued in connection with U.S. Appl. No. 15/973,413, filed May 7, 2018, 5 pages.
Notice of Allowance dated Nov. 30, 2018, issued in connection with U.S. Appl. No. 15/438,725, filed Feb. 21, 2017, 5 pages.
Notice of Allowance dated Oct. 30, 2019, issued in connection with U.S. Appl. No. 16/131,392, filed Sep. 14, 2018, 9 pages.
Notice of Allowance dated Oct. 30, 2020, issued in connection with U.S. Appl. No. 16/528,016, filed Jul. 31, 2019, 10 pages.
Notice of Allowance dated May 31, 2019, issued in connection with U.S. Appl. No. 15/717,621, filed Sep. 27, 2017, 9 pages.
Notice of Allowance dated Mar. 4, 2020, issued in connection with U.S. Appl. No. 16/444,975, filed Jun. 18, 2019, 10 pages.
Notice of Allowance dated Feb. 5, 2020, issued in connection with U.S. Appl. No. 16/178,122, filed Nov. 1, 2018, 9 pages.
Notice of Allowance dated Oct. 5, 2018, issued in connection with U.S. Appl. No. 15/211,748, filed Jul. 15, 2018, 10 pages.
Notice of Allowance dated Feb. 6, 2019, issued in connection with U.S. Appl. No. 16/102,153, filed Aug. 13, 2018, 9 pages.
Notice of Allowance dated Feb. 6, 2020, issued in connection with U.S. Appl. No. 16/227,308, filed Dec. 20, 2018, 7 pages.
Notice of Allowance dated Apr. 7, 2020, issued in connection with U.S. Appl. No. 15/098,760, filed Apr. 14, 2016, 7 pages.
Notice of Allowance dated Apr. 7, 2020, issued in connection with U.S. Appl. No. 16/147,710, filed Sep. 29, 2018, 15 pages.
Notice of Allowance dated Jun. 7, 2019, issued in connection with U.S. Appl. No. 16/102,153, filed Aug. 13, 2018, 9 pages.
Notice of Allowance dated Aug. 9, 2018, issued in connection with U.S. Appl. No. 15/229,868, filed Aug. 5, 2016, 11 pages.
Notice of Allowance dated Mar. 9, 2018, issued in connection with U.S. Appl. No. 15/584,782, filed May 2, 2017, 8 pages.
Optimizing Siri on HomePod in Far-Field Settings. Audio Software Engineering and Siri Speech Team, Machine Learning Journal vol. 1, Issue 12. https://machinelearning.apple.com/2018/12/03/optimizing-siri-on-homepod-in-far-field-settings.html. Dec. 2018, 18 pages.
Palm, Inc., "Handbook for the Palm VII Handheld," May 2000, 311 pages.
Preinterview First Office Action dated Aug. 5, 2019, issued in connection with U.S. Appl. No. 16/434,426, filed Jun. 7, 2019, 4 pages.
Preinterview First Office Action dated Mar. 25, 2020, issued in connection with U.S. Appl. No. 16/109,375, filed Aug. 22, 2018, 6 pages.
Preinterview First Office Action dated Sep. 30, 2019, issued in connection with U.S. Appl. No. 15/989,715, filed May 25, 2018, 4 pages.
Preinterview First Office Action dated May 7, 2020, issued in connection with U.S. Appl. No. 16/213,570, filed Dec. 7, 2018, 5 pages.
Preinterview First Office Action dated Jan. 8, 2021, issued in connection with U.S. Appl. No. 16/798,967, filed Feb. 24, 2020, 4 pages.
Presentations at WinHEC 2000, May 2000, 138 pages.
Restriction Requirement dated Aug. 14, 2019, issued in connection with U.S. Appl. No. 16/214,711, filed Dec. 10, 2018, 5 pages.
Restriction Requirement dated Aug. 9, 2018, issued in connection with U.S. Appl. No. 15/717,621, filed Sep. 27, 2017, 8 pages.
Rottondi et al., "An Overview on Networked Music Performance Technologies," IEEE Access, vol. 4, pp. 8823-8843, 2016, DOI: 10.1109/ACCESS.2016.2628440, 21 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Steven J. Nowlan and Geoffrey E. Hinton "Simplifying Neural Networks by Soft Weight-Sharing" Neural Computation 4, 1992, 21 pages.
Tsiami et al. "Experiments in acoustic source localization using sparse arrays in adverse indoors environments", 2014 22nd European Signal Processing Conference, Sep. 1, 2014, 5 pages.
Tweet: "How to start using Google app voice commands to make your life easier Share This Story shop @Bullet", Jan. 21, 2016, https://bgr.com/2016/01/21/best-ok-google-voice-commands/, 3 page.
Ullrich et al. "Soft Weight-Sharing for Neural Network Compression." ICLR 2017, 16 pages.
United States Patent and Trademark Office, U.S. Appl. No. 60/490,768, filed Jul. 28, 2003, entitled "Method for synchronizing audio playback between multiple networked devices," 13 pages.

(56) References Cited

OTHER PUBLICATIONS

United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.
"S Voice or Google Now?"; https://web.archive.org/web/20160807040123/lowdown.carphonewarehouse.com/news/s-voice-or-google-now/ . . . , Apr. 28, 2015; 4 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.
Non-Final Office Action dated Jul. 12, 2021, issued in connection with U.S. Appl. No. 17/008,104, filed Aug. 31, 2020, 6 pages.
Non-Final Office Action dated Jun. 18, 2021, issued in connection with U.S. Appl. No. 17/236,559, filed Apr. 21, 2021, 9 pages.
Non-Final Office Action dated Apr. 21, 2021, issued in connection with U.S. Appl. No. 16/109,375, filed Aug. 22, 2018, 9 pages.
Non-Final Office Action dated Apr. 23, 2021, issued in connection with U.S. Appl. No. 16/660,197, filed Oct. 22, 2019, 9 pages.
Non-Final Office Action dated Jun. 25, 2021, issued in connection with U.S. Appl. No. 16/213,570, filed Dec. 7, 2018, 11 pages.
Non-Final Office Action dated Jul. 8, 2021, issued in connection with U.S. Appl. No. 16/813,643, filed Mar. 9, 2020, 12 pages.
Non-Final Office Action dated Jul. 9, 2021, issued in connection with U.S. Appl. No. 16/806,747, filed Mar. 2, 2020, 18 pages.
Non-Final Office Action dated Mar. 11, 2021, issued in connection with U.S. Appl. No. 16/834,483, filed Mar. 30, 2020, 11 pages.
Non-Final Office Action dated Apr. 12, 2021, issued in connection with U.S. Appl. No. 16/528,224, filed Jul. 31, 2019, 9 pages.
Non-Final Office Action dated Jun. 23, 2021, issued in connection with U.S. Appl. No. 16/439,032, filed Jun. 12, 2019, 13 pages.
Non-Final Office Action dated Mar. 29, 2021, issued in connection with U.S. Appl. No. 16/528,265, filed Jul. 31, 2019, 18 pages.
Non-Final Office Action dated Apr. 9, 2021, issued in connection with U.S. Appl. No. 16/780,483, filed Feb. 3, 2020, 45 pages.
Notice of Allowance dated Mar. 31, 2021, issued in connection with U.S. Appl. No. 16/813,643, filed Mar. 9, 2020, 11 pages.
Notice of Allowance dated Jun. 1, 2021, issued in connection with U.S. Appl. No. 16/219,702, filed Dec. 13, 2018, 8 pages.
Notice of Allowance dated Jun. 1, 2021, issued in connection with U.S. Appl. No. 16/685,135, filed Nov. 15, 2019, 10 pages.
Notice of Allowance dated May 12, 2021, issued in connection with U.S. Appl. No. 16/402,617, filed May 3, 2019, 8 pages.
Notice of Allowance dated Apr. 16, 2021, issued in connection with U.S. Appl. No. 16/798,967, filed Feb. 24, 2020, 16 pages.
Notice of Allowance dated Mar. 18, 2021, issued in connection with U.S. Appl. No. 16/177,185, filed Oct. 31, 2018, 8 pages.
Notice of Allowance dated Mar. 19, 2021, issued in connection with U.S. Appl. No. 17/157,686, filed Jan. 25, 2021, 11 pages.
Notice of Allowance dated Apr. 21, 2021, issued in connection with U.S. Appl. No. 16/145,275, filed Sep. 28, 2018, 8 pages.
Notice of Allowance dated Jun. 23, 2021, issued in connection with U.S. Appl. No. 16/814,844, filed Mar. 10, 2020, 8 pages.
Notice of Allowance dated May 26, 2021, issued in connection with U.S. Appl. No. 16/927,670, filed Jul. 13, 2020, 10 pages.
Notice of Allowance dated May 28, 2021, issued in connection with U.S. Appl. No. 16/524,306, filed Jul. 29, 2019, 9 pages.
Notice of Allowance dated Mar. 29, 2021, issued in connection with U.S. Appl. No. 16/600,949, filed Oct. 14, 2019, 9 pages.
Notice of Allowance dated Jun. 3, 2021, issued in connection with U.S. Appl. No. 16/876,493, filed May 18, 2020, 7 pages.
Notice of Allowance dated Jun. 4, 2021, issued in connection with U.S. Appl. No. 16/528,265, filed Jul. 31, 2019, 17 pages.
Notice of Allowance dated Jun. 7, 2021, issued in connection with U.S. Appl. No. 16/528,224, filed Jul. 31, 2019, 9 pages.
Pre-Appeal Brief Decision mailed on Jun. 2, 2021, issued in connection with U.S. Appl. No. 16/213,570, filed Dec. 7, 2018, 2 pages.
Tsung-Hsien Wen et al: "A Network-based End-to-End Trainable Task-oriented Dialogue System", CORR ARXIV, vol. 1604.04562v1, Apr. 15, 2016, pp. 1-11, XP055396370, Stroudsburg, PA, USA.
Advisory Action dated Jun. 10, 2020, issued in connection with U.S. Appl. No. 15/936,177, filed Mar. 26, 2018, 4 pages.
Advisory Action dated Apr. 24, 2020, issued in connection with U.S. Appl. No. 15/948,541, filed Apr. 9, 2018, 4 pages.
Advisory Action dated Jun. 28, 2018, issued in connection with U.S. Appl. No. 15/438,744, filed Feb. 21, 2017, 3 pages.
Advisory Action dated Dec. 31, 2018, issued in connection with U.S. Appl. No. 15/804,776, filed Nov. 6, 2017, 4 pages.
Advisory Action dated Jun. 9, 2020, issued in connection with U.S. Appl. No. 16/145,275, filed Sep. 28, 2018, 3 pages.
Anonymous,. S Voice or Google Now—The Lowdown. Apr. 28, 2015, 9 pages. [online], [retrieved on Nov. 29, 2017]. Retrieved from the Internet (URL:http://web.archive.org/web/20160807040123/ http://lowdown.carphonewarehouse.com/news/s-voice-or-google-now/29958/).
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Patent Office, Australian Examination Report Action dated Apr. 14, 2020, issued in connection with Australian Application No. 2019202257, 3 pages.
Australian Patent Office, Australian Examination Report Action dated Oct. 3, 2019, issued in connection with Australian Application No. 2018230932, 3 pages.
Australian Patent Office, Australian Examination Report Action dated Aug. 7, 2020, issued in connection with Australian Application No. 2019236722, 4 pages.
Australian Patent Office, Examination Report dated Oct. 30, 2018, issued in connection with Australian Application No. 2017222436, 3 pages.
"Automatic Parameter Tying in Neural Networks" ICLR 2018, 14 pages.
Bertrand et al. "Adaptive Distributed Noise Reduction for Speech Enhancement in Wireless Acoustic Sensor Networks" Jan. 2010, 4 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Office Action dated Nov. 14, 2018, issued in connection with Canadian Application No. 3015491, 3 pages.
Chinese Patent Office, First Office Action and Translation dated Mar. 20, 2019, issued in connection with Chinese Application No. 201780025028.2, 18 pages.
Chinese Patent Office, First Office Action and Translation dated Mar. 27, 2019, issued in connection with Chinese Application No. 201780025029.7, 9 pages.
Chinese Patent Office, First Office Action and Translation dated Nov. 5, 2019, issued in connection with Chinese Application No. 201780072651.3, 19 pages.
Chinese Patent Office, First Office Action dated Dec. 28, 2020, issued in connection with Chinese Application No. 201880072203.8, 6 pages.
Chinese Patent Office, First Office Action dated Feb. 28, 2020, issued in connection with Chinese Application No. 201780061543.6, 29 pages.

(56) References Cited

OTHER PUBLICATIONS

Chinese Patent Office, Second Office Action and Translation dated May 11, 2020, issued in connection with Chinese Application No. 201780061543.6, 17 pages.
Chinese Patent Office, Second Office Action and Translation dated Jul. 18, 2019, issued in connection with Chinese Application No. 201780025029.7, 14 pages.
Chinese Patent Office, Second Office Action and Translation dated Sep. 23, 2019, issued in connection with Chinese Application No. 201780025028.2, 15 pages.
Chinese Patent Office, Second Office Action and Translation dated Mar. 31, 2020, issued in connection with Chinese Application No. 201780072651.3, 17 pages.
Chinese Patent Office, Third Office Action and Translation dated Sep. 16, 2019, issued in connection with Chinese Application No. 201780025029.7, 14 pages.
Chinese Patent Office, Third Office Action and Translation dated Aug. 5, 2020, issued in connection with Chinese Application No. 201780072651.3, 10 pages.
Chinese Patent Office, Translation of Office Action dated Jul. 18, 2019, issued in connection with Chinese Application No. 201780025029.7, 8 pages.
Cipriani,. The complete list of OK, Google commands—CNET. Jul. 1, 2016, 5 pages. [online], [retrieved on Jan. 15, 2020]. Retrieved from the Internet: (URL:https://web.archive.org/web/20160803230926/https://www.cnet.com/how-to/complete-list-of-ok-google--commands/).
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Nov. 25, 2020, issued in connection with European Application No. 20185599.6, 9 pages.
European Patent Office, European Extended Search Report dated Feb. 3, 2020, issued in connection with European Application No. 19197116.7, 9 pages.
European Patent Office, European Extended Search Report dated Jan. 3, 2019, issued in connection with European Application No. 177570702, 8 pages.
European Patent Office, European Extended Search Report dated Jan. 3, 2019, issued in connection with European Application No. 17757075.1, 9 pages.
European Patent Office, European Extended Search Report dated Oct. 30, 2017, issued in connection with EP Application No. 17174435.2, 11 pages.
European Patent Office, European Extended Search Report dated Aug. 6, 2020, issued in connection with European Application No. 20166332.5, 10 pages.
European Patent Office, European Office Action dated Jul. 1, 2020, issued in connection with European Application No. 17757075.1, 7 pages.
European Patent Office, European Office Action dated Jan. 14, 2020, issued in connection with European Application No. 17757070.2, 7 pages.
European Patent Office, European Office Action dated Jan. 21, 2021, issued in connection with European Application No. 17792272.1, 7 pages.
European Patent Office, European Office Action dated Jan. 22, 2019, issued in connection with European Application No. 17174435.2, 9 pages.
European Patent Office, European Office Action dated Sep. 23, 2020, issued in connection with European Application No. 18788976.1, 7 pages.
European Patent Office, European Office Action dated Oct. 26, 2020, issued in connection with European Application No. 18760101.8, 4 pages.
European Patent Office, European Office Action dated Aug. 30, 2019, issued in connection with European Application No. 17781608.9, 6 pages.
European Patent Office, European Office Action dated Sep. 9, 2020, issued in connection with European Application No. 18792656.3, 10 pages.
European Patent Office, Summons to Attend Oral Proceedings mailed on Dec. 20, 2019, issued in connection with European Application No. 17174435.2, 13 pages.
Advisory Action dated Apr. 23, 2021, issued in connection with U.S. Appl. No. 16/219,702, filed Dec. 13, 2018, 3 pages.
Anonymous: "What are the function of 4 Microphones on iPhone 6S/6S+?", ETrade Supply, Dec. 24, 2015, XP055646381, Retrieved from the Internet: URL:https://www.etradesupply.com/blog/4-microphones-iphone-6s6s-for/ [retrieved on Nov. 26, 2019].
Australian Patent Office, Australian Examination Report Action dated Apr. 7, 2021, issued in connection with Australian Application No. 2019333058, 2 pages.
Australian Patent Office, Examination Report dated Jun. 28, 2021, issued in connection with Australian Patent Application No. 2019395022, 2 pages.
Canadian Patent Office, Canadian Examination Report dated Mar. 9, 2021, issued in connection with Canadian Application No. 3067776, 5 pages.
Chinese Patent Office, Chinese Office Action and Translation dated Jul. 2, 2021, issued in connection with Chinese Application No. 201880077216.4, 22 pages.
Chinese Patent Office, Chinese Office Action and Translation dated Mar. 30, 2021, issued in connection with Chinese Application No. 202010302650.7, 15 pages.
Chinese Patent Office, First Office Action and Translation dated May 27, 2021, issued in connection with Chinese Application No. 201880026360.5, 15 pages.
European Patent Office, European EPC Article 94.3 dated Feb. 23, 2021, issued in connection with European Application No. 17200837.7, 8 pages.
European Patent Office, European EPC Article 94.3 dated Feb. 26, 2021, issued in connection with European Application No. 18789515.6, 8 pages.
Final Office Action dated Jul. 15, 2021, issued in connection with U.S. Appl. No. 16/153,530, filed Oct. 5, 2018, 22 pages.
Final Office Action dated Jun. 15, 2021, issued in connection with U.S. Appl. No. 16/819,755, filed Mar. 16, 2020, 12 pages.
Final Office Action dated Feb. 22, 2021, issued in connection with U.S. Appl. No. 15/936,177, filed Mar. 26, 2018, 20 pages.
Final Office Action dated Feb. 22, 2021, issued in connection with U.S. Appl. No. 16/213,570, filed Dec. 7, 2018, 12 pages.
Final Office Action dated Jun. 4, 2021, issued in connection with U.S. Appl. No. 16/168,389, filed Oct. 23, 2018, 38 pages.
Final Office Action dated Jun. 8, 2021, issued in connection with U.S. Appl. No. 16/271,550, filed Feb. 8, 2019, 41 pages.
First Action Interview Office Action dated Mar. 8, 2021, issued in connection with U.S. Appl. No. 16/798,967, filed Feb. 24, 2020, 4 pages.
Hans Speidel: "Chatbot Training: How to use training data to provide fully automated customer support", Jun. 29, 2017, pp. 1-3, XP055473185, Retrieved from the Internet: URL:https://www.crowdguru.de/wp-content/uploads/Case-Study-Chatbot-training-How-to-use-training-data-to-provide-fully-automated-customer-support.pdf [retrieved on May 7, 2018].
Indian Patent Office, Examination Report dated May 24, 2021, issued in connection with Indian Patent Application No. 201847035595, 6 pages.
Indian Patent Office, Examination Report dated Feb. 25, 2021, issued in connection with Indian Patent Application No. 201847035625, 6 pages.
International Bureau, International Preliminary Report on Patentability and Written Opinion, dated Apr. 1, 2021, issued in connection with International Application No. PCT/US2019/052129, filed on Sep. 20, 2019, 13 pages.

(56) References Cited

OTHER PUBLICATIONS

International Bureau, International Preliminary Report on Patentability and Written Opinion, dated Jul. 1, 2021, issued in connection with International Application No. PCT/US2019/067576, filed on Dec. 19, 2019, 8 pages.
International Bureau, International Preliminary Report on Patentability and Written Opinion, dated Apr. 15, 2021, issued in connection with International Application No. PCT/US2019/054332, filed on Oct. 2, 2019, 9 pages.
International Bureau, International Preliminary Report on Patentability and Written Opinion, dated Mar. 25, 2021, issued in connection with International Application No. PCT/US2019/050852, filed on Sep. 12, 2019, 8 pages.
International Bureau, International Preliminary Report on Patentability and Written Opinion, dated Aug. 27, 2019, issued in connection with International Application No. PCT/US2018/019010, filed on Feb. 21, 2018, 9 pages.
International Bureau, International Preliminary Report on Patentability and Written Opinion, dated Apr. 8, 2021, issued in connection with International Application No. PCT/US2019/052654, filed on Sep. 24, 2019, 7 pages.
International Bureau, International Preliminary Report on Patentability and Written Opinion, dated Apr. 8, 2021, issued in connection with International Application No. PCT/US2019/052841, filed on Sep. 25, 2019, 8 pages.
International Bureau, International Preliminary Report on Patentability and Written Opinion, dated Apr. 8, 2021, issued in connection with International Application No. PCT/US2019/053253, filed on Sep. 26, 2019, 10 pages.
International Bureau, International Preliminary Report on Patentability, dated Jun. 17, 2021, issued in connection with International Application No. PCT/US2019/064907, filed on Dec. 6, 2019, 8 pages.
International Bureau, International Preliminary Report on Patentability, dated Mar. 2, 2021, issued in connection with International Application No. PCT/US2019/048558, filed on Aug. 28, 2019, 8 pages.
International Bureau, International Search Report and Written Opinion dated Dec. 11, 2019, issued in connection with International Application No. PCT/US2019/052129, filed on Sep. 20, 2019, 18 pages.
International Bureau, International Search Report and Written Opinion dated Nov. 13, 2018, issued in connection with International Application No. PCT/US2018/045397, filed on Aug. 6, 2018, 11 pages.
International Bureau, International Search Report and Written Opinion dated Jan. 14, 2019, issued in connection with International Application No. PCT/US2018053472, filed on Sep. 28, 2018, 10 pages.
International Bureau, International Search Report and Written Opinion dated Jul. 17, 2019, issued in connection with International Application No. PCT/US2019/032934, filed on May 17, 2019, 17 pages.
International Bureau, International Search Report and Written Opinion dated Nov. 18, 2019, issued in connection with International Application No. PCT/US2019/048558, filed on Aug. 28, 2019, 11 pages.
International Bureau, International Search Report and Written Opinion dated Apr. 23, 2021, issued in connection with International Application No. PCT/US2021/070007, filed on Jan. 6, 2021, 11 pages.
International Bureau, International Search Report and Written Opinion dated Jul. 24, 2018, issued in connection with International Application No. PCT/US2018/019010, filed on Feb. 21, 2018, 12 pages.
International Bureau, International Search Report and Written Opinion, dated Feb. 27, 2019, issued in connection with International Application No. PCT/US2018/053123, filed on Sep. 27, 2018, 16 pages.
International Bureau, International Search Report and Written Opinion dated Sep. 27, 2019, issued in connection with International Application No. PCT/US2019/039828, filed on Jun. 28, 2019, 13 pages.
International Bureau, International Search Report and Written Opinion dated Nov. 29, 2019, issued in connection with International Application No. PCT/US2019/053523, filed on Sep. 29, 2019, 14 pages.
International Bureau, International Search Report and Written Opinion dated Sep. 4, 2019, issued in connection with International Application No. PCT/US2019/033945, filed on May 24, 2019, 8 pages.
Japanese Patent Office, Decision of Refusal and Translation dated Jun. 8, 2021, issued in connection with Japanese Patent Application No. 2019-073348, 5 pages.
Japanese Patent Office, Notice of Reasons for Refusal and Translation dated Jun. 22, 2021, issued in connection with Japanese Patent Application No. 2020-517935, 4 pages.
Japanese Patent Office, Office Action and Translation dated Mar. 16, 2021, issued in connection with Japanese Patent Application No. 2020-506725, 7 pages.
Japanese Patent Office, Office Action and Translation dated Apr. 20, 2021, issued in connection with Japanese Patent Application No. 2020-513852, 9 pages.
Japanese Patent Office, Office Action and Translation dated Feb. 24, 2021, issued in connection with Japanese Patent Application No. 2019-517281, 4 pages.
Japanese Patent Office, Office Action and Translation dated Apr. 27, 2021, issued in connection with Japanese Patent Application No. 2020-518400, 10 pages.
Japanese Patent Office, Office Action and Translation dated Jul. 6, 2021, issued in connection with Japanese Patent Application No. 2019-073349, 6 pages.
Joseph Szurley et al, "Efficient computation of microphone utility in a wireless acoustic sensor network with multi-channel Wiener filter based noise reduction", 2012 IEEE International Conference on Acoustics, Speech and Signal Processing, Kyoto, Japan, Mar. 25-30, 2012, pp. 2657-2660, XP032227701, DOI: 10.1109/ICASSP .2012. 6288463 ISBN: 978-1-4673-0045-2.
Korean Patent Office, Korean Examination Report and Translation dated Apr. 26, 2021, issued in connection with Korean Application No. 10-2021-7008937, 15 pages.
Notice of Allowance dated Dec. 12, 2018, issued in connection with U.S. Appl. No. 15/811,468, filed Nov. 13, 2017, 9 pages.
Notice of Allowance dated Jul. 12, 2017, issued in connection with U.S. Appl. No. 15/098,805, filed Apr. 14, 2016, 8 pages.
Notice of Allowance dated Jun. 12, 2019, issued in connection with U.S. Appl. No. 15/670,361, filed Aug. 7, 2017, 7 pages.
Notice of Allowance dated Sep. 12, 2018, issued in connection with U.S. Appl. No. 15/438,744, filed Feb. 21, 2017, 15 pages.
Notice of Allowance dated Dec. 13, 2017, issued in connection with U.S. Appl. No. 15/784,952, filed Oct. 16, 2017, 9 pages.
Notice of Allowance dated Feb. 13, 2019, issued in connection with U.S. Appl. No. 15/959,907, filed Apr. 23, 2018, 10 pages.
Notice of Allowance dated Jan. 13, 2020, issued in connection with U.S. Appl. No. 16/192,126, filed Nov. 15, 2018, 6 pages.
Notice of Allowance dated Jan. 13, 2021, issued in connection with U.S. Appl. No. 16/539,843, filed Aug. 13, 2019, 5 pages.
Notice of Allowance dated Nov. 13, 2020, issued in connection with U.S. Appl. No. 16/131,409, filed Sep. 14, 2018, 11 pages.
Notice of Allowance dated Aug. 14, 2017, issued in connection with U.S. Appl. No. 15/098,867, filed Apr. 14, 2016, 10 pages.
Notice of Allowance dated Aug. 14, 2020, issued in connection with U.S. Appl. No. 16/598,125, filed Oct. 10, 2019, 5 pages.
Notice of Allowance dated Feb. 14, 2017, issued in connection with U.S. Appl. No. 15/229,855, filed Aug. 5, 2016, 11 pages.
Notice of Allowance dated Jan. 14, 2021, issued in connection with U.S. Appl. No. 17/087,423, filed Nov. 2, 2020, 8 pages.
Notice of Allowance dated Jun. 14, 2017, issued in connection with U.S. Appl. No. 15/282,554, filed Sep. 30, 2016, 11 pages.
Notice of Allowance dated Nov. 14, 2018, issued in connection with U.S. Appl. No. 15/297,627, filed Oct. 19, 2016, 5 pages.

(56) References Cited

OTHER PUBLICATIONS

Notice of Allowance dated Dec. 15, 2017, issued in connection with U.S. Appl. No. 15/223,218, filed Jul. 29, 2016, 7 pages.
Notice of Allowance dated Jan. 15, 2020, issued in connection with U.S. Appl. No. 16/439,009, filed Jun. 12, 2019, 9 pages.
Notice of Allowance dated Mar. 15, 2019, issued in connection with U.S. Appl. No. 15/804,776, filed Nov. 6, 2017, 9 pages.
Notice of Allowance dated Oct. 15, 2019, issued in connection with U.S. Appl. No. 16/437,437, filed Jun. 11, 2019, 9 pages.
Notice of Allowance dated Oct. 15, 2020, issued in connection with U.S. Appl. No. 16/715,713, filed Dec. 16, 2019, 9 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Feb. 17, 2021, issued in connection with U.S. Appl. No. 16/715,984, filed Dec. 16, 2019, 8 pages.
Notice of Allowance dated Jul. 17, 2019, issued in connection with U.S. Appl. No. 15/718,911, filed Sep. 28, 2017, 5 pages.
Notice of Allowance dated Jun. 17, 2020, issued in connection with U.S. Appl. No. 16/141,875, filed Sep. 25, 2018, 6 pages.
Notice of Allowance dated Sep. 17, 2018, issued in connection with U.S. Appl. No. 15/211,689, filed Jul. 15, 2016, 6 pages.
Notice of Allowance dated Apr. 18, 2019, issued in connection with U.S. Appl. No. 16/173,797, filed Oct. 29, 2018, 9 pages.
Notice of Allowance dated Dec. 18, 2019, issued in connection with U.S. Appl. No. 16/434,426, filed Jun. 7, 2019, 13 pages.
Notice of Allowance dated Feb. 18, 2020, issued in connection with U.S. Appl. No. 16/022,662, filed Jun. 28, 2018, 8 pages.
Notice of Allowance dated Jul. 18, 2019, issued in connection with U.S. Appl. No. 15/438,749, filed Feb. 21, 2017, 9 pages.
Notice of Allowance dated Jul. 18, 2019, issued in connection with U.S. Appl. No. 15/721,141, filed Sep. 29, 2017, 8 pages.
Notice of Allowance dated Aug. 19, 2020, issued in connection with U.S. Appl. No. 16/271,560, filed Feb. 8, 2019, 9 pages.
Notice of Allowance dated Dec. 19, 2018, issued in connection with U.S. Appl. No. 15/818,051, filed Nov. 20, 2017, 9 pages.
Notice of Allowance dated Jul. 19, 2018, issued in connection with U.S. Appl. No. 15/681,937, filed Aug. 21, 2017, 7 pages.
Notice of Allowance dated Aug. 2, 2019, issued in connection with U.S. Appl. No. 16/102,650, filed Aug. 13, 2018, 5 pages.
Notice of Allowance dated Dec. 2, 2020, issued in connection with U.S. Appl. No. 15/989,715, filed May 25, 2018, 11 pages.
Notice of Allowance dated Sep. 2, 2020, issued in connection with U.S. Appl. No. 16/214,711, filed Dec. 10, 2018, 9 pages.
Notice of Allowance dated Jul. 20, 2020, issued in connection with U.S. Appl. No. 15/984,073, filed May 18, 2018, 12 pages.
Notice of Allowance dated Mar. 20, 2018, issued in connection with U.S. Appl. No. 15/784,952, filed Oct. 16, 2017, 7 pages.
Notice of Allowance dated Sep. 20, 2018, issued in connection with U.S. Appl. No. 15/946,599, filed Apr. 5, 2018, 7 pages.
Notice of Allowance dated Feb. 21, 2020, issued in connection with U.S. Appl. No. 16/416,752, filed May 20, 2019, 6 pages.
Notice of Allowance dated Jan. 21, 2020, issued in connection with U.S. Appl. No. 16/672,764, filed Nov. 4, 2019, 10 pages.
Notice of Allowance dated Jan. 21, 2021, issued in connection with U.S. Appl. No. 16/600,644, filed Oct. 14, 2019, 7 pages.
Notice of Allowance dated Oct. 21, 2019, issued in connection with U.S. Appl. No. 15/946,585, filed Apr. 5, 2018, 5 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Jul. 22, 2020, issued in connection with U.S. Appl. No. 16/131,409, filed Sep. 14, 2018, 13 pages.
Notice of Allowance dated Jul. 22, 2020, issued in connection with U.S. Appl. No. 16/790,621, filed Feb. 13, 2020, 10 pages.
Notice of Allowance dated Apr. 24, 2019, issued in connection with U.S. Appl. No. 16/154,469, filed Oct. 3, 2018, 5 pages.
Notice of Allowance dated Aug. 26, 2020, issued in connection with U.S. Appl. No. 15/948,541, filed Apr. 9, 2018, 9 pages.
International Bureau, International Search Report and Written Opinion dated Jul. 14, 2020, issued in connection with International Application No. PCT/US2020/017150, filed on Feb. 7, 2020, 27 pages.
International Bureau, International Search Report and Written Opinion dated Nov. 18, 2019, issued in connection with International Application No. PCT/US2019052841, filed on Sep. 25, 2019, 12 pages.
International Bureau, International Search Report and Written Opinion dated Mar. 2, 2020, issued in connection with International Application No. PCT/US2019064907, filed on Dec. 6, 2019, 11 pages.
International Bureau, International Search Report and Written Opinion dated Dec. 20, 2019, issued in connection with International Application No. PCT/US2019052654, filed on Sep. 24, 2019, 11 pages.
International Bureau, International Search Report and Written Opinion dated Sep. 21, 2020, issued in connection with International Application No. PCT/US2020/037229, filed on Jun. 11, 2020, 17 pages.
International Bureau, International Search Report and Written Opinion dated Dec. 6, 2019, issued in connection with International Application No. PCT/US2019050852, filed on Sep. 12, 2019, 10 pages.
International Bureau, International Search Report and Written Opinion dated Apr. 8, 2020, issued in connection with International Application No. PCT/US2019/067576, filed on Dec. 19, 2019, 12 pages.
International Searching Authority, International Search Report and Written Opinion dated Dec. 19, 2018, in connection with International Application No. PCT/US2018/053517, 13 pages.
International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated Jan. 23, 2018, issued in connection with International Application No. PCT/US2017/57220, filed on Oct. 18, 2017, 8 pages.
International Searching Authority, International Search Report and Written Opinion dated May 23, 2017, issued in connection with International Application No. PCT/US2017/018739, Filed on Feb. 21, 2017, 10 pages.
International Searching Authority, International Search Report and Written Opinion dated Oct. 23, 2017, issued in connection with International Application No. PCT/US2017/042170, filed on Jul. 14, 2017, 15 pages.
International Searching Authority, International Search Report and Written Opinion dated Oct. 24, 2017, issued in connection with International Application No. PCT/US2017/042227, filed on Jul. 14, 2017, 16 pages.
International Searching Authority, International Search Report and Written Opinion dated May 30, 2017, issued in connection with International Application No. PCT/US2017/018728, Filed on Feb. 21, 2017, 11 pages.
Japanese Patent Office, English Translation of Office Action dated Nov. 17, 2020, issued in connection with Japanese Application No. 2019-145039, 5 pages.
Japanese Patent Office, English Translation of Office Action dated Aug. 27, 2020, issued in connection with Japanese Application No. 2019-073349, 6 pages.
Japanese Patent Office, English Translation of Office Action dated Jul. 30, 2020, issued in connection with Japanese Application No. 2019-517281, 26 pages.
Japanese Patent Office, Non-Final Office Action and Translation dated Nov. 5, 2019, issued in connection with Japanese Patent Application No. 2019-517281, 6 pages.
Japanese Patent Office, Office Action and Translation dated Nov. 17, 2020, issued in connection with Japanese Patent Application No. 2019-145039, 7 pages.

(56) References Cited

OTHER PUBLICATIONS

Japanese Patent Office, Office Action and Translation dated Aug. 27, 2020, issued in connection with Japanese Patent Application No. 2019-073349, 6 pages.
Japanese Patent Office, Office Action and Translation dated Jul. 30, 2020, issued in connection with Japanese Patent Application No. 2019-517281, 6 pages.
Japanese Patent Office, Office Action and Translation dated Jul. 6, 2020, issued in connection with Japanese Patent Application No. 2019-073348, 10 pages.
Japanese Patent Office, Office Action and Translation dated Oct. 8, 2019, issued in connection with Japanese Patent Application No. 2019-521032, 5 pages.
Japanese Patent Office, Office Action Translation dated Nov. 5, 2019, issued in connection with Japanese Patent Application No. 2019-517281, 2 pages.
Japanese Patent Office, Office Action Translation dated Oct. 8, 2019, issued in connection with Japanese Patent Application No. 2019-521032, 8 pages.
Jo et al., "Synchronized One-to-many Media Streaming with Adaptive Playout Control," Proceedings of SPIE, 2002, pp. 71-82, vol. 4861.
Johnson, "Implementing Neural Networks into Modern Technology," IJCNN'99. International Joint Conference on Neural Networks . Proceedings [Cat. No. 99CH36339], Washington, DC, USA, 1999, pp. 1028-1032, vol. 2, doi: 10.1109/IJCNN.1999.831096. [retrieved on Jun. 22, 2020].
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Jose Alvarez and Mathieu Salzmann "Compression-aware Training of Deep Networks" 31st Conference on Neural Information Processing Systems, Nov. 13, 2017, 12pages.
Korean Patent Office, Korean Office Action and Translation dated Aug. 16, 2019, issued in connection with Korean Application No. 10-2018-7027452, 14 pages.
Korean Patent Office, Korean Office Action and Translation dated Apr. 2, 2020, issued in connection with Korean Application No. 10-2020-7008486, 12 pages.
Korean Patent Office, Korean Office Action and Translation dated Mar. 25, 2020, issued in connection with Korean Application No. 10-2019-7012192, 14 pages.
Korean Patent Office, Korean Office Action and Translation dated Aug. 26, 2020, issued in connection with Korean Application No. 10-2019-7027640, 16 pages.
Korean Patent Office, Korean Office Action and Translation dated Mar. 30, 2020, issued in connection with Korean Application No. 10-2020-7004425, 5 pages.
Korean Patent Office, Korean Office Action and Translation dated Jan. 4, 2021, issued in connection with Korean Application No. 10-2020-7034425, 14 pages.
Korean Patent Office, Korean Office Action and Translation dated Sep. 9, 2019, issued in connection with Korean Application No. 10-2018-7027451, 21 pages.
Korean Patent Office, Korean Office Action dated May 8, 2019, issued in connection with Korean Application No. 10-2018-7027451, 7 pages.
Korean Patent Office, Korean Office Action dated May 8, 2019, issued in connection with Korean Application No. 10-2018-7027452, 5 pages.
Louderback, Jim, "Affordable Audio Receiver Furnishes Homes With MP3," TechTV Vault. Jun. 28, 2000 retrieved Jul. 10, 2014, 2 pages.
Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 4-6, 2012, 4pages.

Morales-Cordovilla et al. "Room Localization for Distant Speech Recognition," Proceedings of Interspeech 2014, Sep. 14, 2014, 4 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Non-Final Office Action dated Dec. 21, 2020, issued in connection with U.S. Appl. No. 16/153,530, filed Oct. 5, 2018, 22 pages.
Non-Final Office Action dated Dec. 9, 2020, issued in connection with U.S. Appl. No. 16/271,550, filed Feb. 8, 2019, 35 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Nov. 4, 2019, issued in connection with U.S. Appl. No. 16/022,662, filed Jun. 28, 2018, 16 pages.
Non-Final Office Action dated Sep. 23, 2020, issued in connection with U.S. Appl. No. 16/177,185, filed Oct. 31, 2018, 17 pages.
Non-Final Office Action dated Aug. 24, 2017, issued in connection with U.S. Appl. No. 15/297,627, filed Oct. 19, 2016, 13 pages.
Non-Final Office Action dated Jul. 24, 2019, issued in connection with U.S. Appl. No. 16/439,009, filed Jun. 12, 2019, 26 pages.
Non-Final Office Action dated Jul. 25, 2017, issued in connection with U.S. Appl. No. 15/273,679, filed Jul. 22, 2016, 11 pages.
Non-Final Office Action dated Dec. 26, 2018, issued in connection with U.S. Appl. No. 16/154,469, filed Oct. 8, 2018, 7 pages.
Non-Final Office Action dated Jan. 26, 2017, issued in connection with U.S. Appl. No. 15/098,867, filed Apr. 14, 2016, 16 pages.
Non-Final Office Action dated Oct. 26, 2017, issued in connection with U.S. Appl. No. 15/438,744, filed Feb. 21, 2017, 12 pages.
Non-Final Office Action dated Jun. 27, 2018, issued in connection with U.S. Appl. No. 15/438,749, filed Feb. 21, 2017, 16 pages.
Non-Final Office Action dated Jun. 27, 2019, issued in connection with U.S. Appl. No. 16/437,437, filed Jun. 11, 2019, 8 pages.
Non-Final Office Action dated Jun. 27, 2019, issued in connection with U.S. Appl. No. 16/437,476, filed Jun. 11, 2019, 8 pages.
Non-Final Office Action dated Mar. 27, 2020, issued in connection with U.S. Appl. No. 16/790,621, filed Feb. 13, 2020, 8 pages.
Non-Final Office Action dated May 27, 2020, issued in connection with U.S. Appl. No. 16/715,713, filed Dec. 16, 2019, 14 pages.
Non-Final Office Action dated Oct. 27, 2020, issued in connection with U.S. Appl. No. 16/213,570, filed Dec. 7, 2018, 13 pages.
Non-Final Office Action dated Oct. 27, 2020, issued in connection with U.S. Appl. No. 16/715,984, filed Dec. 16, 2019, 14 pages.
Non-Final Office Action dated Oct. 27, 2020, issued in connection with U.S. Appl. No. 16/819,755, filed Mar. 16, 2020, 8 pages.
Non-Final Office Action dated Oct. 28, 2019, issued in connection with U.S. Appl. No. 16/145,275, filed Sep. 28, 2018, 11 pages.
Non-Final Office Action dated Mar. 29, 2019, issued in connection with U.S. Appl. No. 16/102,650, filed Aug. 13, 2018, 11 pages.
Non-Final Office Action dated Sep. 29, 2020, issued in connection with U.S. Appl. No. 16/402,617, filed May 3, 2019, 12 pages.
Non-Final Office Action dated Dec. 3, 2020, issued in connection with U.S. Appl. No. 16/145,275, filed Sep. 28, 2018, 11 pages.
Non-Final Office Action dated Jul. 3, 2019, issued in connection with U.S. Appl. No. 15/948,541, filed Apr. 9, 2018, 7 pages.
Non-Final Office Action dated May 3, 2019, issued in connection with U.S. Appl. No. 16/178,122, filed Nov. 1, 2018, 14 pages.
Non-Final Office Action dated Oct. 3, 2018, issued in connection with U.S. Appl. No. 16/102,153, filed Aug. 13, 2018, 20 pages.
Non-Final Office Action dated Apr. 30, 2019, issued in connection with U.S. Appl. No. 15/718,521, filed Sep. 28, 2017, 39 pages.
Non-Final Office Action dated Jun. 30, 2017, issued in connection with U.S. Appl. No. 15/277,810, filed Sep. 27, 2016, 13 pages.
Non-Final Office Action dated Apr. 4, 2019, issued in connection with U.S. Appl. No. 15/718,911, filed Sep. 28, 2017, 21 pages.

(56) References Cited

OTHER PUBLICATIONS

Non-Final Office Action dated Aug. 4, 2020, issued in connection with U.S. Appl. No. 16/600,644, filed Oct. 14, 2019, 30 pages.
Non-Final Office Action dated Jan. 4, 2019, issued in connection with U.S. Appl. No. 15/948,541, filed Apr. 9, 2018, 6 pages.
Non-Final Office Action dated Apr. 6, 2020, issued in connection with U.S. Appl. No. 16/424,825, filed May 29, 2019, 22 pages.
Non-Final Office Action dated Feb. 6, 2018, issued in connection with U.S. Appl. No. 15/211,689, filed Jul. 15, 2016, 32 pages.
Non-Final Office Action daed Feb. 6, 2018, issued in connection with U.S. Appl. No. 15/237,133, filed Aug. 15, 2016, 6 pages.
Non-Final Office Action dated Jan. 6, 2021, issued in connection with U.S. Appl. No. 16/439,046, filed Jun. 12, 2019, 13 pages.
Non-Final Office Action dated Mar. 6, 2020, issued in connection with U.S. Appl. No. 16/141,875, filed Sep. 25, 2018, 8 pages.
Non-Final Office Action dated Sep. 6, 2017, issued in connection with U.S. Appl. No. 15/131,254, filed Apr. 18, 2016, 13 pages.
Non-Final Office Action dated Sep. 6, 2018, issued in connection with U.S. Appl. No. 15/098,760, filed Apr. 14, 2016, 29 pages.
Non-Final Office Action dated Sep. 8, 2020, issued in connection with U.S. Appl. No. 15/936,177, filed Mar. 26, 2018, 19 pages.
Non-Final Office Action dated Apr. 9, 2018, issued in connection with U.S. Appl. No. 15/804,776, filed Nov. 6, 2017, 18 pages.
Non-Final Office Action dated Feb. 9, 2021, issued in connection with U.S. Appl. No. 16/806,747, filed Mar. 2, 2020, 16 pages.
Non-Final Office Action dated May 9, 2018, issued in connection with U.S. Appl. No. 15/818,051, filed Nov. 20, 2017, 22 pages.
Non-Final Office Action dated Sep. 9, 2020, issued in connection with U.S. Appl. No. 16/168,389, filed Oct. 23, 2018, 29 pages.
Notice of Allowance dated Dec. 2, 2019, issued in connection with U.S. Appl. No. 15/718,521, filed Sep. 28, 2017, 15 pages.
Notice of Allowance dated Dec. 4, 2017, issued in connection with U.S. Appl. No. 15/277,810, filed Sep. 27, 2016, 5 pages.
Notice of Allowance dated Jul. 5, 2018, issued in connection with U.S. Appl. No. 15/237,133, filed Aug. 15, 2016, 5 pages.
Notice of Allowance dated Jul. 9, 2018, issued in connection with U.S. Appl. No. 15/438,741, filed Feb. 21, 2017, 5 pages.
Notice of Allowance dated Apr. 1, 2019, issued in connection with U.S. Appl. No. 15/935,966, filed Mar. 26, 2018, 5 pages.
Notice of Allowance dated Aug. 1, 2018, issued in connection with U.S. Appl. No. 15/297,627, filed Oct. 19, 2016, 9 pages.
Notice of Allowance dated Aug. 10, 2020, issued in connection with U.S. Appl. No. 16/424,825, filed May 29, 2019, 9 pages.
Notice of Allowance dated Feb. 10, 2021, issued in connection with U.S. Appl. No. 16/138,111, filed Sep. 21, 2018, 8 pages.
Notice of Allowance dated Apr. 11, 2018, issued in connection with U.S. Appl. No. 15/719,454, filed Sep. 28, 2017, 15 pages.
Notice of Allowance dated Oct. 11, 2019, issued in connection with U.S. Appl. No. 16/437,476, filed Jun. 11, 2019, 9 pages.
Notice of Allowance dated Sep. 11, 2019, issued in connection with U.S. Appl. No. 16/154,071, filed Oct. 8, 2018, 5 pages.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
Fadilpasic,"Cortana can now be the default PDA on your Android", IT Pro Portal: Accessed via WayBack Machine; http://web.archive.org/web/20171129124915/https://www.itproportal.com/2015/08/11/cortana-can-now-be- . . . ., Aug. 11, 2015, 6 pages.
Final Office Action dated Oct. 6, 2017, issued in connection with U.S. Appl. No. 15/098,760, filed Apr. 14, 2016, 25 pages.
Final Office Action dated Feb. 10, 2021, issued in connection with U.S. Appl. No. 16/219,702, filed Dec. 13, 2018, 9 pages.
Final Office Action dated Feb. 10, 2021, issued in connection with U.S. Appl. No. 16/402,617, filed May 3, 2019, 13 pages.
Final Office Action dated Nov. 10, 2020, issued in connection with U.S. Appl. No. 16/600,644, filed Oct. 14, 2019, 19 pages.
Final Office Action dated Apr. 11, 2019, issued in connection with U.S. Appl. No. 15/131,254, filed Apr. 18, 2016, 17 pages.
Final Office Action dated Aug. 11, 2017, issued in connection with U.S. Appl. No. 15/131,776, filed Apr. 18, 2016, 7 pages.
Final Office Action dated Dec. 11, 2019, issued in connection with U.S. Appl. No. 16/227,308, filed Dec. 20, 2018, 10 pages.
Final Office Action dated Sep. 11, 2019, issued in connection with U.S. Appl. No. 16/178,122, filed Nov. 1, 2018, 13 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Final Office Action dated May 13, 2020, issued in connection with U.S. Appl. No. 16/153,530, filed Oct. 5, 2018, 20 pages.
Final Office Action dated Jun. 15, 2017, issued in connection with U.S. Appl. No. 15/098,718, filed Apr. 14, 2016, 15 pages.
Final Office Action dated Oct. 15, 2018, issued in connection with U.S. Appl. No. 15/804,776, filed Nov. 6, 2017, 18 pages.
Final Office Action dated Oct. 15, 2020, issued in connection with U.S. Appl. No. 16/109,375, filed Aug. 22, 2018, 9 pages.
Final Office Action dated Oct. 16, 2018, issued in connection with U.S. Appl. No. 15/438,725, filed Feb. 21, 2017, 10 pages.
Final Office Action dated May 18, 2020, issued in connection with U.S. Appl. No. 16/177,185, filed Oct. 31, 2018, 16 pages.
Final Office Action dated Feb. 21, 2018, issued in connection with U.S. Appl. No. 15/297,627, filed Oct. 19, 2016, 12 pages.
Final Office Action dated May 21, 2020, issued in connection with U.S. Appl. No. 15/989,715, filed May 25, 2018, 21 pages.
Final Office Action dated Jun. 22, 2020, issued in connection with U.S. Appl. No. 16/179,779, filed Nov. 2, 2018, 16 pages.
Final Office Action dated Mar. 23, 2020, issued in connection with U.S. Appl. No. 16/145,275, filed Sep. 28, 2018, 11 pages.
Final Office Action dated Feb. 24, 2020, issued in connection with U.S. Appl. No. 15/936,177, filed Mar. 26, 2018, 20 pages.
Final Office Action dated Apr. 26, 2019, issued in connection with U.S. Appl. No. 15/721,141, filed Sep. 29, 2017, 20 pages.
Final Office Action dated Apr. 30, 2019, issued in connection with U.S. Appl. No. 15/098,760, filed Apr. 14, 2016, 6 pages.
Final Office Action dated Feb. 5, 2019, issued in connection with U.S. Appl. No. 15/438,749, filed Feb. 21, 2017, 17 pages.
Final Office Action dated Feb. 7, 2020, issued in connection with U.S. Appl. No. 15/948,541, filed Apr. 9, 2018, 8 pages.
Final Office Action dated Sep. 8, 2020, issued in connection with U.S. Appl. No. 16/213,570, filed Dec. 7, 2018, 12 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
First Action Interview Office Action dated Aug. 14, 2019, issued in connection with U.S. Appl. No. 16/227,308, filed Dec. 20, 2018, 4 pages.
First Action Interview Office Action dated Jun. 15, 2020, issued in connection with U.S. Appl. No. 16/213,570, filed Dec. 7, 2018, 4 pages.
First Action Interview Office Action dated Jun. 2, 2020, issued in connection with U.S. Appl. No. 16/109,375, filed Aug. 22, 2018, 10 pages.
First Action Interview Office Action dated Jan. 22, 2020, issued in connection with U.S. Appl. No. 15/989,715, filed May 25, 2018, 3 pages.
First Action Interview Office Action dated Jul. 5, 2019, issued in connection with U.S. Appl. No. 16/227,308, filed Dec. 20, 2018, 4 pages.
Freiberger, Karl, "Development and Evaluation of Source Localization Algorithms for Coincident Microphone Arrays," Diploma Thesis, Apr. 1, 2010, 106 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.

(56) References Cited

OTHER PUBLICATIONS

Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
Han et al. "Deep Compression: Compressing Deep Neural Networks with Pruning, Trained Quantization and Huffman Coding." ICLR 2016, Feb. 15, 2016, 14 pages.
Helwani et al "Source-domain adaptive filtering for MIMO systems with application to acoustic echo cancellation", Acoustics Speech and Signal Processing, 2010 IEEE International Conference, Mar. 14, 2010, 4 pages.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
International Bureau, International Preliminary Report on Patentability and Written Opinion, dated Dec. 10, 2020, issued in connection with International Application No. PCT/US2019/033945, filed on May 25, 2018, 7 pages.
International Bureau, International Preliminary Report on Patentability and Written Opinion, dated Jan. 7, 2021, issued in connection with International Application No. PCT/US2019/039828, filed on Jun. 28, 2019, 11 pages.
International Bureau, International Preliminary Report on Patentability, dated Apr. 11, 2019, issued in connection with International Application No. PCT/US2017/0054063, filed on Sep. 28, 2017, 9 pages.
International Bureau, International Preliminary Report on Patentability, dated Feb. 20, 2020, issued in connection with International Application No. PCT/US2018/045397, filed on Aug. 6, 2018, 8 pages.
International Bureau, International Preliminary Report on Patentability, dated Apr. 23, 2019, issued in connection with International Application No. PCT/US2017/057220, filed on Oct. 18, 2017, 7 pages.
International Bureau, International Preliminary Report on Patentability, dated Mar. 31, 2020, issued in connection with International Application No. PCT/US2018053123, filed on Sep. 27, 2018, 12 pages.
International Bureau, International Preliminary Report on Patentability, dated Mar. 31, 2020, issued in connection with International Application No. PCT/US2018053472, filed on Sep. 28, 2018, 8 pages.
International Bureau, International Preliminary Report on Patentability, dated Mar. 31, 2020, issued in connection with International Application No. PCT/US2018053517, filed on Sep. 28, 2018, 10 pages.
International Bureau, International Preliminary Report on Patentability, dated Sep. 7, 2018, issued in connection with International Application No. PCT/US2017/018728, filed on Feb. 21, 2017, 8 pages.
International Bureau, International Preliminary Report on Patentability, dated Sep. 7, 2018, issued in connection with International Application No. PCT/US2017/018739, filed on Feb. 21, 2017, 7 pages.
International Bureau, International Search Report and Written Opinion dated Nov. 10, 2020, issued in connection with International Application No. PCT/US2020/044250, filed on Jul. 30, 2020, 15 pages.
Non-Final Office Action dated Sep. 5, 2019, issued in connection with U.S. Appl. No. 16/416,752, filed May 20, 2019, 14 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Oct. 9, 2019, issued in connection with U.S. Appl. No. 15/936,177, filed Mar. 26, 2018, 16 pages.
Non-Final Office Action dated Jul. 1, 2020, issued in connection with U.S. Appl. No. 16/138,111, filed Sep. 21, 2018, 14 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/438,725, filed Feb. 21, 2017, 15 pages.
Non-Final Office Action dated Sep. 10, 2018, issued in connection with U.S. Appl. No. 15/670,361, filed Aug. 7, 2017, 17 pages.
Non-Final Office Action dated Feb. 11, 2021, issued in connection with U.S. Appl. No. 16/876,493, filed May 18, 2020, 16 pages.
Non-Final Office Action dated Oct. 11, 2019, issued in connection with U.S. Appl. No. 16/177,185, filed Oct. 31, 2018, 14 pages.
Non-Final Office Action dated Sep. 11, 2020, issued in connection with U.S. Appl. No. 15/989,715, filed May 25, 2018, 8 pages.
Non-Final Office Action dated Sep. 11, 2020, issued in connection with U.S. Appl. No. 16/219,702, filed Dec. 13, 2018, 9 pages.
Non-Final Office Action dated Dec. 12, 2016, issued in connection with U.S. Appl. No. 15/098,718, filed Apr. 14, 2016, 11 pages.
Non-Final Office Action dated Feb. 12, 2019, issued in connection with U.S. Appl. No. 15/670,361, filed Aug. 7, 2017, 13 pages.
Non-Final Office Action dated Jan. 13, 2017, issued in connection with U.S. Appl. No. 15/098,805, filed Apr. 14, 2016, 11 pages.
Non-Final Office Action dated Nov. 13, 2018, issued in connection with U.S. Appl. No. 15/717,621, filed Sep. 27, 2017, 23 pages.
Non-Final Office Action dated Nov. 13, 2018, issued in connection with U.S. Appl. No. 16/160,107, filed Oct. 15, 2018, 8 pages.
Non-Final Office Action dated Nov. 13, 2019, issued in connection with U.S. Appl. No. 15/984,073, filed May 18, 2018, 18 pages.
Non-Final Office Action dated May 14, 2020, issued in connection with U.S. Appl. No. 15/948,541, filed Apr. 9, 2018, 8 pages.
Non-Final Office Action dated Sep. 14, 2017, issued in connection with U.S. Appl. No. 15/178,180, filed Jun. 9, 2016, 16 pages.
Non-Final Office Action dated Sep. 14, 2018, issued in connection with U.S. Appl. No. 15/959,907, filed Apr. 23, 2018, 15 pages.
Non-Final Office Action dated Apr. 15, 2020, issued in connection with U.S. Appl. No. 16/138,111, filed Sep. 21, 2018, 15 pages.
Non-Final Office Action dated Dec. 15, 2020, issued in connection with U.S. Appl. No. 17/087,423, filed Nov. 2, 2020, 7 pages.
Non-Final Office Action dated Jan. 15, 2019, issued in connection with U.S. Appl. No. 16/173,797, filed Oct. 29, 2018, 6 pages.
Non-Final Office Action dated Nov. 15, 2019, issued in connection with U.S. Appl. No. 16/153,530, filed Oct. 5, 2018, 17 pages.
Non-Final Office Action dated Mar. 16, 2018, issued in connection with U.S. Appl. No. 15/681,937, filed Aug. 21, 2017, 5 pages.
Non-Final Office Action dated Oct. 16, 2018, issued in connection with U.S. Appl. No. 15/131,254, filed Apr. 18, 2016, 16 pages.
Non-Final Office Action dated Sep. 17, 2020, issued in connection with U.S. Appl. No. 16/600,949, filed Oct. 14, 2019, 29 pages.
Non-Final Office Action dated Apr. 18, 2018, issued in connection with U.S. Appl. No. 15/811,468, filed Nov. 13, 2017, 14 pages.
Non-Final Office Action dated Jan. 18, 2019, issued in connection with U.S. Appl. No. 15/721,141, filed Sep. 29, 2017, 18 pages.
Non-Final Office Action dated Oct. 18, 2019, issued in connection with U.S. Appl. No. 15/098,760, filed Apr. 14, 2016, 27 pages.
Non-Final Office Action dated Sep. 18, 2019, issued in connection with U.S. Appl. No. 16/179,779, filed Nov. 2, 2018, 14 pages.
Non-Final Office Action dated Apr. 19, 2017, issued in connection with U.S. Appl. No. 15/131,776, filed Apr. 18, 2016, 12 pages.
Non-Final Office Action dated Dec. 19, 2019, issued in connection with U.S. Appl. No. 16/147,710, filed Sep. 29, 2018, 10 pages.
Non-Final Office Action dated Feb. 19, 2020, issued in connection with U.S. Appl. No. 16/148,879, filed Oct. 1, 2018, 15 pages.
Non-Final Office Action dated Sep. 2, 2020, issued in connection with U.S. Appl. No. 16/290,599, filed Mar. 1, 2019, 17 pages.
Non-Final Office Action dated Feb. 20, 2018, issued in connection with U.S. Appl. No. 15/211,748, filed Jul. 15, 2016, 31 pages.
Non-Final Office Action dated Jun. 20, 2019, issued in connection with U.S. Appl. No. 15/946,585, filed Apr. 5, 2018, 10 pages.

(56) References Cited

OTHER PUBLICATIONS

Non-Final Office Action dated Aug. 21, 2019, issued in connection with U.S. Appl. No. 16/192,126, filed Nov. 15, 2018, 8 pages.
Non-Final Office Action dated Feb. 21, 2019, issued in connection with U.S. Appl. No. 16/214,666, filed Dec. 10, 2018, 12 pages.
Non-Final Office Action dated Jan. 21, 2020, issued in connection with U.S. Appl. No. 16/214,711, filed Dec. 10, 2018, 9 pages.
Non-Final Office Action dated Jan. 21, 2020, issued in connection with U.S. Appl. No. 16/598,125, filed Oct. 10, 2019, 25 pages.
Non-Final Office Action dated Oct. 21, 2019, issued in connection with U.S. Appl. No. 15/973,413, filed May 7, 2018, 10 pages.
Non-Final Office Action dated Jul. 22, 2020, issued in connection with U.S. Appl. No. 16/145,275, filed Sep. 28, 2018, 11 pages.
Non-Final Office Action dated May 22, 2018, issued in connection with U.S. Appl. No. 15/946,599, filed Apr. 5, 2018, 19 pages.
Non-Final Office Action dated Sep. 22, 2020, issued in connection with U.S. Appl. No. 16/539,843, filed Aug. 13, 2019, 7 pages.
Non-Final Office Action dated May 23, 2019, issued in connection with U.S. Appl. No. 16/154,071, filed Oct. 8, 2018, 36 pages.
Non-Final Office Action dated Nov. 23, 2020, issued in connection with U.S. Appl. No. 16/524,306, filed Jul. 29, 2019, 14 pages.

\* cited by examiner

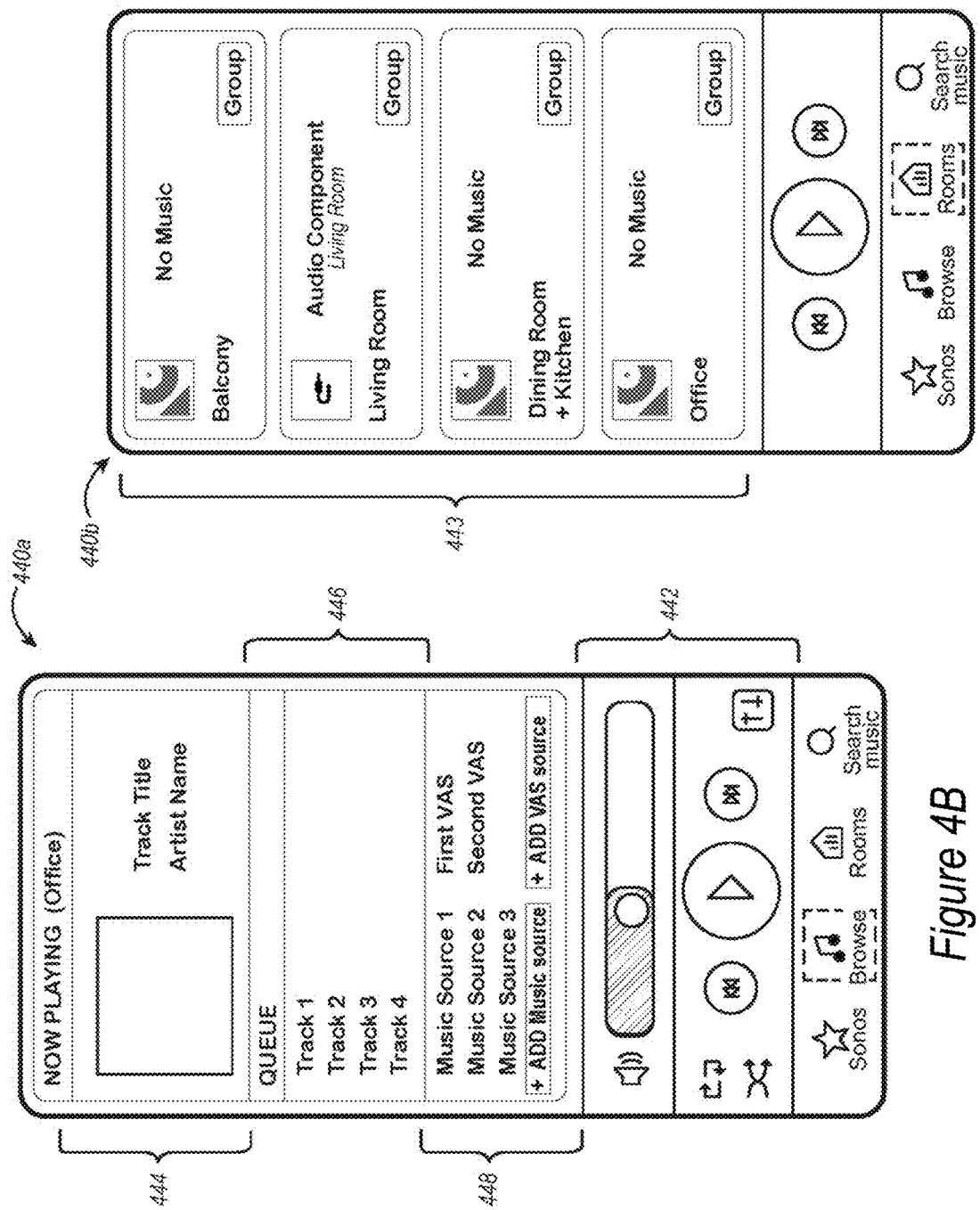

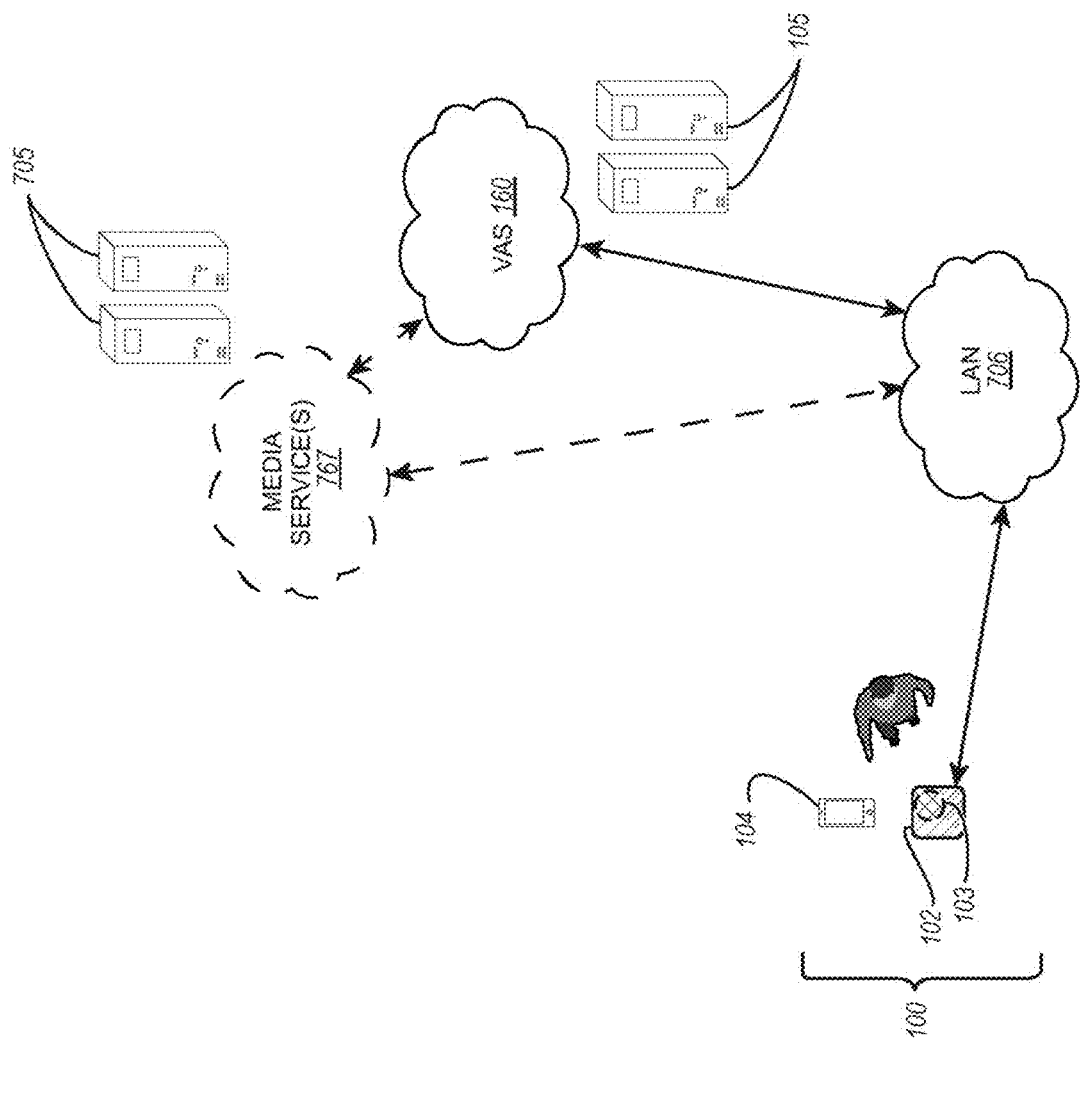

| PLAYBACK - Initiation | |
|---|---|
| COMMAND | COGNATES |
| play | turn on |
| | play some/my music |
| | let's rock/jam |
| | break it down |
| | bust it |
| | kick it |
| play (content) | play (content) |
| | play me (content) |
| | please play (content) |
| | can you/will you play (content) |
| | I'd love to hear (content) |
| | can I hear some (content)? |
| | put on some (content) |
| | switch (content) |
| play (content) for mood | play (content) for (mood) |
| play (content) for activity | play (content) for (activity) |
| play (content) ... service target | play (content) ... service target |
| | play (content) on Spotify |
| play radio | play/turn on/put on the radio |
| | find a station that's playing music |
| play news | play the news |
| | play my news |
| find/create station for (artist/song) | find/create station for (artist/song) |
| playback steering | play artists/song like x |
| | play more x |
| | play more/less like x |
| | play something more (descriptive) |
| playback multi-turn | |

⋮

| CONTROL |
|---|

⋮

| TARGETING |
|---|

⋮

| INQUIRY |
|---|

*Figure 9C*

PLAYBACK - Initiation

CONTROL

Transport:

| COMMAND | COGNATES |
|---|---|
| pause | pause |
| stop | stop, shut up, (turn) off |
| next | next/skip |
| | next song/track/chapter/episode |
| previous | previous/back |
| | skip back/go back |
| restart track | start over/repeat this song |
| | start this song/track over |
| | play this from the top/beginning |
| repeat | repeat |
| | play that again (track or container) |
| shuffle on/off | shuffle/unshuffle/randomize |
| Go to specific location or track | skip to halfway through this song |
| | go to last minute of this song |
| Resume | resume/continue |

| | |
|---|---|
| volume up/down | louder/quieter |
| | turn it up/down |
| tune volume a lot/little | turen it up/down a lot/little |
| | a lot softer/quieter/louder |
| | volume 50 percent/volume half |
| | volume 5 |
| | mute |
| Source | turn on/off |
| | turn on/off quiet mode |
| | enhance speech |
| | switch to line in |
| | switch/change to music/TV |

TARGETING

INQUIRY

*Figure 9D*

PLAYBACK - Initiation

⋮

CONTROL

⋮

TARGETING - Zone/Group/Device

| COMMANDS | COGNATES |
|---|---|
| device grouping | group/join/combine (devices) |
| | group/join/combine (groups) |
| | ungroup (devices) |
| | ungroup (groups) |
| | add/drop (devices/groups) |
| | turn off |
| calibrate | calibrate (devices/groups) |
| | trueplay (devices/groups) |
| pairing/consolidating | pair/bond (devices) |
| | separate (devices/groups) |
| | break apart (devices/groups) |
| group volume | increase/decrease (group volume) |
| | mute/unmute (device(s)) in (group) |
| | raise/lower volume of (device(s)) |
| group head | select (device) as (group) head |
| | make (device) (group) head |
| calibrate multi-turn commands<br>pairing multi-turn commands<br>consolidating multi-turn commands | |

⋮

TARGETING

⋮

INQUIRY

*Figure 9E*

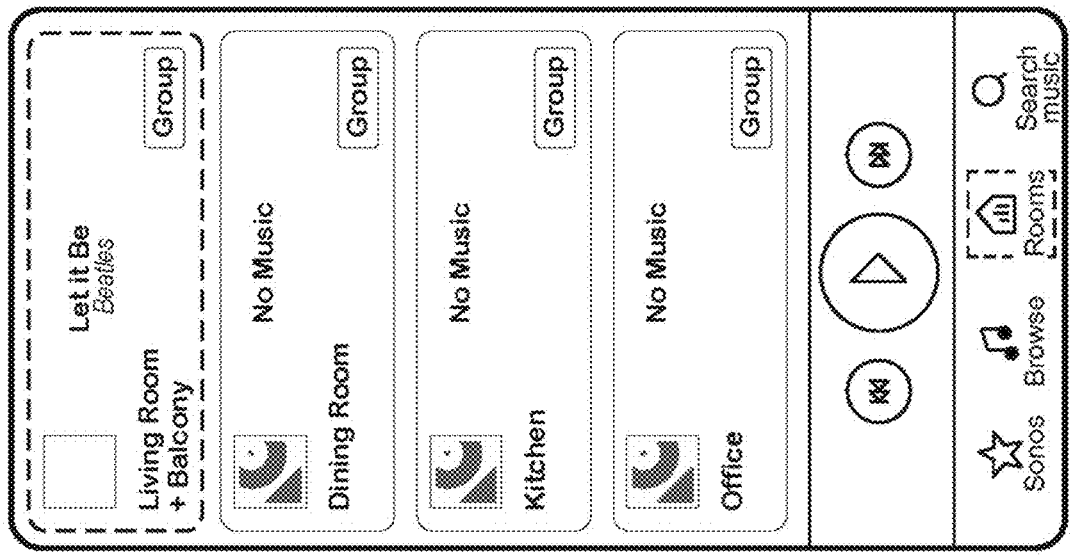
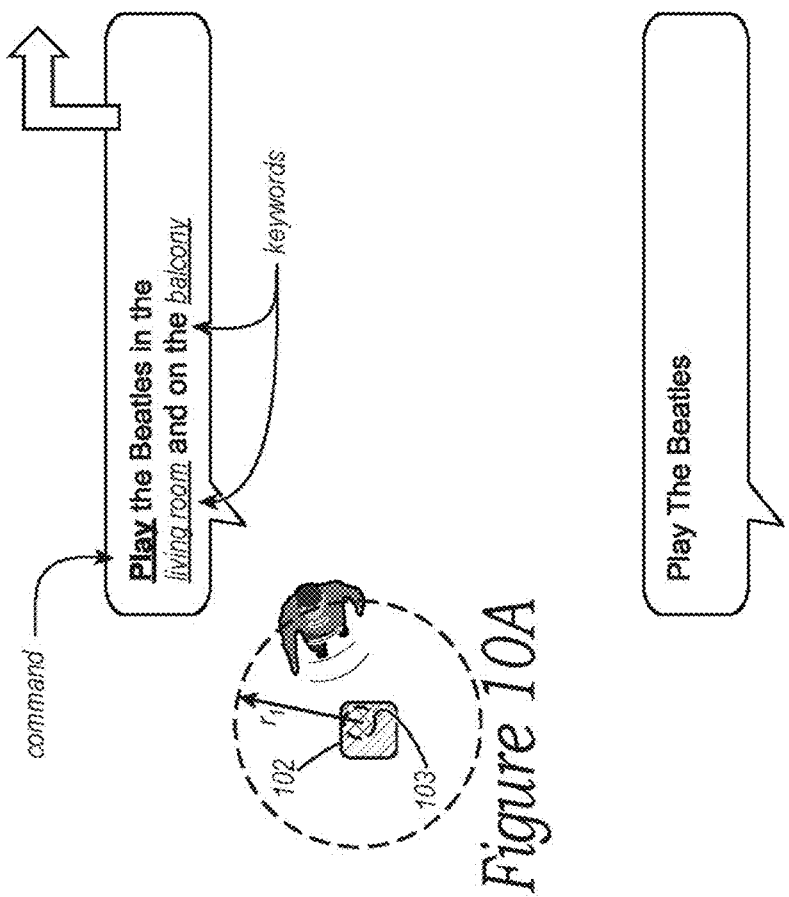
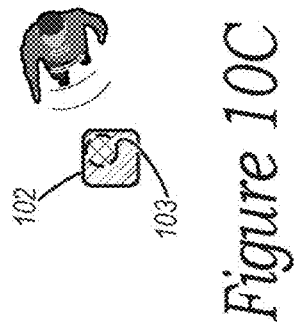
*Figure 10A*
*Figure 10B*
*Figure 10C*

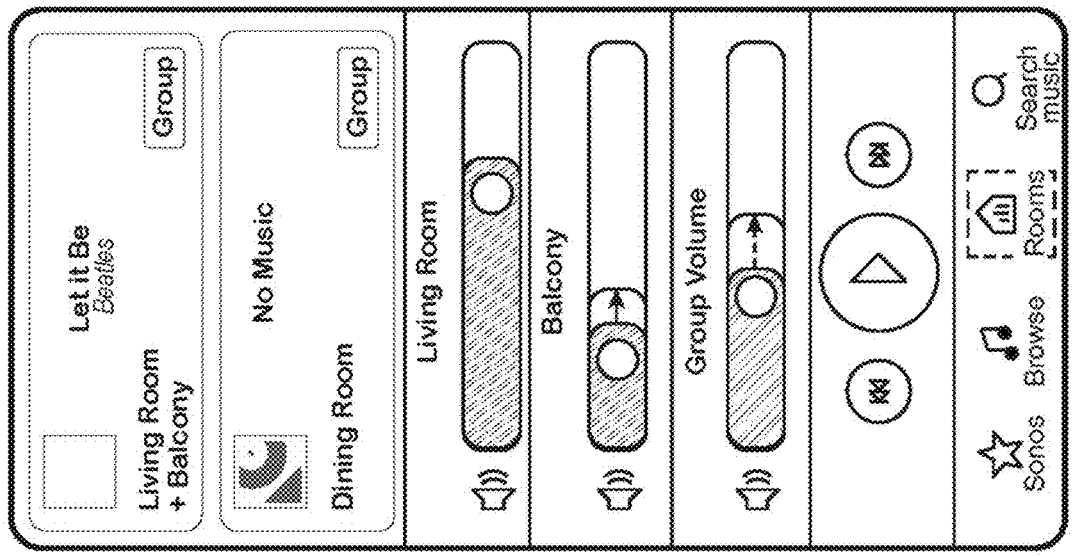
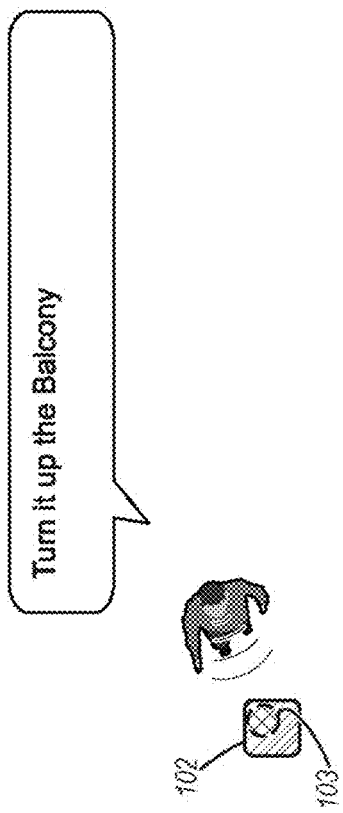
Figure 11A
Figure 11B

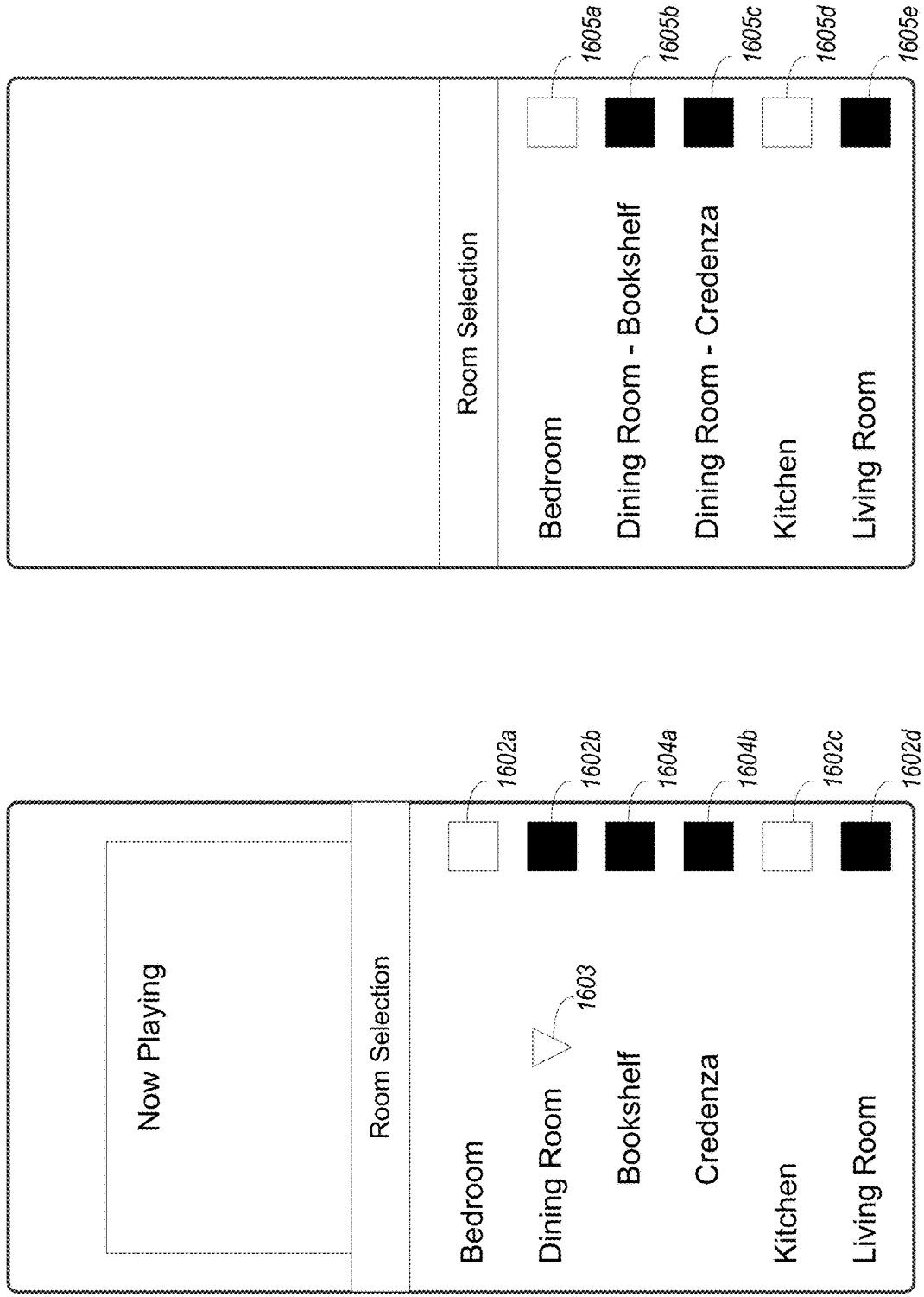

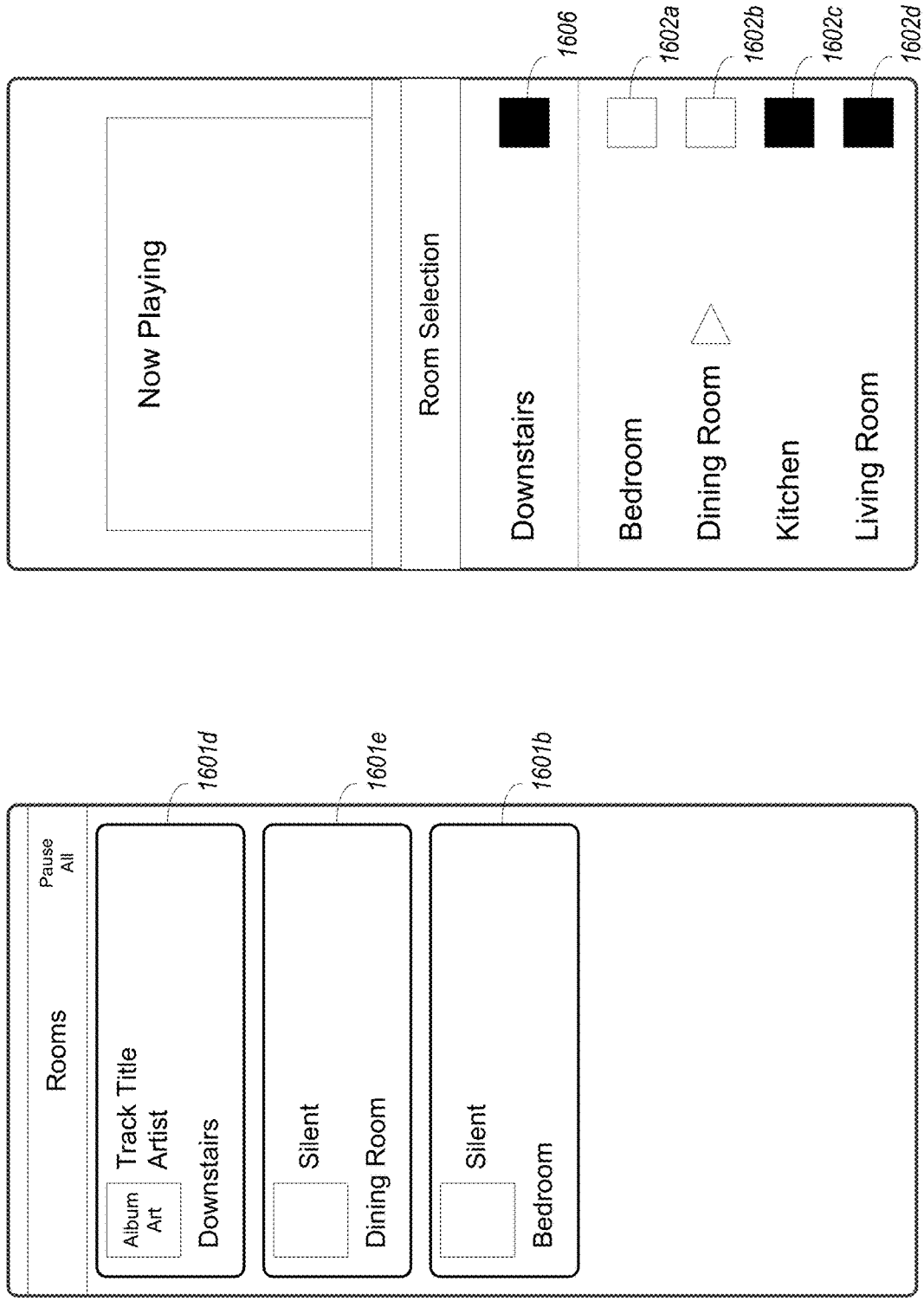

HOME GRAPH

CROSS REFERENCE TO RELATED
APPLICATIONS

This application claims priority under 35 U.S.C. § 120 to, and is a continuation of, U.S. non-provisional patent application Ser. No. 16/216,357, filed on Dec. 11, 2018, entitled "Home Graph," which is incorporated herein by reference in its entirety.

U.S. non-provisional patent application Ser. No. 16/216,357 claims the benefit under 35 U.S.C. § 119 of U.S. provisional App. No. 62/597,355 filed on Dec. 11, 2017, entitled "Home Graph," which is incorporated herein by reference in its entirety.

FIELD OF THE DISCLOSURE

The disclosure is related to consumer goods and, more particularly, to methods, systems, products, features, services, and other elements directed to voice control of media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 4 is a functional block diagram of an example controller device in accordance with aspects of the disclosure;

FIGS. 4A and 4B are controller interfaces in accordance with aspects of the disclosure;

FIG. 7 is a functional block diagram of an example VAS in accordance with aspects of the disclosure;

FIGS. 9C, 9D, and 9E are tables with example voice input commands and associated information in accordance with aspects of the disclosure;

FIGS. 10A, 10B, and 10C are diagrams showing example voice inputs for invoking a VAS in accordance with aspects of the disclosure;

FIGS. 11A and 11B are diagrams showing example voice inputs for invoking a VAS in accordance with aspects of the disclosure;

FIGS. 16A, 16B, 16C, 16D, 16E, 16F, 16G, and 16H are diagrams showing example control interfaces for home graph targeting in accordance with aspects of the disclosure;

Figure 1:
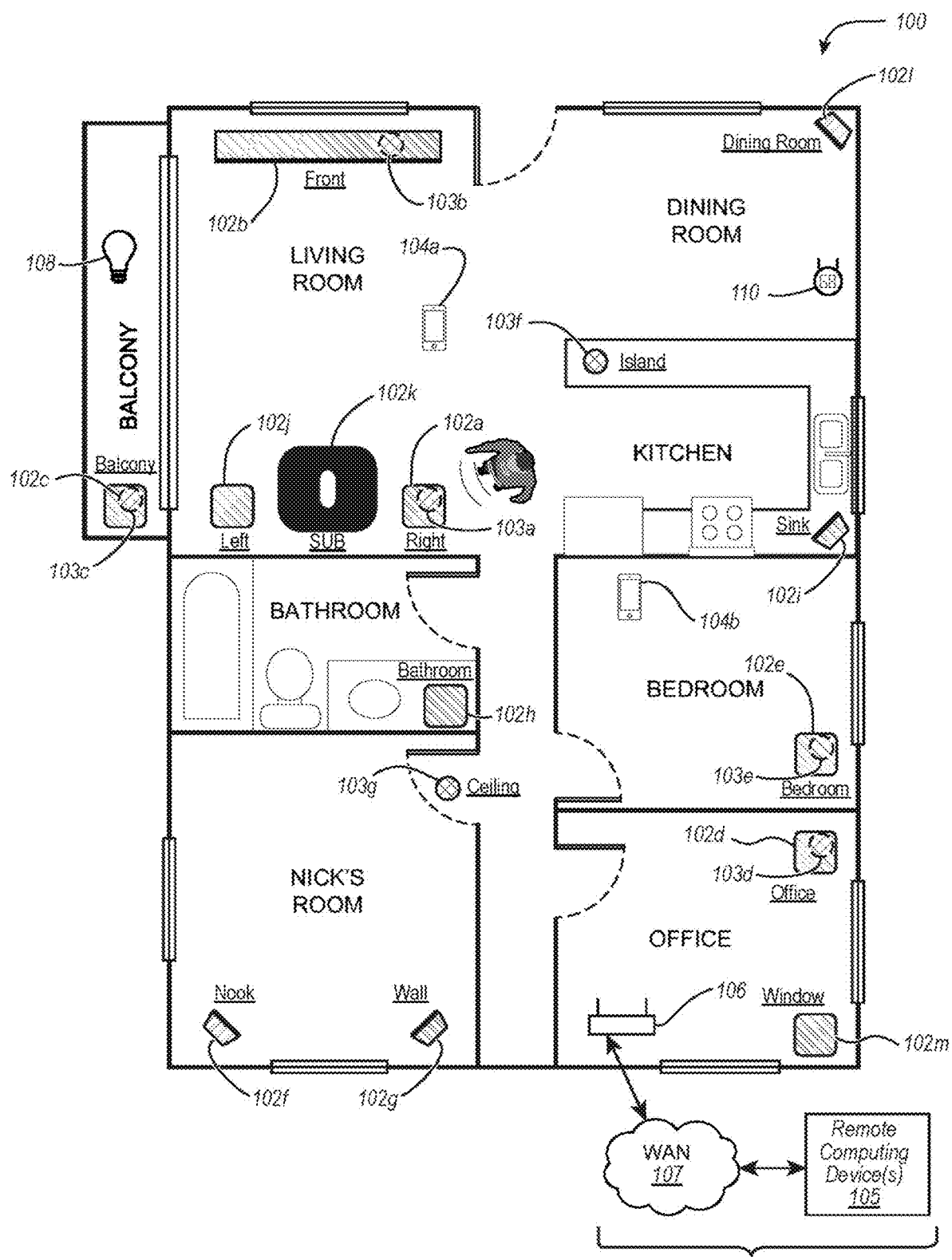
FIG. 1 shows a media playback system in which certain embodiments may be practiced.

The drawings are for purposes of illustrating example embodiments, but it is understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 107 is first introduced and discussed with reference to FIG. 1.

DETAILED DESCRIPTION

I. Overview

Example techniques involve a control hierarchy for a "smart" home having smart appliances and related devices, such as wireless illumination devices, home-automation devices (e.g., thermostats, door locks, etc.), and audio playback devices. An example home includes various rooms in which smart devices might be located. Under the example control hierarchy described herein and referred to as "home graph," a name of a room (e.g., "Kitchen") may represent a smart device (or smart devices) within that room. In other words, from the perspective of a user, the smart devices within a room are that room. This hierarchy permits a user to refer to a smart device within a given room by way of the name of the room when controlling smart devices within the home using a voice user interface (VUI) or graphical user interface (GUI). For instance, using a VUI, a user may say "Play music in Living Room" to play music on the audio playback devices located in the living room.

The base unit of the home graph hierarchy is a "Set." For the purpose of this disclosure, a "Set" refers to an individual device or multiple devices that operate together in performing a given function. For instance, a bonded zone of audio playback devices (e.g., a stereo pair or surround sound configuration) function together in playing back audio content by playing back respective channels or portions of that content. As another example, multiple smart lightbulbs in the same light fixture function together in providing illumination from that light fixture. To individually control different smart devices, each of these smart devices may be assigned into a respective Set.

For the purpose of home graph, each Set is assigned a human-readable name. Following the home graph hierarchy described herein, the name of a particular Set is indicative of the location in the home that the Set is located. For instance, an audio playback device on a kitchen island might be assigned the name "Kitchen Island" by a user using voice control or a GUI on a control device. As another example, a set of lights in the kitchen might be assigned the name "Kitchen Lights."

After Sets, the next level of the hierarchy is a "Room." Under the example home graph hierarchy described herein, a "Room" can be considered a container for Sets in a given room of a home. For example, an example Room might correspond to the kitchen of a home, and be assigned the name "Kitchen." The afore-mentioned Sets having the names "Kitchen Island" and "Kitchen Lights" may belong to the Room.

Under home graph, Sets within the room container may be referred to by the name of the room. For instance, the voice command "Play music in Kitchen" causes the "Kitchen Island" Set (which includes an audio playback device) to start playing music. If there are multiple Sets in the Kitchen that include audio playback devices, the voice command "Play music in Kitchen" invokes every Set in the "Kitchen" Room that includes an audio playback device. If control of an individual Set is desired, that Set may be selected by reference to its name (e.g., "Kitchen Island") rather than the name of the Room.

The next level of the example home graph hierarchy is "Area." Many homes are naturally divided into areas, such as upstairs and downstairs. Under a first example implementation of home graph, an Area includes two or more rooms. For instance, a user may pre-define two Areas named "Upstairs" and "Downstairs," which include the Rooms upstairs and the Rooms downstairs in the home, respectively. Under a second example, an area contains two or more sets (possibly in different Rooms).

The highest level of the home graph hierarchy is "Home." A Home refers to the entire home, and all of the Sets within. In some implementations, the Home may be referred to in a VUI or a GUI by reference to "everywhere."

As indicated above, for the purposes of this disclosure, the terms "Set," "Room," "Area" and "Home" are capitalized when referring to levels of the home graph hierarchy so as to distinguish from the common usage of these terms. Moreover, human-readable names (i.e., character strings) are used in identifying Sets, Rooms, Areas, and Home and are denoted by quotations marks (e.g., "Nick's Room" Set).

While some embodiments described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be implemented. The media playback system 100 as shown is associated with an example home environment having several rooms and spaces, such as for example, an office, a dining room, and a living room. Within these rooms and spaces, the media playback system 100 includes playback devices 102 (identified individually as playback devices 102a-102m), network microphone devices 103 (identified individually as "NMD(s)" 103a-103g), and controller devices 104a and 104b (collectively "controller devices 104"). The home environment may include other network devices, such as one or more smart illumination devices 108 and a smart thermostat 110.

The various playback, network microphone, and controller devices 102-104 and/or other network devices of the media playback system 100 may be coupled to one another via point-to-point connections and/or over other connections, which may be wired and/or wireless, via a LAN including a network router 106. For example, the playback device 102j (designated as "Left") may have a point-to-point connection with the playback device 102a (designated as "Right"). In one embodiment, the Left playback device 102j may communicate over the point-to-point connection with the Right playback device 102a. In a related embodiment, the Left playback device 102j may communicate with other network devices via the point-to-point connection and/or other connections via the LAN.

The network router 106 may be coupled to one or more remote computing device(s) 105 via a wide area network (WAN) 107. In some embodiments, the remote computing device(s) may be cloud servers. The remote computing device(s) 105 may be configured to interact with the media playback system 100 in various ways. For example, the remote computing device(s) may be configured to facilitate streaming and controlling playback of media content, such as audio, in the home environment. In one aspect of the technology described in greater detail below, the remote computing device(s) 105 are configured to provide a VAS 160 for the media playback system 100.

In some embodiments, one or more of the playback devices 102 may include an on-board (e.g., integrated) network microphone device. For example, the playback devices 102a-e include corresponding NMDs 103a-e, respectively. Playback devices that include network microphone devices may be referred to herein interchangeably as a playback device or a network microphone device unless indicated otherwise in the description.

In some embodiments, one or more of the NMDs 103 may be a stand-alone device. For example, the NMDs 103f and 103g may be stand-alone network microphone devices. A stand-alone network microphone device may omit components typically included in a playback device, such as a speaker or related electronics. In such cases, a stand-alone network microphone device may not produce audio output or may produce limited audio output (e.g., relatively low-quality audio output).

In use, a network microphone device may receive and process voice inputs from a user in its vicinity. For example, a network microphone device may capture a voice input upon detection of the user speaking the input. In the illustrated example, the NMD 103a of the playback device 102a in the Living Room may capture the voice input of a user in its vicinity. In some instances, other network microphone devices (e.g., the NMDs 103b and 103f) in the vicinity of the voice input source (e.g., the user) may also detect the voice input. In such instances, network microphone devices may arbitrate between one another to determine which device(s) should capture and/or process the detected voice input. Examples for selecting and arbitrating between network microphone devices may be found, for example, in U.S. application Ser. No. 15/438,749 filed Feb. 21, 2017, and titled "Voice Control of a Media Playback System," which is incorporated herein by reference in its entirety.

In certain embodiments, a network microphone device may be assigned to a playback device that might not include a network microphone device. For example, the NMD 103f may be assigned to the playback devices 102i and/or 102l in its vicinity. In a related example, a network microphone device may output audio through a playback device to which it is assigned. Additional details regarding associating network microphone devices and playback devices as designated or default devices may be found, for example, in previously referenced U.S. patent application Ser. No. 15/438,749.

Further aspects relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in other home environment configurations comprising more or fewer of any of the playback, network microphone, and/or controller devices 102-104. Additionally, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback and Network Microphone Devices

Figure 2A:
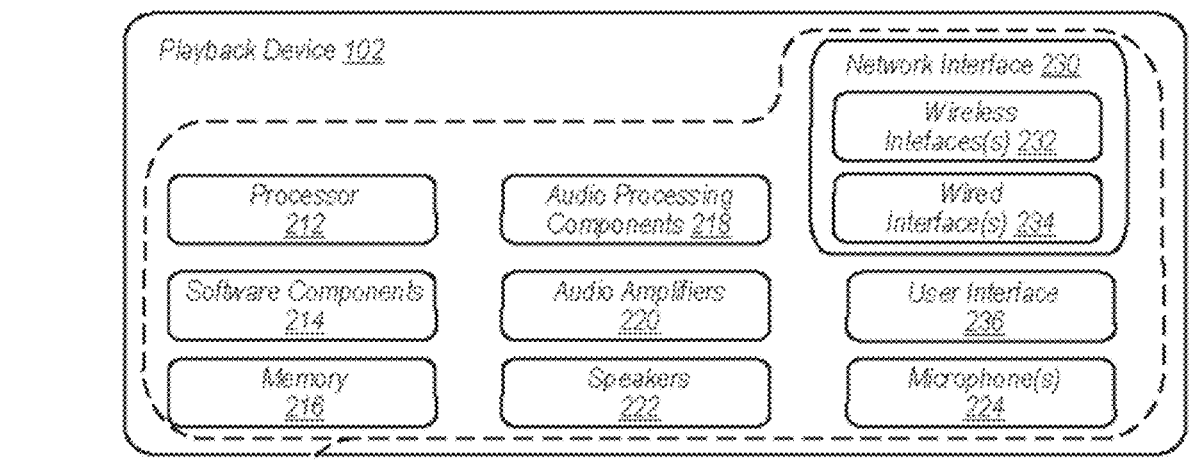
FIG. 2A is a functional block diagram of an example playback device.

FIG. 2A is a functional block diagram illustrating certain aspects of a selected one of the playback devices 102 shown in FIG. 1. As shown, such a playback device may include a processor 212, software components 214, memory 216, audio processing components 218, audio amplifier(s) 220, speaker(s) 222, and a network interface 230 including wireless interface(s) 232 and wired interface(s) 234. In some embodiments, a playback device may not include the speaker(s) 222, but rather a speaker interface for connecting the playback device to external speakers. In certain embodiments, the playback device may include neither the speaker(s) 222 nor the audio amplifier(s) 222, but rather an audio interface for connecting a playback device to an external audio amplifier or audio-visual receiver.

A playback device may further include a user interface 236. The user interface 236 may facilitate user interactions independent of or in conjunction with one or more of the controller devices 104. In various embodiments, the user interface 236 includes one or more of physical buttons and/or graphical interfaces provided on touch sensitive screen(s) and/or surface(s), among other possibilities, for a user to directly provide input. The user interface 236 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2A includes both wireless interface(s) 232 and wired interface(s) 234, the network interface 230 may in some embodiments include only wireless interface(s) or only wired interface(s).

Figure 2B:
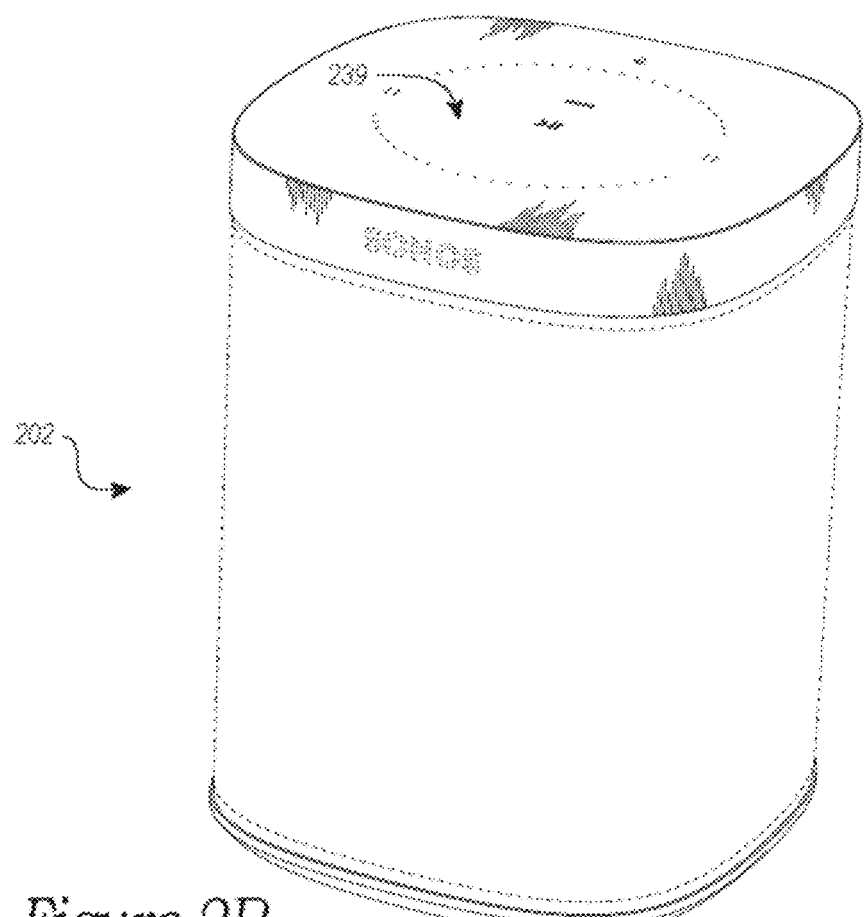
FIG. 2B is a isometric diagram of an example playback device that includes a network microphone device.

As discussed above, a playback device may include a network microphone device, such as one of the NMDs 103 shown in FIG. 1. A network microphone device may share some or all the components of a playback device, such as the processor 212, the memory 216, the microphone(s) 224, etc. In other examples, a network microphone device includes components that are dedicated exclusively to operational aspects of the network microphone device. For example, a network microphone device may include far-field microphones and/or voice processing components, which in some instances a playback device may not include. In another example, a network microphone device may include a touch-sensitive button for enabling/disabling a microphone. In yet another example, a network microphone device can be a stand-alone device, as discussed above. FIG. 2B is an isometric diagram showing an example playback device 202 incorporating a network microphone device. The playback device 202 has a control area 237 at the top of the device for enabling/disabling microphone(s). The control area 237 is adjacent another area 239 at the top of the device for controlling playback.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2A or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

FIGS. 3A-3D show example configurations of playback devices in zones and zone groups. In one example, a single playback device may belong to a zone. For example, the playback device 102c in the Balcony may belong to Zone A. In some implementations described below, multiple playback devices may be "bonded" to form a "bonded pair" which together form a single zone. For example, the playback device 102f named Nook in FIG. 1 may be bonded to the playback device 102g named Wall to form Zone B. Bonded playback devices may have different playback responsibilities (e.g., channel responsibilities). In another implementation described below, multiple playback devices may be merged to form a single zone. For example, the playback device 102d named Office may be merged with the playback device 102m named Window to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

Each zone in the media playback system 100 may be provided for control as a single user interface (UI) entity. For example, Zone A may be provided as a single entity named Balcony. Zone C may be provided as a single entity named Office. Zone B may be provided as a single entity named Shelf.

In various embodiments, a zone may take on the name of one of the playback device(s) belonging to the zone. For example, Zone C may take on the name of the Office device 102d (as shown). In another example, Zone C may take on the name of the Window device 102m. In a further example, Zone C may take on a name that is some combination of the Office device 102d and Window device 102 m. The name that is chosen may be selected by user. In some embodiments, a zone may be given a name that is different than the device(s) belonging to the zone. For example, Zone B is named Shelf but none of the devices in Zone B have this name.

Figure 3A:
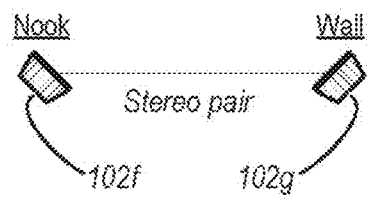
FIGS. 3A, 3B, 3C, and 3D are diagrams showing example zones and zone groups in accordance with aspects of the disclosure.

Playback devices that are bonded may have different playback responsibilities, such as responsibilities for certain audio channels. For example, as shown in FIG. 3A, the Nook and Wall devices 102f and 102g may be bonded so as to produce or enhance a stereo effect of audio content. In this example, the Nook playback device 102f may be configured to play a left channel audio component, while the Wall playback device 102g may be configured to play a right channel audio component. In some implementations, such stereo bonding may be referred to as "pairing."

Figure 3B:
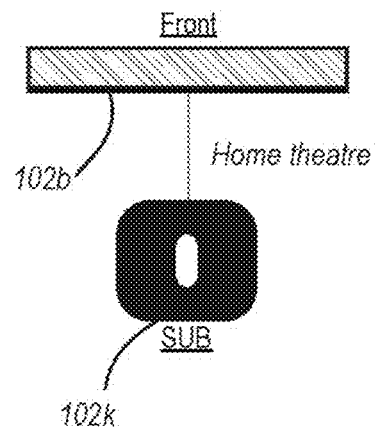
Figure 3C:
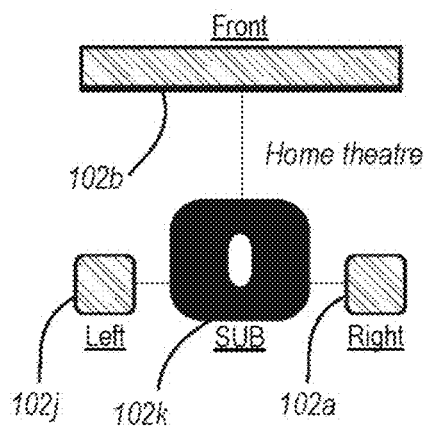
Figure 3D:
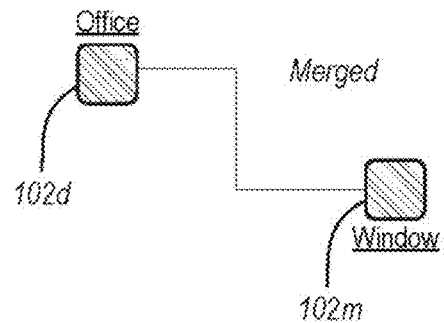

Additionally, bonded playback devices may have additional and/or different respective speaker drivers. As shown in FIG. 3B, the playback device 102b named Front may be bonded with the playback device 102k named SUB. The Front device 102b may render a range of mid to high frequencies and the SUB device 102k may render low frequencies as, e.g., a subwoofer. When unbonded, the Front device 102b may render a full range of frequencies. As another example, FIG. 3C shows the Front and SUB devices 102b and 102k further bonded with Right and Left playback devices 102a and 102k, respectively. In some implementations, the Right and Left devices 102a and 102k may form surround or "satellite" channels of a home theatre system. The bonded playback devices 102a, 102b, 102j, and 102k may form a single Zone D.

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback device 102d and 102m in the Office have the single UI entity of Zone C. In one embodiment, the playback devices 102d and 102m may each output the full range of audio content each respective playback device 102d and 102m are capable of, in synchrony.

In some embodiments, a stand-alone network microphone device may be in a zone by itself. For example, the NMD 103g in FIG. 1 named Ceiling may be Zone E. A network microphone device may also be bonded or merged with another device so as to form a zone. For example, the NMD device 103f named Island may be bonded with the playback device 102i Kitchen, which together form Zone G, which is also named Kitchen. Additional details regarding associating network microphone devices and playback devices as designated or default devices may be found, for example, in previously referenced U.S. patent application Ser. No. 15/438,749. In some embodiments, a stand-alone network microphone device may not be associated with a zone.

Zones of individual, bonded, and/or merged devices may be grouped to form a zone group. For example, Zone A may be grouped with Zone B to form a zone group that includes the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group, such as Dining Room+Kitchen. In some embodiments, a zone group may be given a unique name selected by a user, such as Nick's Room.

Referring again to FIG. 2A, certain data may be stored in the memory 216 as one or more state variables that are periodically updated and used to describe the state of a playback zone, the playback device(s), and/or a zone group associated therewith. The memory 216 may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1, identifiers associated with the Balcony may indicate that the Balcony is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

The memory 216 may be further configured to store other data. Such data may pertain to audio sources accessible by a playback device or a playback queue that the playback device (or some other playback device(s)) may be associated with.

During operation, one or more playback zones in the environment of FIG. 1 may each be playing different audio content. For instance, the user may be grilling in the Balcony zone and listening to hip hop music being played by the playback device 102c while another user may be preparing food in the Kitchen zone and listening to classical music being played by the playback device 102i. In another example, a playback zone may play the same audio content in synchrony with another playback zone. For instance, the user may be in the Office zone where the playback device 102d is playing the same hip-hop music that is being playing by playback device 102c in the Balcony zone. In such a case, playback devices 102c and 102d may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified. As such, the media playback system 100 may support numerous configurations. For example, if a user physically moves one or more playback devices to or from a zone, the media playback system 100 may be reconfigured to accommodate the change(s). For instance, if the user physically moves the playback device 102c from the Balcony zone to the Office zone, the Office zone may now include both the playback devices 102c and 102d. In some cases, the use may pair or group the moved playback device 102c with the Office zone and/or rename the players in the Office zone using, e.g., one of the controller devices 104 and/or voice input. As another example, if one or more playback devices 102 are moved to a particular area in the home environment that is not already a playback zone, the moved playback device(s) may be renamed or associated with a playback zone for the particular area.

Further, different playback zones of the media playback system 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices 102 in the Living Room zone may be split into (i) a television zone and (ii) a separate listening zone. The television zone may include the Front playback device 102b. The listening zone may include the Right, Left, and SUB playback devices 102*a*, 102*j*, and 102*k*, which may be grouped, paired, or merged, as described above. Splitting the Living Room zone in such a manner may allow one user to listen to music in the listening zone in one area of the living room space, and another user to watch the television in another area of the living room space. In a related example, a user may implement either of the NMD 103*a* or 103*b* to control the Living Room zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the media playback system 100.

c. Example Controller Devices

FIG. 4 is a functional block diagram illustrating certain aspects of a selected one of the controller devices 104 of the media playback system 100 of FIG. 1. Such controller devices may also be referred to as a controller. The controller device shown in FIG. 3 may include components that are generally similar to certain components of the network devices described above, such as a processor 412, memory 416, microphone(s) 424, and a network interface 430. In one example, a controller device may be a dedicated controller for the media playback system 100. In another example, a controller device may be a network device on which media playback system controller application software may be installed, such as for example, an iPhone™, iPad™ or any other smart phone, tablet or network device (e.g., a networked computer such as a PC or Mac™).

The memory 416 of a controller device may be configured to store controller application software and other data associated with the media playback system 100 and a user of the system 100. The memory 416 may be loaded with one or more software components 414 executable by the processor 412 to achieve certain functions, such as facilitating user access, control, and configuration of the media playback system 100. A controller device communicates with other network devices over the network interface 430, such as a wireless interface, as described above.

In one example, data and information (e.g., such as a state variable) may be communicated between a controller device and other devices via the network interface 430. For instance, playback zone and zone group configurations in the media playback system 100 may be received by a controller device from a playback device, a network microphone device, or another network device, or transmitted by the controller device to another playback device or network device via the network interface 406. In some cases, the other network device may be another controller device.

Playback device control commands such as volume control and audio playback control may also be communicated from a controller device to a playback device via the network interface 430. As suggested above, changes to configurations of the media playback system 100 may also be performed by a user using the controller device. The configuration changes may include adding/removing one or more playback devices to/from a zone, adding/removing one or more zones to/from a zone group, forming a bonded or merged player, separating one or more playback devices from a bonded or merged player, among others.

Figure 4A:
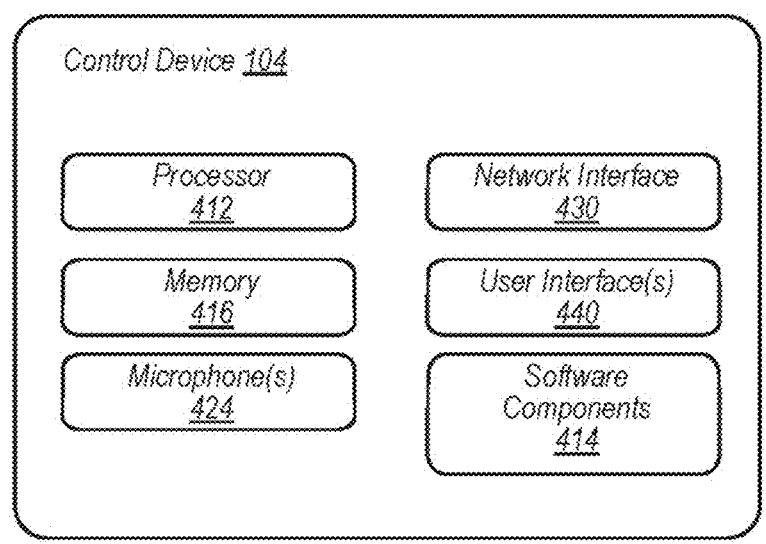

The user interface(s) 440 of a controller device may be configured to facilitate user access and control of the media playback system 100, by providing controller interface(s) such as the controller interfaces 440*a* and 440*b* shown in FIGS. 4A and 4B, respectively, which may be referred to collectively as the controller interface 440. Referring to FIGS. 4A and 4B together, the controller interface 440 includes a playback control region 442, a playback zone region 443, a playback status region 444, a playback queue region 446, and a sources region 448. The user interface 400 as shown is just one example of a user interface that may be provided on a network device such as the controller device shown in FIG. 3 and accessed by users to control a media playback system such as the media playback system 100. Other user interfaces of varying formats, styles, and interactive sequences may alternatively be implemented on one or more network devices to provide comparable control access to a media playback system.

The playback control region 442 (FIG. 4A) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4B) may include representations of playback zones within the media playback system 100. The playback zones regions may also include representation of zone groups, such as the Dining Room+Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 443 (FIG. 4B) may be dynamically updated as playback zone or zone group configurations are modified.

The playback status region 444 (FIG. 4A) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 440.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4A and 4B, the graphical representations of audio content in the playback queue region 446 (FIG. 4B) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and selectable voice assistants associated with a corresponding VAS. The VASes may be selectively assigned. In some examples, multiple VASes, such as AMAZON's ALEXA® and another voice service, may be invokable by the same network microphone device.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a controller device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Network Microphone Devices

Figure 5A:
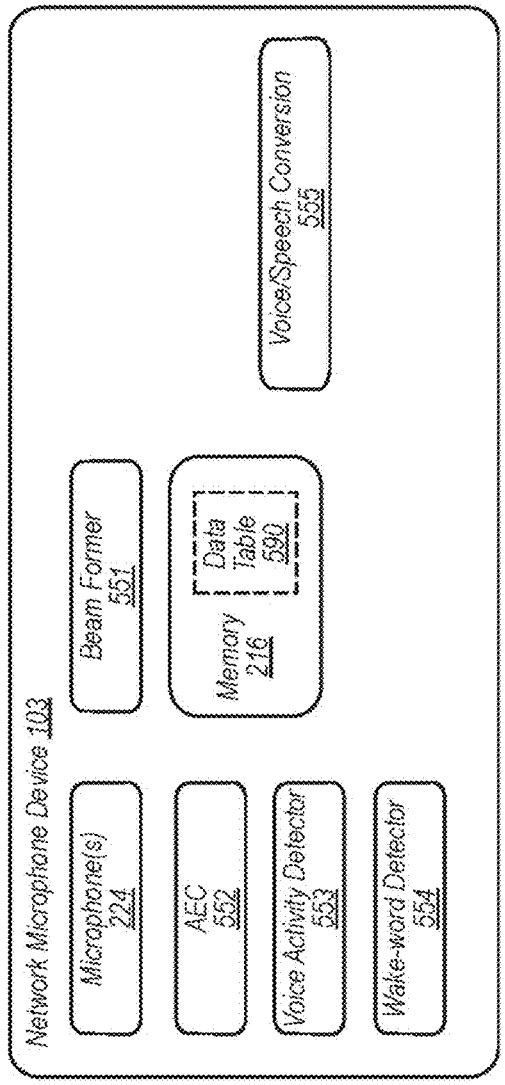
FIG. 5A is a functional block diagram of an example network microphone device in accordance with aspects of the disclosure.

FIG. 5A is a functional block diagram showing additional features of one or more of the NMDs 103 in accordance with aspects of the disclosure. The network microphone device shown in FIG. 5A may include components that are generally similar to certain components of network microphone devices described above, such as the processor 212 (FIG. 1), network interface 230 (FIG. 2A), microphone(s) 224, and the memory 216. Although not shown for purposes of clarity, a network microphone device may include other components, such as speakers, amplifiers, signal processors, as discussed above.

The microphone(s) 224 may be a plurality of microphones arranged to detect sound in the environment of the network microphone device. In one example, the microphone(s) 224 may be arranged to detect audio from one or more directions relative to the network microphone device. The microphone(s) 224 may be sensitive to a portion of a frequency range. In one example, a first subset of the microphone(s) 224 may be sensitive to a first frequency range, while a second subset of the microphone(s) 224 may be sensitive to a second frequency range. The microphone(s) 224 may further be arranged to capture location information of an audio source (e.g., voice, audible sound) and/or to assist in filtering background noise. Notably, in some embodiments the microphone(s) 224 may have a single microphone rather than a plurality of microphones.

A network microphone device may further include beam former components 551, acoustic echo cancellation (AEC) components 552, voice activity detector components 553, wake word detector components 554, speech/text conversion components 555 (e.g., voice-to-text and text-to-voice), and VAS selector components 556. In various embodiments, one or more of the components 551-556 may be a subcomponent of the processor 512.

The beamforming and AEC components 551 and 552 are configured to detect an audio signal and determine aspects of voice input within the detect audio, such as the direction, amplitude, frequency spectrum, etc. For example, the beamforming and AEC components 551 and 552 may be used in a process to determine an approximate distance between a network microphone device and a user speaking to the network microphone device. In another example, a network microphone device may detective a relative proximity of a user to another network microphone device in a media playback system.

The voice activity detector activity components 553 are configured to work closely with the beamforming and AEC components 551 and 552 to capture sound from directions where voice activity is detected. Potential speech directions can be identified by monitoring metrics which distinguish speech from other sounds. Such metrics can include, for example, energy within the speech band relative to background noise and entropy within the speech band, which is measure of spectral structure. Speech typically has a lower entropy than most common background noise.

The wake-word detector components 554 are configured to monitor and analyze received audio to determine if any wake words are present in the audio. The wake-word detector components 554 may analyze the received audio using a wake word detection algorithm. If the wake-word detector 554 detects a wake word, a network microphone device may process voice input contained in the received audio. Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wakewords.

In some embodiments, the wake-word detector 554 runs multiple wake word detections algorithms on the received audio simultaneously (or substantially simultaneously). As noted above, different voice services (e.g. AMAZON's ALEXA®, APPLE's SIRI®, or MICROSOFT's CORTANA) each use a different wake word for invoking their respective voice service. To support multiple services, the wake word detector 554 may run the received audio through the wake word detection algorithm for each supported voice service in parallel.

Command criteria for a given command in a voice input may be based, for example, on the inclusion of certain keywords within the voice input. A keyword may be, for example, a word in the voice input identifying a particular device or group in the media playback system 100. As used herein, the term "keyword" may refer to a single word (e.g., "Bedroom") or a group of words (e.g., "the Living Room").

In addition or alternatively, command criteria for given command(s) may involve detection of one or more control state and/or zone state variables in conjunction with detecting the given command(s). Control state variables may include, for example, indicators identifying a level of volume, a queue associated with one or more device(s), and playback state, such as whether devices are playing a queue, paused, etc. Zone state variables may include, for example, indicators identifying which, if any, zone players are grouped. The VAS selector components 556 may store in the memory 216 a set of command information, such as in a data table 590, that contains a listing of commands and associated command criteria, which are described in greater detail below.

In some embodiments, one or more of the components 551-556 described above can operate in conjunction with the microphone(s) 224 to detect and store a user's voice profile, which may be associated with a user account of the media playback system 100. In some embodiments, voice profiles may be stored as and/or compared to variables stored in the set of command information 590, as described below. The voice profile may include aspects of the tone or frequency of user's voice and/or other unique aspects of the user such as those described in previously referenced U.S. patent application Ser. No. 15/438,749.

In some embodiments, one or more of the components 551-556 described above can operate in conjunction with the microphone array 524 to determine the location of a user in the home environment and/or relative to a location of one or more of the NMDs 103. The location or proximity of a user may be detected and compared to a variable stored in the command information 590, as described below. Techniques for determining the location or proximity of a user may include or more techniques disclosed in previously referenced U.S. patent application Ser. No. 15/438,749, U.S. Pat. No. 9,084,058 filed Dec. 29, 2011, and titled "Sound Field Calibration Using Listener Localization." Each of these applications is incorporated herein by reference in its entirety. In addition, techniques for determining the location or proximity of a user may include or more techniques disclosed in U.S. Pat. No. 8,965,033 filed Aug. 31, 2012, and titled "Acoustic Optimization" is incorporated herein by reference in its entirety.

Figure 5B:
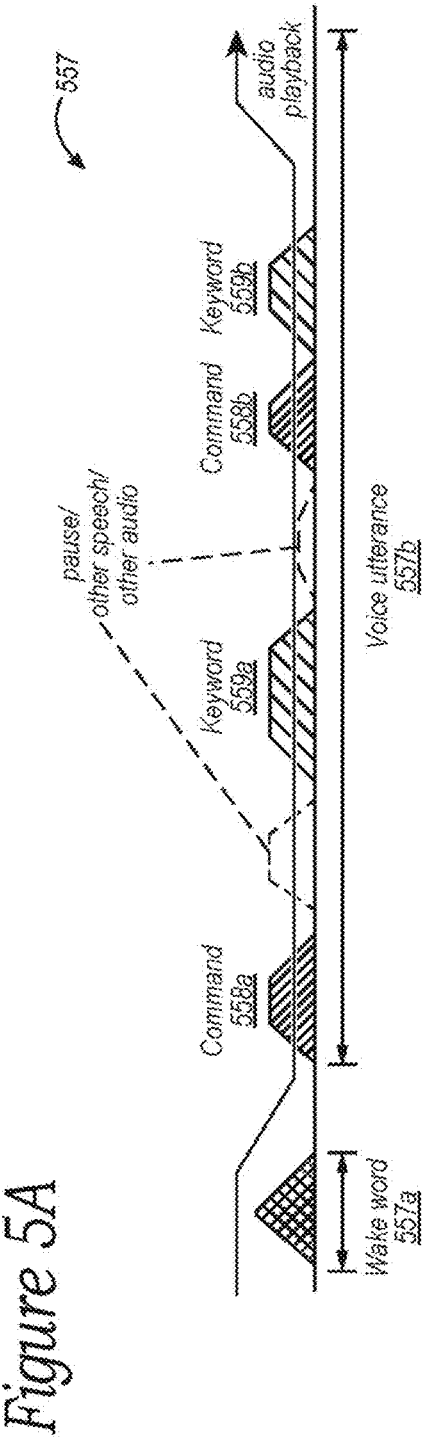
FIG. 5B is a diagram of an example voice input in accordance with aspects of the disclosure.

FIG. 5B is a diagram of an example voice input in accordance with aspects of the disclosure. The voice input may be captured by a network microphone device, such as by one or more of the NMDs 103 shown in FIG. 1. The voice input may include a wake word portion 557a and a voice utterance portion 557b (collectively "voice input 557"). In some embodiments, the wake word 557a can be a known wake word, such as "Alexa," which is associated with AMAZON's ALEXA®). In other embodiments, the voice input 557 may not include a wake word.

In some embodiments, a network microphone device may output an audible and/or visible response upon detection of the wake word portion 557a. In addition or alternatively, a network microphone device may output an audible and/or visible response after processing a voice input and/or a series of voice inputs (e.g., in the case of a multi-turn request).

The voice utterance portion 557b may include, for example, one or more spoken commands 558 (identified individually as a first command 558a and a second command 558b) and one or more spoken keywords 559 (identified individually as a first keyword 559a and a second keyword 559b). In one example, the first command 557a can be a command to play music, such as a specific song, album, playlist, etc. In this example, the keywords 559 may be one or words identifying one or more zones in which the music is to be played, such as the Living Room and the Dining Room shown in FIG. 1. In some examples, the voice utterance portion 557b can include other information, such as detected pauses (e.g., periods of non-speech) between words spoken by a user, as shown in FIG. 5B. The pauses may demarcate the locations of separate commands, keywords, or other information spoke by the user within the voice utterance portion 557b.

In some embodiments, the media playback system 100 is configured to temporarily reduce the volume of audio content that it is playing while detecting the wake word portion 557a. The media playback system 100 may restore the volume after processing the voice input 557, as shown in FIG. 5B. Such a process can be referred to as ducking, examples of which are disclosed in previously referenced U.S. patent application Ser. No. 15/438,749.

FIG. 5B is a diagram of an example voice input in accordance with aspects of the disclosure. The voice input may be captured by a network microphone device, such as by one or more of the NMDs 103 shown in FIG. 1. The voice input may include a wake word portion 557a and a voice utterance portion 557b (collectively "voice input 557"). In some embodiments, the wake word 557a can be a known wake word, such as "Alexa," which is associated with AMAZON's ALEXA®).

In some embodiments, a network microphone device may output an audible and/or visible response upon detection of the wake word portion 557a. In addition or alternately, a network microphone device may output an audible and/or visible response after processing a voice input and/or a series of voice inputs (e.g., in the case of a multi-turn request).

The voice utterance portion 557b may include, for example, one or more spoken commands 558 (identified individually as a first command 558a and a second command 558b) and one or more spoken keywords 559 (identified individually as a first keyword 559a and a second keyword 559b). In one example, the first command 557a can be a command to play music, such as a specific song, album, playlist, etc. In this example, the keywords 559 may be one or words identifying one or more zones in which the music is to be played, such as the Living Room and the Dining Room shown in FIG. 1. In some examples, the voice utterance portion 557b can include other information, such as detected pauses (e.g., periods of non-speech) between words spoken by a user, as shown in FIG. 5B. The pauses may demarcate the locations of separate commands, keywords, or other information spoke by the user within the voice utterance portion 557b.

In some embodiments, the media playback system 100 is configured to temporarily reduce the volume of audio content that it is playing while detecting the wake word portion 557a. The media playback system 100 may restore the volume after processing the voice input 557, as shown in FIG. 5B. Such a process can be referred to as ducking, examples of which are disclosed in U.S. patent application Ser. No. 15/277,810 filed Sep. 27, 2016 and titled "Audio Playback Settings for Voice Interaction," which is incorporated herein by reference in its entirety.

f. Example Network and Remote Computing Systems

Figure 6:
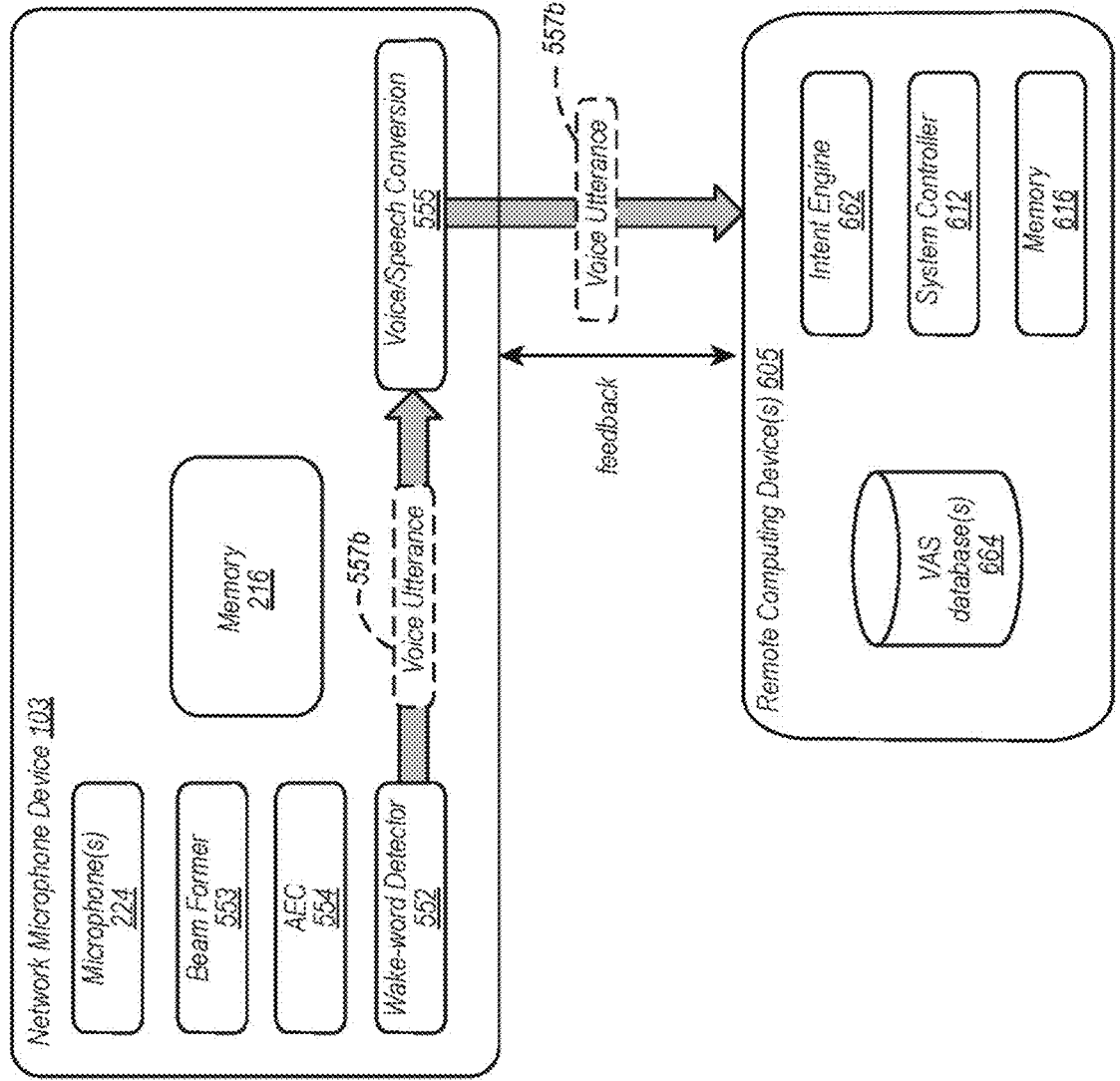
FIG. 6 is a functional block diagram of example remote computing device(s) in accordance with aspects of the disclosure.

FIG. 6 is a functional block diagram showing additional details of the remote computing device(s) 105 in FIG. 1. In various embodiments, the remote computing device(s) 105 may receive voice inputs from one or more of the NMDs 103 over the WAN 107 shown in FIG. 1. For purposes of illustration, selected communication paths of the voice input 557 (FIG. 5B) are represented by arrows in FIG. 6. In one embodiment, the voice input 557 processed by the remote computing device(s) 105 may include the voice utterance portion 557b (FIG. 5B). In another embodiment, the processed voice input 557 may include both the voice utterance portion 557b and the wake word 557a (FIG. 5B).

The remote computing device(s) 105 include a system controller 612 comprising one or more processors, an intent engine 602, and a memory 616. The memory 616 may be a tangible computer-readable medium configured to store instructions executable by the system controller 612 and/or one or more of the playback, network microphone, and/or controller devices 102-104.

The intent engine 662 is configured to process a voice input and determine an intent of the input. In some embodiments, the intent engine 662 may be a subcomponent of the system controller 612. The intent engine 662 may interact with one or more database(s), such as one or more VAS database(s) 664, to process voice inputs. The VAS database(s) 664 may reside in the memory 616 or elsewhere, such as in memory of one or more of the playback, network microphone, and/or controller devices 102-104. In some embodiments, the VAS database(s) 664 may be updated for adaptive learning and feedback based on the voice input processing. The VAS database(s) 664 may store various user data, analytics, catalogs, and other information for NLU-related and/or other processing.

The remote computing device(s) 105 may exchange various feedback, information, instructions, and/or related data with the various playback, network microphone, and/or controller devices 102-104 of the media playback system 100. Such exchanges may be related to or independent of transmitted messages containing voice inputs. In some embodiments, the remote computing device(s) 105 and the media playback system 100 may exchange data via communication paths as described herein and/or using a metadata exchange channel as described in U.S. Pat. No. 9,811,314 filed Apr. 18, 2016, and titled "Metadata exchange involving a networked playback system and a networked microphone system," which is incorporated by reference in its entirety.

Processing of a voice input by devices of the media playback system 100 may be carried out at least partially in parallel with processing of the voice input by the remote computing device(s) 105. Additionally, the speech/text conversion components 555 of a network microphone device may convert responses from the remote computing device(s) 105 to speech for audible output via one or more speakers.

In accordance with various embodiments of the present disclosure, the remote computing device(s) 105 carry out functions of the VAS 160 for the media playback system 100. FIG. 7 is schematic diagram of an example network system 700 that comprises the VAS 160. As shown, the remote computing device(s) 105 are coupled to the media playback system 100 via the WAN 107 (FIG. 1) and/or a LAN 706 connected to the WAN 107. In this way, the various playback, network microphone, and controller devices 102-104 of the media playback system 100 may communicate with the remote computing device(s) 105 to invoke functions of the VAS 160.

The network system 700 further includes additional remote computing device(s) 705 (e.g., cloud servers). The remote computing device(s) 705 may be associated with a media service provider 767, such as SPOTIFY® or PANDORA®. In some embodiments, the remote computing device(s) 705 may communicate directly the computing device(s) of the VAS 160. In addition or alternately, the remote computing device(s) 705 may communicate with the media playback system 100 and/or other intervening remote computing device(s).

III. Example Conversion to Home Graph Hierarchy

As discussed above, the media playback system 100 may be arranged into various zones and zone groups as part of a household. For the purposes of discussion, this hierarchy is referred to as the zone hierarchy, so as to distinguish from the presently disclosed home graph hierarchy. FIG. 7A is a representation of the zone hierarchy, which includes, at respective levels, a zone, a zone group, and a household, as shown. A zone includes an individual playback device 102 or, alternatively, a bonded zone of multiple playback devices 102 configured to operate as a single functional unit. A zone group includes two or more zones configured to play back audio content in synchrony. A household refers to all of the zones of the media playback system 100.

Figure 7B:
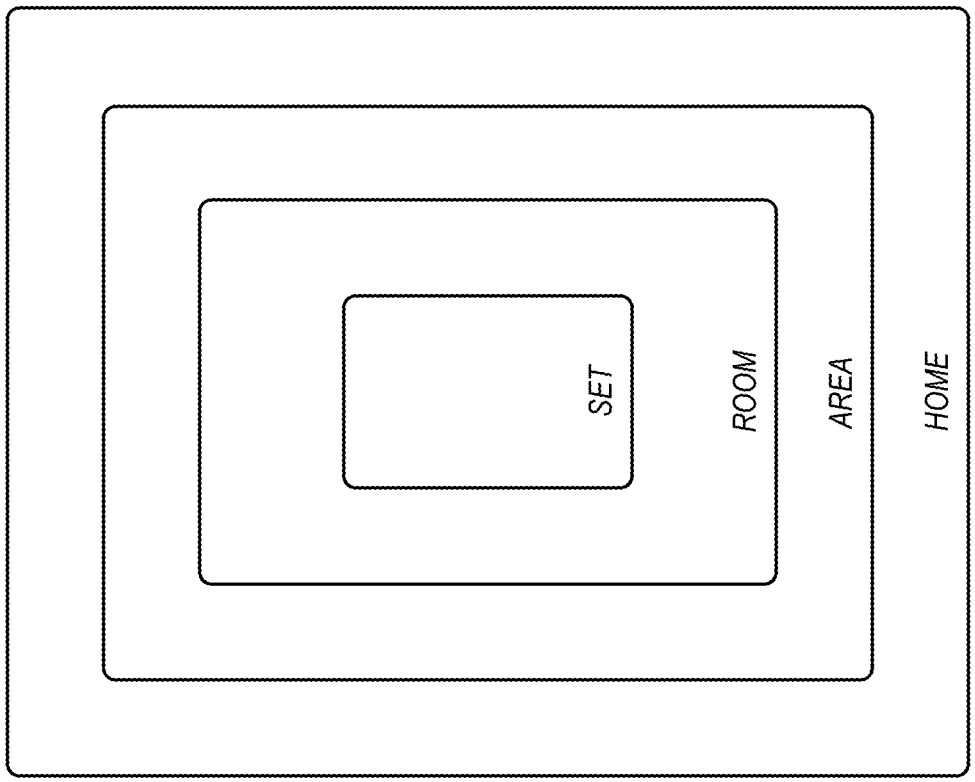
FIGS. 7A and 7B are representations of example hierarchies in accordance with aspects of the disclosure.
Figure 7A:
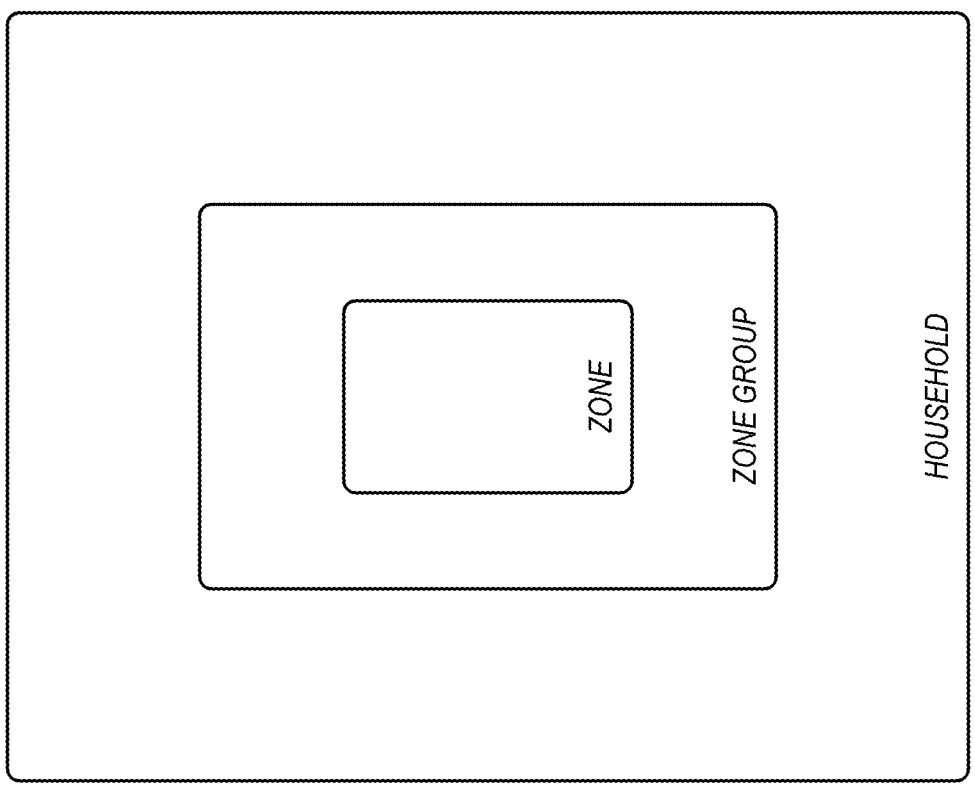

FIG. 7B is a representation of the home graph hierarchy, which includes, at respective levels, a Set, a Room, an Area, and a Home.

Like a zone, a Set includes individual playback device or, alternatively, a bonded zone of playback devices configured to operate as a single functional unit. As noted above, examples of bonded zones include a stereo pair (as shown in FIG. 3A), a surround sound configuration (as shown in FIG. 3C), or one or more playback devices bonded with a subwoofer (as shown in FIG. 3B). In each of these bonded zone configurations, the playback devices of the bonded zones play different portions of the same content (e.g., different channels (e.g., right and left) or different frequency ranges (e.g., bass vs. full-range)).

A Room of the home graph hierarchy includes zero or more Sets. Under the home graph hierarchy, a "Room" is a container for Sets in a given room of a home. In contrast to a zone, a room can include multiple playback devices (that are not part of a bonded zone). Under the zone hierarchy, each playback device (that is not part of a bonded zone) would be considered a separate zone. Two or more zones within the same physical room might be confusing, as users tend to equate rooms of their homes with zones under the zone hierarchy. Under the home graph hierarchy, a room with two playback devices could be designated as a Room with two Sets, each set including one playback device.

Generally, each room will include at least one Set. However, in some cases, a user might create Rooms for rooms of their home that do not contain a Set. Such empty Rooms might provide a placeholder for that room, and remind a user that there are no smart devices within that room.

The next level of the example home graph hierarchy is "Area." Many homes are naturally divided into areas, such as upstairs and downstairs. Under a first example implementation of home graph, an Area includes two or more rooms. For instance, a user may pre-define two Areas named "Upstairs" and "Downstairs," which include the Rooms upstairs and the Rooms downstairs in the home, respectively. Under a second example, an area contains two or more sets (possibly in different Rooms).

One distinction between a zone group and an Area is how they are formed. Areas are pre-defined (e.g., during a set-up procedure) and are generally static (similar to how the layout of a home is generally static). Individual Sets and Rooms within the Area can be individually operated within affecting the Area. In contrast, when two or more zones are joined into a zone group, a given zone of the zone group cannot be operated individually until that zone is removed from the zone group (effectively causing the zone group to cease to exist). Zone groups are created by via a series of user inputs to select the constituent zones and instruct the selected zones to form the zone group.

Areas form only when they are targeted (selected) using a GUI or VUI. This facilitates individual control of constituent Rooms and Sets when individual control is desired while also maintaining the ability to control an entire Area as a functional unit. Moreover, under this arrangement, a given Room can belong to multiple Areas. For instance, a given Home might include a "Front Area" that includes a "Living Room" Room, a "Dining Room" Room, and a "Kitchen" Room and an "Eating Area" Area that includes the "Kitchen" Room as well as the "Dining Room" Room. These two Areas may be targeted individually (e.g., "play music in "Front" or "play David Bowie in Eating Area") or together (e.g., "play music in "Front and Eating Areas") to play music in the Rooms that are the union of the two Areas.

The highest level of the home graph hierarchy is "Home." A Home refers to the entire house, and all of the Rooms, Sets, and Areas within. As such, a Home generally refers to all of the smart devices within a home. Targeting a Home or "everywhere" targets all Rooms within the Home (and all constituent Sets). Targeting the Home does not necessarily invoke an Area, as targeting the Home targets all Rooms and targeting Areas would be redundant.

Under home graph, each Set, Room, Area, and Home is assigned a human-readable name. To aid in identifying a Set based on its name, the name of a particular Set is generally indicative of its location within the home (e.g., "Living Room TV," "Kitchen Counter," "Credenza," among others). Similarly, the names of each Room with a Home correspond to the rooms of a home. Likewise, as indicated above, Area names correspond to areas of a home, such as "Upstairs" and "Downstairs" or "Front" and "Back" or "Main Level," among other examples. In some implementations, the Home may be referred to in a VUI or GUI by reference to "everywhere."

A user may configure the names of Sets, Rooms, Areas, and the Home during a set-up procedure using a controller interface (e.g., controller interfaces 440a and 440b shown in FIGS. 4A and 4B) or voice commands, among other options. The names of Sets may be stored in data storage of one or more playback devices of the media playback system 100 and shared among devices in the Home via a network (e.g., via a LAN including a network router 106).

In some examples, the media playback system 100 is configured using the zone hierarchy. Example techniques may involve automatic conversion of the zones hierarchy to the home graph hierarchy.

Figure 8A:
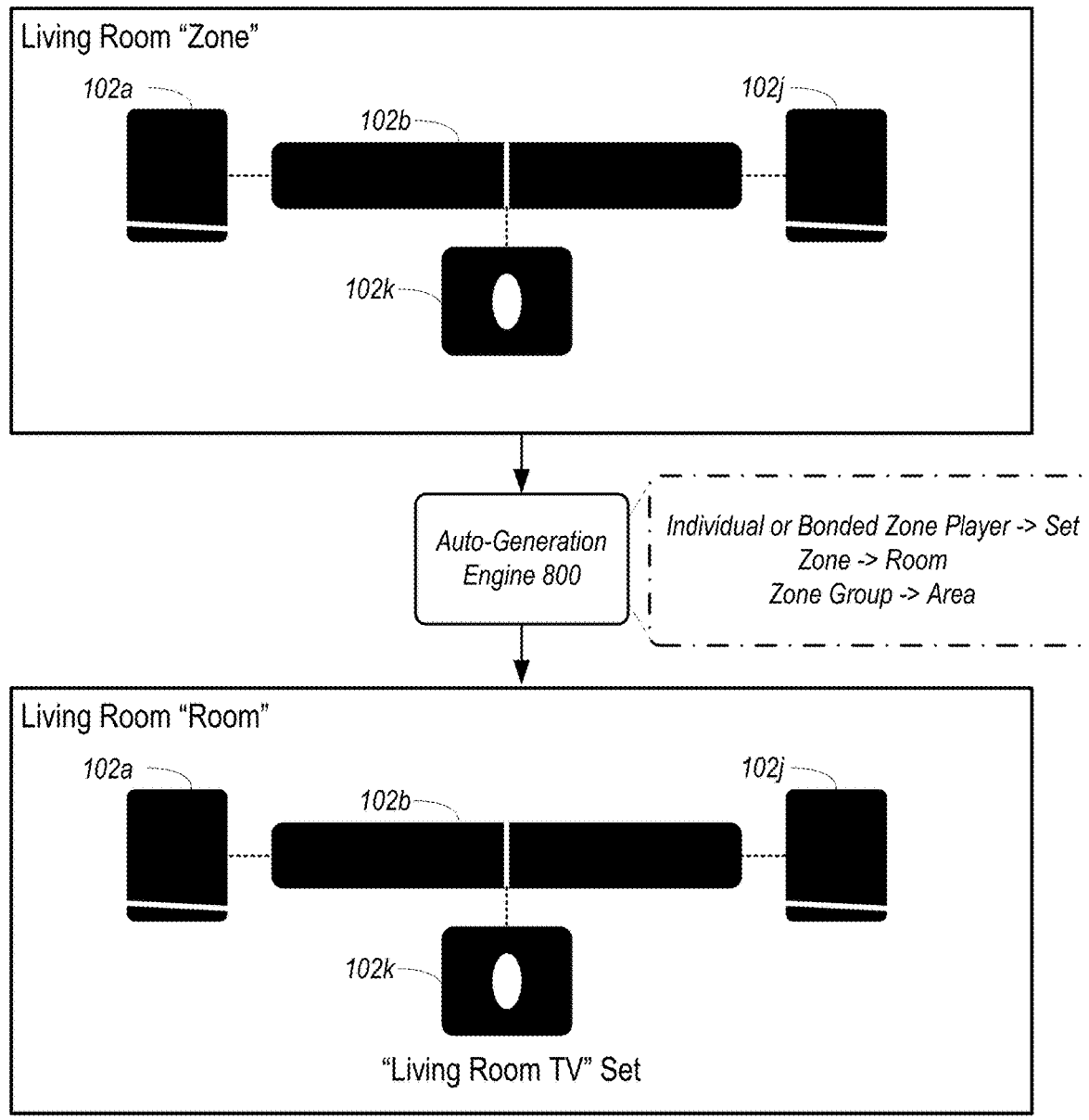
FIG. 8A is a functional block diagram of an example auto-generation engine 800 in accordance with aspects of the disclosure.

FIG. 8A shows an auto-generation engine 800. As shown in FIG. 8A, the auto-generation engine 800 converts the Living Room zone of the media playback system 100 to corresponding Rooms and Sets of the home graph hierarchy. The auto-generation engine 800 may be implemented on the playback device 102, the NMD 103, the control device 104, or the remote computing devices 105. The auto-generation engine 800 may be invoked in response to the media playback system 100 detecting a setup request from a smart hub or a discovery message from a smart hub that requests the media playback system 100 to respond with information on its devices.

In operation, the auto-generation engine 800 may receive, as input, state variables (e.g., a state table) indicating the configuration of one or more playback devices of the media playback system 100 (e.g., one or more of the playback devices 102*a-m*). The state variables indicate the zone names of the respective zones and their configuration as individual devices or bonded zones. The auto-generation engine 800 reads the configuration of each zone from the state variables and generates Rooms, Sets, Areas, and/or a Home from these configurations as output.

Based on the state variables, the auto-generation engine 800 may generate Rooms based on existing zones in the media playback system 100. For instance, as shown in FIG. 8A, the configuration of the Living Room zone in the state variables may cause the auto-generation engine 800 to form a Room. The auto-generation engine 800 may assign the new Room with the same name as the zone ("Living Room").

Further, the auto-generation engine 800 configures the playback devices 102*a*, 102*b*, 102*j*, and 102*k* in the Living Room as one or more Sets within the "Living Room" Room. If these devices are configured into a bonded zone, the auto-generation engine 800 may configure these devices as a single set (e.g., a "Living Room TV" Set). Alternatively, the auto-generation engine 800 may configure each device as a respective set (e.g., as "Front," "Right Surround," and "Left Surround" Sets).

In some cases, two or more zones under the zone hierarchy may each have names that correspond to the same room of a home. For instance, an example media playback system may have "Living Room" and "Living Room TV" zones to represent a playback device in the living room for general purpose audio playback and another that is used primarily for playing audio accompanied with video playing on a connected television. The playback devices in these two zones may be added as respective Sets to a "Living Room" Room.

In some implementations, zone names under the zone hierarchy may be configured during set-up of a new playback device via selection of a zone name from a pre-defined list of zone names corresponding to different rooms of a house. For instance, the pre-defined list may include room names commonly found in many residences such as Kitchen, Living Room, Master Bedroom, Office, and Bathroom, among others. Yet further, users might provide custom zone names instead of selecting from the pre-defined list.

When converting zones having zone names from the pre-defined list, the auto-generation may assume that these zones should be converted to Rooms, as the pre-defined zone names may correspond to rooms of a home. However, custom zone names (e.g., "Living Room TV") might not necessarily correspond to a room of a home but might instead be more closely represented as Sets within a Room. As such, in some examples, rather than automatically converting zones with custom zone names to Rooms, the media playback system may seek input from a user on whether to convert a given zone to a Room or Set. For instance, a control device of the media playback system may display one or more prompts to select between a Room or Set when converting a zone with a custom zone name.

As indicated above, Rooms and Sets each share certain characteristics with zones, but are also each different from zones. Like zones, Rooms are representative of a physical room in a home, but unlike zones, can include multiple, individually controllable playback devices (as respective Sets). Like zones, Sets can include an individual playback device (or a bonded zone), but unlike zones, are no longer representative of a physical room. As such, the auto-generation engine 800 takes certain characteristics from zones (e.g., names) and applies those characteristics when forming Rooms and takes other characteristics from zones (e.g., the individual device or bonded zone configuration) and applies those other characteristics in forming Sets.

Zone groups indicated in the state variables may be used to facilitate the creation of Areas. If the state variables indicate that a zone group is configured, the auto-generation engine 800 may cause the control device 104 to display a prompt with a selectable control that when selected, configures a new Area based on the combination of Rooms (formerly zones) in the zone group.

Further, given the transitory nature of zone groups, a zone group might not necessarily be formed at the time that the auto-generation engine 800 is run. The media playback system 100 may store historical data indicating zone groups that have been created and how frequently. If a given zone group is created at a threshold frequency (e.g., more than a threshold number of times over a period of time), the auto-generation engine 800 may cause the control device 104 to display a prompt with a selectable control that when selected, configures a new Area based on the combination of Rooms (formerly zones) in the frequently created zone group.

Figure 8B:
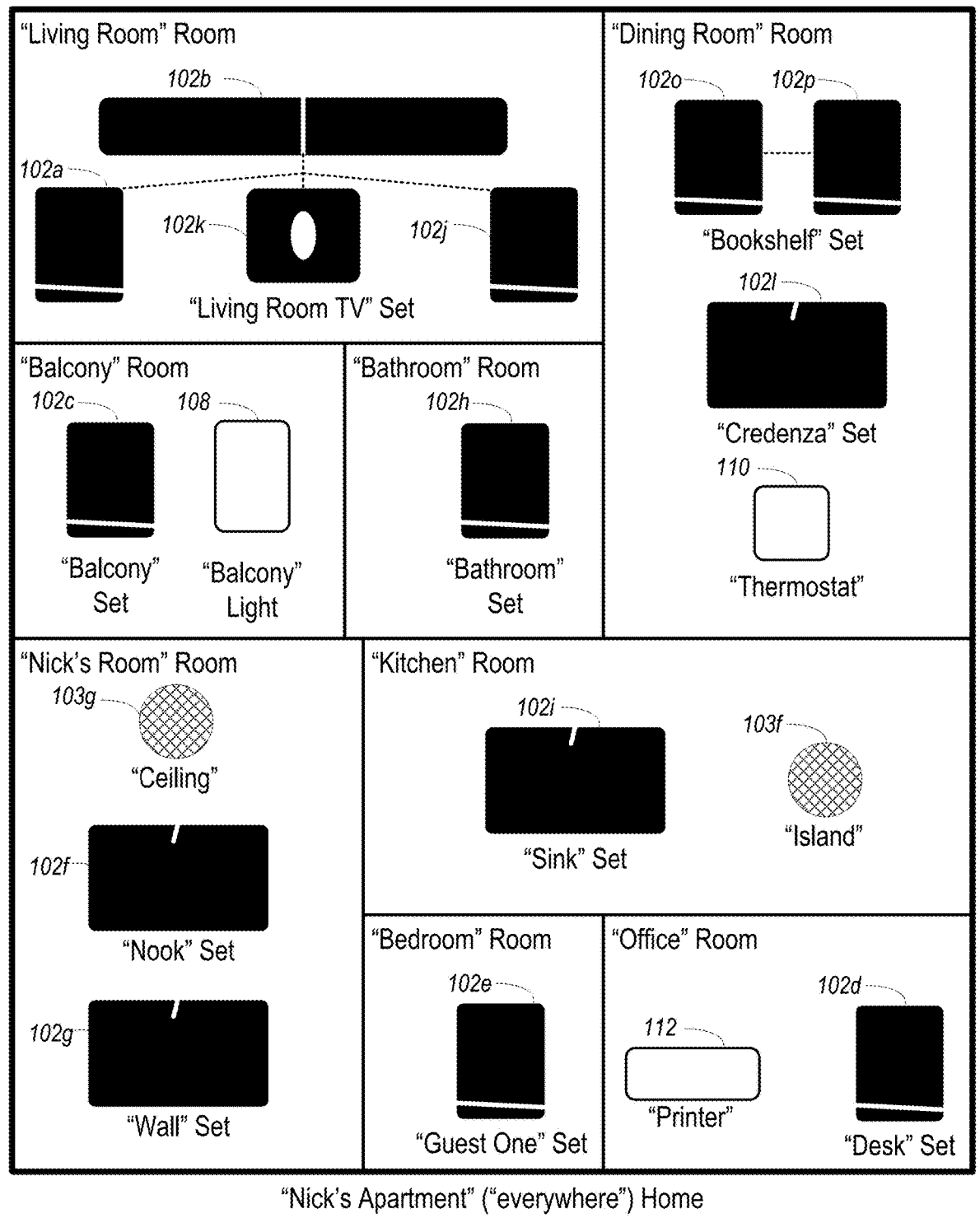
FIG. 8B is a representation of an example media playback system using a home graph hierarchy in accordance with aspects of the disclosure.

FIG. 8B is a graphical representation of a home graph hierarchy of the media playback system 100 created by auto-generation engine 800 from the zone hierarchy of the media playback system 100. As shown, the auto-generation engine 800 formed a new Home called "Nick's Apartment" (as known as "everywhere") that includes all of the playback devices 102 of the media playback system 100. The auto-generation engine 800 formed "Living Room," "Dining Room," "Balcony," "Bathroom," "Nick's Room," "Kitchen," "Bedroom," and "Office" Rooms from the previous zones. Moreover, the auto-generation engine 800 formed Sets from the individual playback devices (or bonded zones) that were previously zones.

As shown, the Rooms of media playback system 100 can also include other smart devices other than audio playback devices. For instance, the "Balcony" Room includes the illumination device 108 and the "Dining Room" Room includes the thermostat 110. In alternative implementations, smart devices that affect multiple rooms of a home (such as the thermostat 110) might not be assigned to a Room, but are instead a Set assigned to the Home generally. Further, if a smart device affects only a portion of the home, the media playback system 100 may assign that device to an Area. For instance, if a home includes a dual zone HVAC system, a Home might include an "Upstairs" Area with a first "Upstairs" thermostat 110 for that level of the home and a "Downstairs" Area with a second "Downstairs" thermostat 110 to control HVAC for the other level of the home.

IV. Example Room, Set, Area and Group Control

As described above, the playback devices 102 of media playback system 100 may be controlled via a VUI of NMD 103, a GUI displayed by the control device 104, or via the user interface 236 of a playback device 102, or a combination thereof. In some cases, configuration of playback devices into the home graph hierarchy may cause a given control command (e.g., transport control) to be carried out on multiple playback devices.

When a particular playback device 102 (e.g., playback device 102*a*) receives input representing a given control command on its own user interface, that control command is carried out by that playback device 102. Further, the control command is also carried out on any other playback devices 102 that are in the same Set as the particular playback device, as these playback devices 102 are part of a bonded zone with the particular playback device 102 (e.g., playback devices 102b, 102j, and 102k of the "Living Room" Set, which are in a bonded zone with playback device 102a).

A control command may extend to the Room, Area, or Home if that Room or Area (or the entire Home) is targeted for playback. For instance, if the Room that includes the particular playback device 102 is presently targeted (selected) for playback (instead of only the Set), then all playback devices in all Sets within the Room carry out the command, as all of these playback devices 102 are configured to play back in synchrony. Similarly, if an Area that includes the particular playback device 102 is presently targeted (selected) for playback (instead of only the Room), then all playback devices in all Sets within all Rooms in the Area carry out the command, as all of these playback devices 102 are configured to play back in synchrony. Finally, if the entire Home is targeted for playback, then all playback devices 102 carry out the command.

If the particular playback device 102 that receives a control command is part of a group configuration, then other playback devices 102 in that group configuration will also carry out the command. Rooms, Sets, and Areas may be grouped with one another into group configurations in which playback devices 102 of the grouped Sets, Rooms, and/or Areas are configured to play back audio content in synchrony. Room Groups are denoted herein using a '+' symbol (e.g., "Living Room+Dining Room"). The zone group capability for synchronous playback is a feature of the example playback devices 102 using either the zone hierarchy or the home graph hierarchy. For instance, if playback device 102a receives a control command when the "Living Room" Room is in a Room Group with the "Dining Room" Room, then the control command is carried out by all playback devices 102 in the both the "Living Room" and "Dining Room" Rooms, as all of these playback devices 102 are configured to play back in synchrony. In various embodiments, the groups under the home graph hierarchy may incorporate example methods and systems of groupings described in U.S. Pat. No. 8,483,853 filed Sep. 11, 2007, and titled "Controlling and manipulating groupings in a multi-zone media system," which is incorporated herein by reference in its entirety.

As described above, the NMD 103 or the control device 104 may be used to control the playback device 102 of media playback system 100. Control inputs, such as transport control, targeting of Sets/Rooms/Areas/Home, volume adjustments, among other various media playback controls, received by the NMD 103 or the control device 104 may be distributed as control messaging to the physical playback devices 102 via a network provided by router 106. The particular playback devices that are instructed via control messaging to carry out a given command are dependent upon the Sets, Rooms, Areas, Home, or groups that are targeted. In some embodiments, the media playback system 100 may route control messaging from the NMD 103 or the control device 104 directly to a targeted Set or Room (e.g., via router 106).

For Rooms that include two or more Sets, each with respective playback devices 102, the media playback system 100 may route control messaging from the NMD 103 or the control device 104 directly to each Set (i.e., to each playback device of each Set) or indirectly through a Room Coordinator. The Room Coordinator is a particular playback device 102 of a given Set within a Room that, like a zone group coordinator, provides audio playback data (i.e., playback and/or synchronous playback timing information) to other Sets within the Room so as to facilitate synchronous playback among Sets within the Room. The Room Coordinator may be configured to receive control messages from the control device 103 and distribute the messages to other playback devices of other Sets within the Room. In various embodiments, the Room Coordinator may incorporate example methods and systems of zone group coordinators described in previously incorporated U.S. Pat. No. 8,234,395 filed Apr. 1, 2004, and titled "System and Method for Synchronizing Operations Among A Plurality of Independently Clocked Digital Processing Devices." In addition, the Room Coordinator may incorporate example methods and systems of zone group coordinators described in U.S. Pat. No. 9,654,545 filed Sep. 30, 2013, and titled "Group Coordinator Device Selection," which is incorporated herein by reference in its entirety.

Similarly, for group configurations that include two or more Rooms configured to play back audio content in synchrony, the media playback system 100 may route control messaging from the NMD 103 or the control device 104 directly to each Room (i.e., to each playback device of each Set within each Room) or indirectly through a Room Group Coordinator. A Room Group Coordinator is a particular playback device 102 of a Room that, like a zone group coordinator, provides audio playback data (i.e., playback and/or synchronous playback timing information) to other Rooms within the Room Group so as to facilitate synchronous playback among Rooms within the Room Group. The Room Group Coordinator may be configured to receive control messages from the control device 103 and distribute the messages to other playback devices within the Room and to playback devices of other Rooms. In various embodiments, the Room Group Coordinator may incorporate example methods and systems of zone group coordinators described in previously incorporated by reference U.S. Pat. Nos. 823,439 and 9,654,545.

In various embodiments, the media playback system 100 may incorporate example methods and systems for multi-zone control described in U.S. Pat. No. 7,571,014 filed Jun. 5, 2004, and titled "Method and Apparatus for Controlling Multimedia Players in a Multi-Zone System," which is incorporated herein by reference in its entirety.

In example implementations, the media playback system 100 is concurrently controllable using multiple control interfaces 440. For instance, a first control interface may be a "native" controller interface, which might be available for one or more platforms (e.g., iOS®, Android®, Windows®, MAC®, etc.). Multiple instances of this controller interface on different physical control devices 104 may concurrently control the media playback system 100. A second control interface may be a "third-party" control interface. Access to the media playback system 100 may be provided through an Application Programming Interface (API) to allow third-parties to make alternate control interfaces available. For instance, a smart home service provider might publish a controller interface that includes controls for the media playback system 100, as well as other smart home devices such as smart plugs, smart lights, NMDs, and others.

Further, such a controller interface may include controls for media playback systems from multiple manufacturers which adhere to a standard (e.g., AirPlay®). The media playback system(s) may incorporate example methods and systems described in application Ser. No. 15/714,950 filed Sep. 25, 2017, and titled "Grouping in a System with Multiple Media Playback Protocols," which is incorporated herein by reference in its entirety. In addition, the media playback system(s) may incorporate example methods and systems described in application Ser. No. 15/714,882 filed Sep. 25, 2017, and titled "Networked Device Group Information in a System with Multiple Media Playback Devices," which is incorporated herein by reference in its entirety. In addition, the media playback system(s) may incorporate example methods and systems described in application Ser. No. 15/714,927 filed Sep. 25, 2017, and titled "Grouped Zones in a System with Multiple Media Playback Protocols," which is incorporated herein by reference in its entirety.

Under the home group hierarchy, media playback systems from multiple manufactures may be configured into the same Home. The different levels of the home graph hierarchy may help with partitioning these different systems into functional units, which may simplify control. For instance, a first media playback system may be assigned into a first set of Rooms and/or Sets that use a first API to generate control messaging, while a second media playback system is assigned into a second set of Rooms and/or Sets that use a second API to generate control messaging. These different APIs may utilize different control messaging techniques, such as the different control messaging techniques described above.

V. Example Control of Sets, Rooms, Areas, and Home Using VUI

Further example techniques involve control of the various Sets, Rooms, Areas within a Home using various user interfaces, such as one or more VUIs. Names of Sets, Rooms, Areas within a Home are used to target the smart device(s) (e.g., playback devices 102) within a given Set, Room, or Area.

Figure 9A:
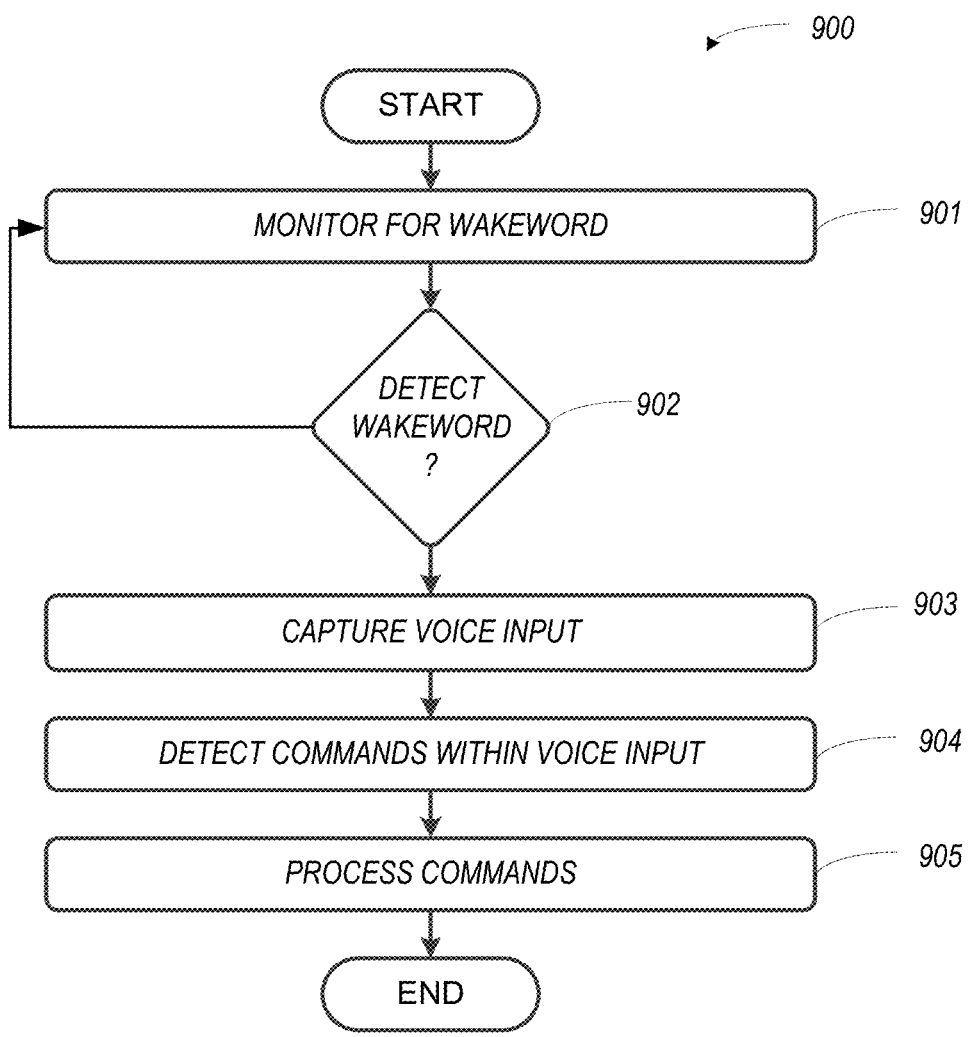
FIG. 9A is a flow diagram of an example method for invoking a voice assistant service in accordance with aspects of the disclosure.

FIG. 9A is an example flow diagram of a method 900 for controlling Sets, Rooms, Areas within a Home with a VUI. The method 900 presents an embodiment of a method that can be implemented within an operating environment involving, for example, the media playback system 100 or another media playback system configured in accordance with embodiments of the disclosure.

The method 900 may involve transmitting and receiving information between various devices and systems as described herein and/or in previously referenced U.S. patent application Ser. No. 15/438,749. For example, the method may involve transmitting and receiving information between one or more of the playback, network microphone, controller, and remote computing devices 102-104 of the playback system, and the remote computing device(s) 105. Although the blocks in FIG. 9 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flow diagrams show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. The computer readable medium may be comprised by one or more of the memories described above with reference to the various playback, network microphone, controller, and remote computing devices. In addition, for the method 900 and other processes and methods disclosed herein, each block in FIG. 9 may represent circuitry that is wired to perform the specific logical functions in the process.

In some embodiments, the method 900 may further involve receiving user input for launching an application, receiving user and user account information, determining system parameters, interacting with a music service, and/or interacting with a controller, such as for displaying, selecting, and entering system information. In various embodiments, the method 800 may incorporate example methods and systems described in application Ser. No. 15/223,218 filed Jul. 29, 2016, and titled "Voice Control of a Media Playback System," which is incorporated herein by reference in its entirety.

Referring back to FIG. 9, at blocks 901 and 902, the method 900 involves monitoring for and detecting a wake word in a voice input. For instance, the media playback system 100 may analyze received audio representing voice input to determine if wake words are represented. The media playback system 100 may analyze received audio using one or more wake word detection algorithms, such as via a wake-word detection component, as discussed above.

At block 903, the method 900 involves capturing the voice input following detection of the wake word at blocks 901 and 902. In various embodiments, the voice input may be captured via one or more of the NMDs 103 of the playback system 100. As used herein, the terms "capture" or "capturing" can refer to a process that includes recording at least a portion of a voice input, such as a voice utterance following the wake word. In some embodiments, the captured voice input may include the wake word. In certain embodiments described below the terms "capture" or "capturing" can also refer to recording at least a portion of a voice input and converting the voice input to a particular format, such as text, using e.g., speech to text conversion.

At block 904, the method 900 involves detecting one or more commands 992 (FIG. 9B) within voice input captured at block 904 and processing those commands at block 905. In various embodiments, the method 900 may detect commands by parsing voice input and determining if one of the command 992 has a syntax that matches a syntax found in the captured voice input. In this manner, the method 900 may using the matching syntax to detect an intent of a command in the voice input. The matching syntax may be a word, a group of words, a phrase, etc. The method 800 may process commands using VAS 160.

Figure 9B:
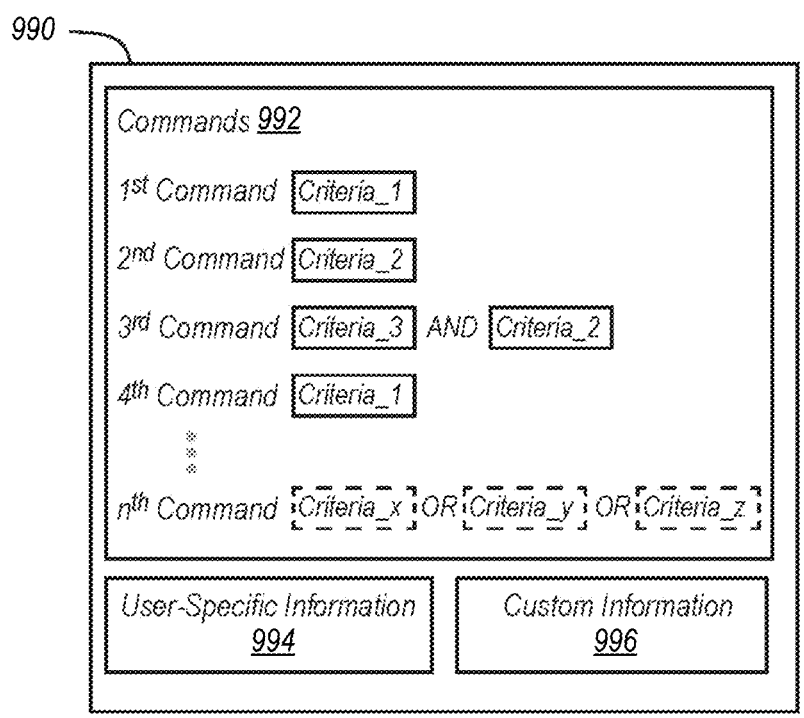
FIG. 9B is a block diagram of an example set of command information in accordance with aspects of the disclosure.

The media playback system 100 may store a set of command information, such as the set of command information 590 stored in the memory 216 of a network microphone device. Referring to FIG. 9B, an example set of command information 990 may contain a listing of commands 992. The set of command information 990 may be a data table or other data structure. The set of command information 990 may be stored, for example, in the memory of one or more of the playback, controller, network microphone, and/or remote computing devices 102-105. In some embodiments, the set of command information 990 may be accessible via the metadata exchange channel and/or any other communication path between the media playback system and a remote computing system.

In the illustrated example, the set of commands 992 includes $1^{st}$ through $n^{th}$ Commands. As an example, the $1^{st}$ Command may be a command for initiating playback, such as when the user says "play music." The $2^{nd}$ Command may be a control command, such as a transport control command, for e.g., pausing, resuming, skipping, playback. For example, the $2^{nd}$ command may be a command involving a user asking to "skip to the next track in a song." The $3^{rd}$ Command may be a zone targeting command, such as command for grouping, bonding, and merging playback devices. For example, the $3^{rd}$ command may be a command involving a user asking to "group the Living Room and the Dining Room."

As further shown in FIG. 9B, the commands 992 are associated with command criteria also stored in the set of command data 990. For example, the $1^{st}$ Command is associated with one or more first command Criteria_1, the $2^{nd}$ Command is associated with one or second command Criteria_2, and the $3^{rd}$ Command is associated with one or more third command Criteria_3.

The command criteria may involve determinations relating to certain variable instances. Variables instances may be stored with identifiers (e.g., tags), which may or may not be associated with a user account. Variable instances may be continuously, periodically, or aperiodically updated to include new custom names added or removed by the user or associated with the user's account. A custom name may be any name supplied by the user which may or might not already exist in a database.

Variables instances may be present in keywords in voice input; referenced as names and/or values stored in a state table; and/or dynamically stored and modified in a state table via one or more the playback, network microphone, controller, and remote computing devices 102-105. Example variable instances may include zone variable instances, control state variable instances, target variable instances, and other variable instances. Zone variable instances may involve, for example, identifiers representing zones, zone groups, playback devices, network microphone devices, bonded states, areas, etc., including those described above. Control state variables may involve, for example, a current control state of individual playback and network microphone devices and/or multiple devices, such as information indicating devices playing music, volumes of the devices, queues stored on the devices, etc.

Target variable instances may involve, for example, certain control state and/or advanced state information corresponding to a group of devices, bonded devices, and merged devices. Target variable instances may also correspond to a calibration state, such as equalization settings, of various devices in the media playback system 100. Under the home graph hierarchy, target variable instances may involve names of Sets, Rooms, or Areas within the home.

Other variable instances are possible. For example, a media variable instance may identify media content, such as audio content (e.g., a particular track, album, artist, playlist, station, or genre of music). In some embodiments, media variables may be identified in response to searching a database for audio or content desired by user. A media variable may be present in a voice input; referenced, maintained, and updated in a state table; or referenced in query, as discussed above. As another example, certain variable instances may indicate a location or proximity of a user within a home environment, whether a user's voice profile is detected in a given voice input, whether a specific wake word is detected, etc. Variable instances may include custom variable instances.

In certain embodiments, at least some of the criteria stored in the set of command information 990 may include a scalar vector of variable instances or other such set of variable instances. For example, Criteria_1 may include a vector that identifies zone variables representing the zones shown in the media playback system 100 of FIG. 1. Such a vector may include [Balcony, Living Room, Dining Room, Kitchen, Office, Bedroom, Nick's Room]. In one embodiments, Criteria_1 may be satisfied if two or more of the zone variables within the vector are detected as keywords in a voice input.

Some types of variables may be scalar in that the scalar variables may be formed into a vector or set which contains more than one instance of the same variable. A vector of a scalar variable may have the format or syntax when spoken by the user of "[first scalar variable] and [second scalar variable]," "[first scalar variable], [second scalar variable], and [third scalar variable]," or "[first scalar variable] [second scalar variable] [third scalar variable]." For example, a target variable may be a scalar variable, and the user may specify that media content be played in more than one target Set, Room, or Zone such as "Kitchen, Living Room, and Dining Room." In some aspects, a vector or a predefined set of scalar variables may be given a name. A predefined vector named, for example, "downstairs" may be associated with an Area. To define an Area, the control device 300 can show a list of Rooms, and a user can select from the list of Rooms those Rooms to associate with the Area "downstairs."

The set of command information 990 may also include other information, such as user-specific information 994 and custom information 996. User-specific information 994 may be associated with a user account and/or a Home identifier (HI). Custom information 996 may include, for example, custom variables, such as custom zone names under the zone hierarchy, custom Room, Set, Area, or Home names, custom playlists, and/or custom playlist names. For instance, "Nick's Faves" may be a custom playlist with a custom name created by the user.

The commands described herein are examples and other commands are possible. For example, FIGS. 10C-10E show tables with additional example playback initiation, control, and zone targeting commands. As an additional example, commands may include inquiry commands. An inquiry command may involve, for example, a query by a user as to what audio is currently playing. For example, the user may speak an inquiry command of "Tell me what is playing in the Living Room."

In one example command, the user may say "play The Beatles in the Balcony and the Living Room." In this example, the method 800 may recognize the syntax to "play" as matching a syntax for the $1^{stg}$ playback initiation Command in the set of command information 990. Additionally, the method 800 may recognize "The Beatles" as a media variable, and the "Balcony" and "Living Room" as target variables (targeting the "Balcony" and "Living Room" Rooms). Accordingly, the syntax of the command may also be represented in terms of variable instances as follows: "Play [media variable] in [first target variable] and the [second target variable]." A similar command may include "Let me hear [media variable] in [first target variable] and the [second target variable]." "Let me hear" may be a cognate of the "play" intent, as discussed below.

In some embodiments, a user may speak a command that is accompanied by one target variable instance or no target variable instance. In one example, a user may give a voice input by simply saying "play some Beatles." In such a case, the method 800 may determine an intent to "play some Beatles" on a default Set or Room. In another case, the method 800 may determine an intent to "play some Beatles" on one or more playback devices based on other command criteria that may be satisfied for the command, such if the user's presence is detected in a particular Room while the user requests to play The Beatles. For example, the VAS 160 may cause the media playback system 100 to play back some Beatles in the "Living Room" Room shown in FIG. 1 if the voice input is detected by the playback device 102a in the "Living Room" Room.

Another example command may be a play next command which may cause a selected media content to be added to the top of a queue to be played next in a zone. An example syntax for this command may be to "play [media variable] next."

Another example of a command may be a move or transfer command which may move or transfer currently playing music and/or the playback queue of a zone from one zone to another. For example, a user may speak the voice input of "Move music to [target variable]" where the command word "move" or "transfer" may correspond to an intent to move playback state to another zone. As a related example, the intent of moving music may correspond to two media playback system commands. The two commands may be to group a first zone with a second zone and then to remove the second zone from the group to in effect transfer the state of the second zone to the first zone.

When receiving a name as a target variable as part of a voice input, the method 900 may involve identifying the corresponding Set, Room, or Area. In some example implementations, the name indicated by the target variable is checked from the outside in. For example, if the name "Credenza" is given, the VAS 160 checks against Home first, Areas next, then Rooms, and then Sets until a match is found. If a match is found first at the Areas level of the home graph hierarchy, then the corresponding Area is selected for carrying out the commands associated with the voice input. This causes all devices corresponding to the commands in the Area to be instructed to carry out the command (e.g., audio playback devices for an audio playback command, such as "play music . . . "). If a match is not found until the Set level of the home graph hierarchy, then only the individual device (or bonded zone) in that Set is instructed to carry out the command. In other implementations, the name indicated by the target variable is checked from the inside out, by first checking Sets, then Rooms, than Areas.

Identifying a corresponding Set, Room, or Area from a name received as a target variable may involve traversing a topology graph, topology table, topology tree, or other data structure mapping names to Sets, Rooms, or Areas within a Home. The specific structure of the data structure mapping names to Sets, Rooms, or Areas within a Home may depend on the search.

Figure 9F:
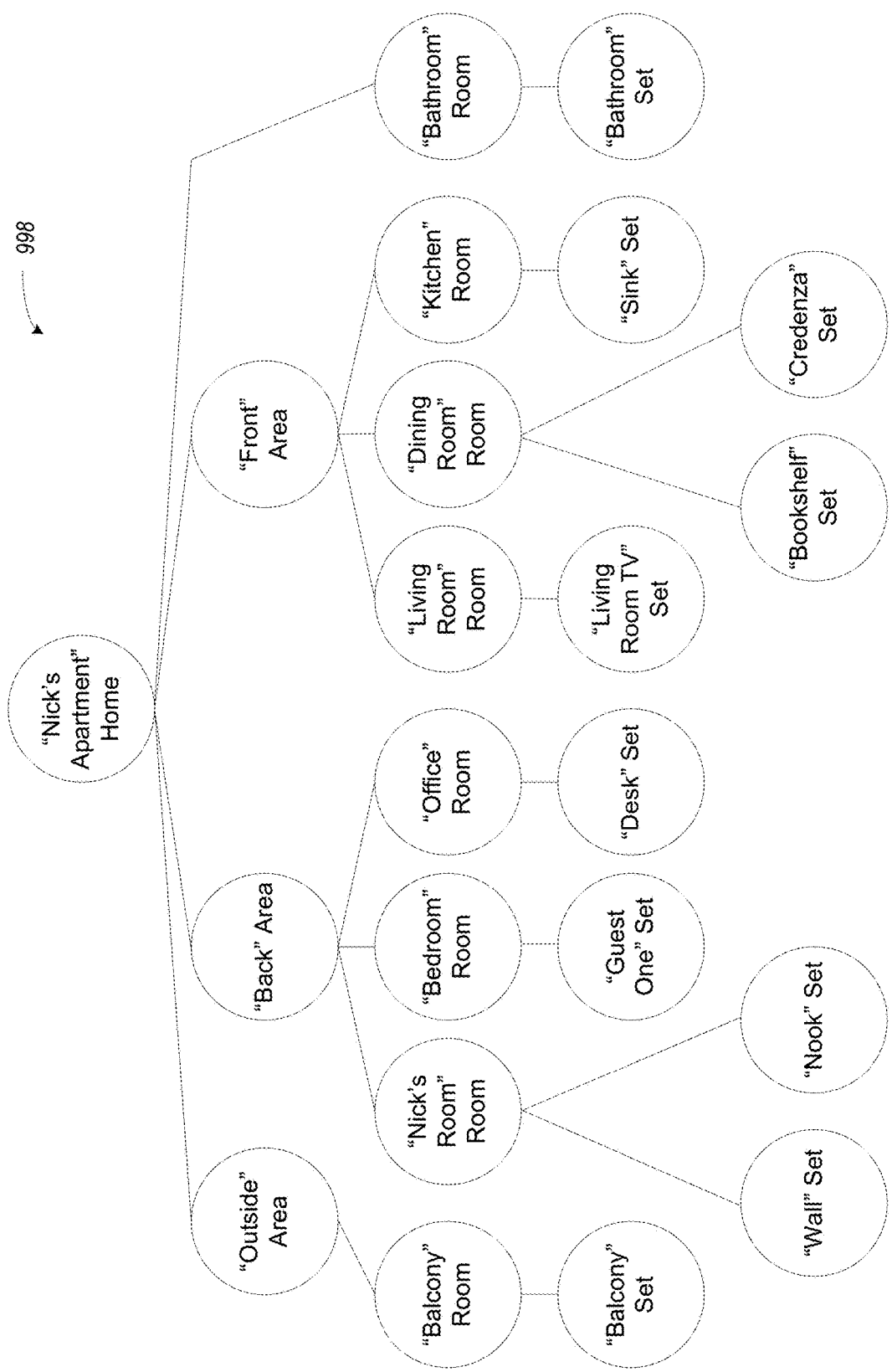
FIG. 9F is an example data structure of a home group hierarchy in accordance with aspects of the disclosure.

For instance, a given Home may be represented as a tree with Home as the Root, Areas as child nodes of the Home node, Rooms as child nodes of the Area(s), and individual Sets within the Rooms as child nodes of the Rooms (and great-grandchildren nodes of the Home). FIG. 9F shows an example data structure 998 mapping an example Home topology of media playback system 100. Although not shown in FIG. 9F, other smart devices may be mapped to the data structure as well. In alternative implementations, Sets may form multiple root nodes of a tree structure, with Rooms as child nodes of the Sets, Areas as child nodes of the Rooms, and so on.

In an attempt to speed up matching of a name as a target variable to a corresponding Room, the VAS 160 (or the media playback system 100) may maintain a look-up table (e.g., a hash table) that maps names as keys to Rooms as values. In example implementations, the look-up table may be checked first to see if the name is matched to a Room. If a match is found, the command may be carried out on the matching Room. If no match is found, the complete data structure mapping the entire Home (e.g., the tree shown in FIG. 9F) may be searched.

The intent for commands and variable instances that may be detected in voice input may be based on any of number predefined syntaxes that may be associated with a user's intent (e.g., play, pause, adding to queue, grouping, other transport controls, controls available via, e.g., the control devices 104). In some implementations, processing of commands and associated variable instances may be based on predetermined "slots" in which command(s) and/or variable(s) are expected to be specified in the syntax. In these and other implementations, sets of words or vocabulary used for determining user intent may be updated in response to user customizations and preferences, feedback, and adaptive learning, as discussed above.

In some embodiments, different words, syntaxes, and/or phrases used for a command may be associated with the same intent. For example, including the command word "play," "listen," or "hear" in a voice input may correspond to a cognate reflecting the same intent that the media playback system play back media content.

FIGS. 9C-9E show further examples of cognates. For instance, the commands in the left-hand side of the table may have certain cognates represented in the right-hand side of the table. Referring to FIG. 9C, for example, the "play" command in the left-hand column has the same intent as the cognate phrases in the right-hand column, including "break it down," "let's jam", "bust it." In various embodiments, commands and cognates may be added, removed, or edited in the table. For example, commands and cognates may be added, removed, or edited in response to user customizations and preferences, feedback, training, and adaptive learning, as discussed above. FIGS. 9D and 9E show examples cognates related to control and zone targeting, respectively.

In some embodiments, variable instances may have cognates that are predefined in a manner similar to cognates for commands. For example, a "Balcony" target variable in the media playback system 100 may have the cognate "Outside" representing the same target variable. Alternatively, the "Balcony Room" may be pre-defined as part of the "Outside" Area. As another example, the "Living Room" Room may have the cognates "Living Area", "TV Room," "Family Room," etc. to enable a user to refer to that Room by alternate names.

As noted above, the method 900 may process commands via the VAS 160. The example method 900 involves sending a voice input to the VAS 160. The method 900 may further involve processing a response from the VAS that received the voice input. Processing the response from the VA may include processing an instruction from the VAS to execute the command(s) in a voice input, such as playback, control, zone targeting, and other commands discussed above. In some embodiments, a remote computing device may be directed to initiate or control playback of content associated with media variables, which may be included in the initial voice input or be the result of a database search.

In some embodiments, processing the commands may cause media content to be retrieved. In one embodiment, media variables may be provided to the media playback system 100 as results from a database search for media content. In some embodiments, the media playback system 100 may directly retrieve media content from one or more media services. In other embodiments, the VAS may automatically retrieve media content in conjunction with processing a voice input received at block 905. In various embodiments, media variables may be communicated over the metadata exchange channel and/or any other communication path established between the media playback system 100.

In some embodiments, a database search may return results based on media variables detected in the voice input. For example, the database search may return an artist who has an album named the same as a media variable, the album name which matches or is similar to the media variable, a track named the media variable, a radio station of the media variable, a playlist named the media variable, a streaming service provider identifier of content related to the media variable and/or the raw speech-to-text conversion results. Using the example of "American Pie," the search results may return the artist "Don McLean," the album(s) named "American Pie," track(s) named "American Pie," radio station(s) named "American Pie" (e.g., identifier for Pandora radio station for "American Pie"), a music service (e.g., streaming music service such as SPOTIFY® or PANDORA®) track identifier for the track "American Pie" (e.g., SPOTIFY® track identifier for "American Pie", URI, and/or URL) and/or the raw speech-to-text result of "American Pie."

In some embodiments, the method 900 may involve updating playback queues stored on the playback devices in response to the change in a playlist or playback queue stored on a cloud network, such that the portion of the playback queue matches a portion or entirety of the playlist or playback queue in cloud network.

In response to causing an action in the media playback system 100, the method 900 may involve updating and/or storing information relating to the action at block 905. For example, one or more control state, zone state, zone identifiers or other information may be updated. Other information that may updated may include, for instance, information identifying specific playback device(s) that are currently playing a particular media item and/or a particular media item was added to the queue stored on the playback device(s).

In some embodiments, processing the commands may lead to a determination that the VAS needs additional information and audibly prompting a user for this information. For instance, the method 900 may involve prompting the user for additional information when executing a multi-turn command. In such cases, the method 900 may return to block 904 to capture additional voice input.

In various embodiments, the media playback system 100 may incorporate example methods and systems for room association and targeting described in application Ser. No. 15/682,506 filed Aug. 21, 2017, and titled "Room Association Based on Name," which is incorporated herein by reference in its entirety.

FIGS. 10A-15B are schematic diagrams showing various examples of voice inputs processed by the media playback system 100 and control interfaces which may represent states of the media playback system 100 before or after processing a voice input. As described below, command criteria associated with particular voice command(s) within voice input may provide voice control for a VAS, such as the VAS 160 discussed above. Voice input may be received by one or more of the NMDs 103, which may or may not be incorporated into one of the playback devices 102, as discussed above.

Although not shown for purpose of clarity, the voice input in the various examples below may be preceded by a wake word, such as "AMAZON's ALEXA®" or other wake words, as described above. In one aspect, the same wake word may be used to initiate voice capturing of a voice input that is to be sent to the VAS.

In one aspect, command criteria can be configured to group devices. In some embodiments, such command criteria may simultaneously initiate playback when the voice input involves a media variable and/or affected devices(s) are associated with a playback queue. FIG. 10A, for example, shows a user speaking a voice input to the NMD 103a to "play The Beatles in the living room and the balcony," and the controller interface in FIG. 10B shows the resulting grouping of the "Living Room" Room and the "Balcony" Room. In another example, the user may speak a specific track, playlist, mood, or other information for initiating media playback as described herein.

The voice input in FIG. 10A includes a syntax structure of "play [media variable] in the [first target variable] and the [second target variable]." In this example, the command to play meets command criteria that require two or more target variables as keywords in the voice input. In some embodiments, the "Living Room" Room's playback devices 102a, 102b, 102j, and 102k may remain in a bonded media playback device arrangement before and after speaking the voice input shown in FIG. 10A.

In some embodiments, the order in which the zone variables are spoken may dictate which of the playback device is designated at the "group head." For example, when the user speaks a voice input that contains the keyword "Living Room" followed by the keyword "Balcony," this order may dictate that the "Living Room" Room is to be the group head. The group head may be stored as a zone variable in the set of command information 990. The group head may be a handle for referring to a group of playback devices. When the user speaks a voice input that contains the group handle, the VAS 160 may detect an intent referring to all of the device(s) grouped with the "Living Room" Room. In this manner, the user need not speak keywords for each Set, Zone, or Area in a group of devices when collectively controlling the devices. In a related embodiment, the user may speak a voice input to change the group head to another Set, Zone, or Area. For example, the user may change the group head of the "Living Room" Room to be the "Balcony" Room (in such a case the interface may show the order of the group as Balcony+Living Room rather than Living Room+Balcony).

In an alternate example, FIG. 10C shows a user speaking a voice input "to play The Beatles," but omitting the other keywords in the voice input of FIG. 10B. In this example, music by The Beatles may be played on a default Set, Room, or Area, which may be pre-defined.

In yet another aspect, a name may refer to two or more elements in a home graph. For example, a user that speaks the voice input to "turn up the Balcony," as shown in FIG. 11A may refer to either the "Balcony" Room or the "Balcony" Set, which have the same name. Resolving whether the user intended the "Balcony" Room or "Balcony" Set may be resolved by navigating a data structure (e.g., data structure 998) to find the first matching name.

Yet further, a Set may share a name with another device in the same Room. For instance, illumination device 108 may also be named "Balcony." The media playback system 100 may resolve such conflicting element names by determining whether the user is in the vicinity of the playback device 102*c* and/or whether the "Balcony" is currently playing based on an associated control variable.

In a related aspect, the VAS 160 may determine to increase the volume of the playback device 102*c* in the "Balcony" Room when the user is in its vicinity, but not the volume in the "Living Room" Room where the user is not located. In such a case, the media playback system 100 may increase the volume in the "Balcony" Room, but not the "Living Room," Room as shown in FIG. 11B.

In various embodiments, voice inputs may be processed in conjunction with other inputs from the user via the individual playback, network microphone devices, and controller devices 102-104. For instance, a user may independently control the group volume, the individual volumes, playback state, etc. using the soft buttons and control features on the interface shown in FIG. 11B. Additionally, in the example of FIG. 11B, the user can press the soft button labeled "Group" to access another interface for manually grouping and ungrouping devices. In one aspect, providing multiple ways of interacting the media playback system 100 via voice inputs, controller inputs, and manual device inputs may provide seamless continuity of a control for an enhanced user experience.

As another grouping/ungrouping example, a voice input to "play Bob Marley in the Balcony," may cause the "Balcony" Room to automatically ungroup from the "Living Room" Room. In such a case, the "Balcony" Room may play Bob Marley and the "Living Room" Room may continue to play The Beatles. Alternately, the "Living Room" Room may cease playback if the command criteria dictate such as if the "Living Room" Room is no longer a group head of a group of playback devices. In another embodiment, the command criteria may dictate that the devices do not automatically ungroup in response to playback initiation commands.

Figure 12B:
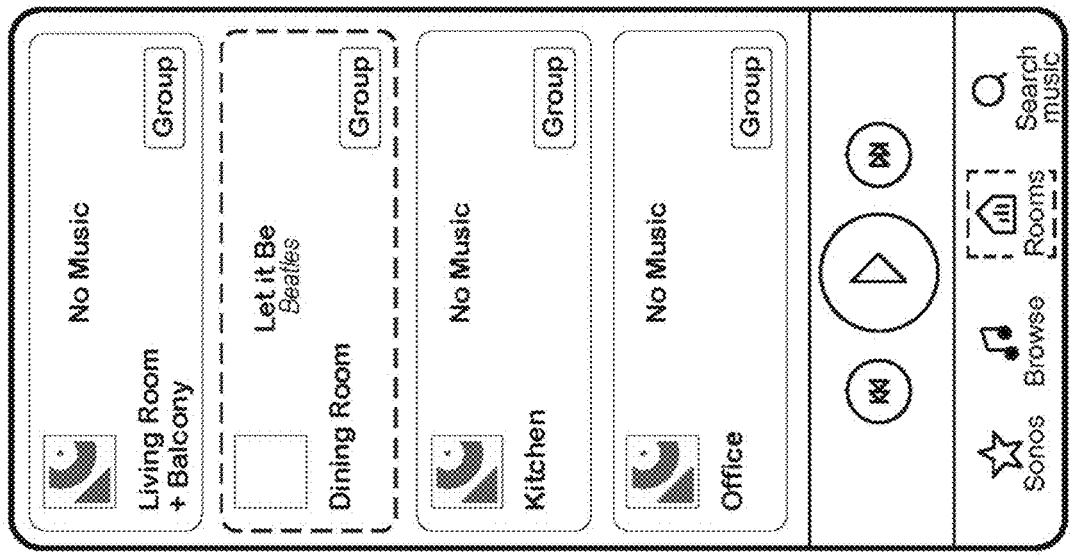
FIGS. 12A and 12B are diagrams showing example voice inputs for invoking a VAS in accordance with aspects of the disclosure.
Figure 12A:
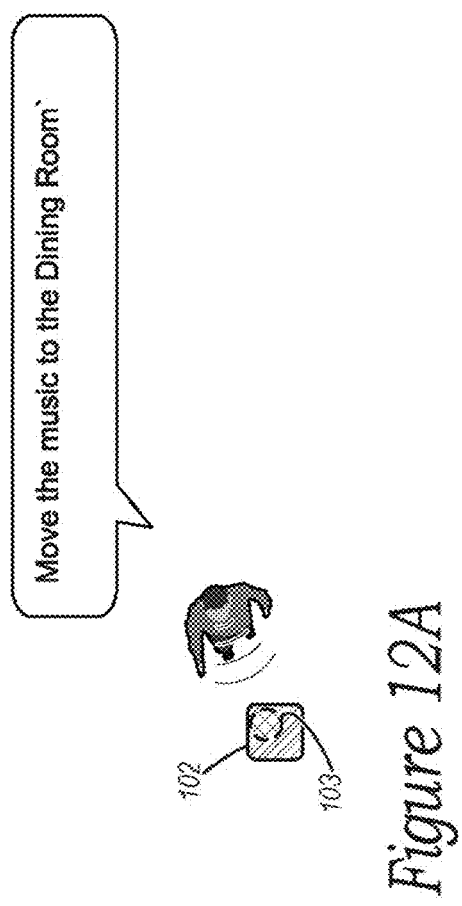

Command criteria may be configured to move or transfer currently playing music and/or the playback queue of a zone from one zone to another. For example, a user may speak the voice input of "move music from the Living Room to the Dining Room," as shown in FIG. 12A. The request to move music may move the music playing in the "Living Room" Room to the "Dining Room" Room, as shown in the controller interface of FIG. 12B.

In a related example, the user may move music to the "Dining Room" Room by speaking the voice input of "move music here" directly to the NMD 103*f* near the "Dining Room" Room shown in FIG. 1. In this case, the user does not expressly refer to the "Dining Room" Room, but the VAS 160 may infer the intent based on the user's proximity to the dining room. In related embodiments, the VAS 160 may determine to move the music to the "Dining Room" Room rather than another adjacent Room (such as the "Kitchen" Room) if it determines that the NMD 103*f* is bonded to the playback device 102*l* in the "Dining Room" Room.

In another example, the playback system 100 may infer information from metadata of currently playing content. In one such example, the user may speak "Move 'Let it Be' (or 'The Beatles') to the Dining Room," which identifies the particular music to move to the desired Set, Room, or Area. In this way, the media playback system can distinguish between content that may be actively playing and/or queued for playback in other playback zone(s) and/or zone group(s) for determining which of the content to transfer.

In yet another example, all the devices associated with a group head, such as the "Living Room" Room, may cease playback upon moving the music from the group head to the "Dining Room" Room. In a related example, the "Living Room" Room may lose its designation as a group head when music is moved away from it.

Figure 13B:
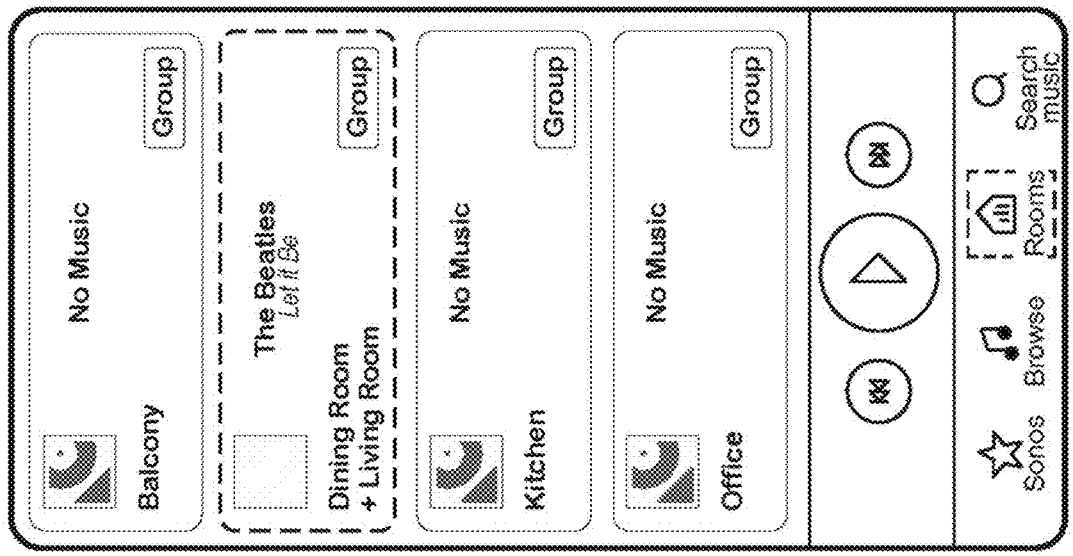
FIGS. 13A and 13B are diagrams showing example voice inputs for invoking a VAS in accordance with aspects of the disclosure.
Figure 13A:
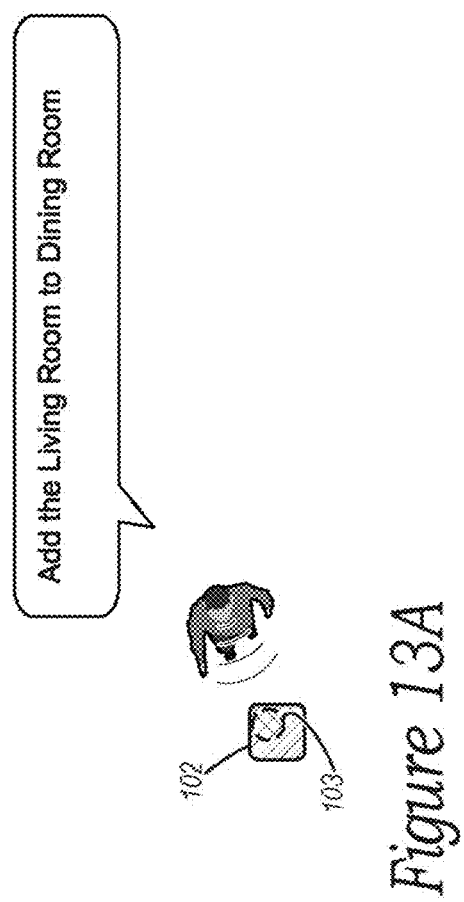

Command criteria may be configured to add devices to existing groups using voice input commands. For example, as shown in FIGS. 13A and 13B, a user may add the "Living Room" Room back to form a group with "Dining Room" Room by speaking the voice input of "add Living Room to Dining Room." In related embodiments, the user may add the "Living Room" Room by speaking the voice input of "play here, too" directly to the NMD 103*a* in the "Living Room" Room shown in FIG. 1. In this case, the user may not expressly refer to the "Living Room" Room in the voice input, but the VAS 160 may infer that the "Living Room" Room is to be added based on the user's proximity. In another example, if one were to assume that a listener is in the dining room when he or she has this intent, he or she may speak the command "add the living room." The "Dining Room" Room target in this case may be implied by the input device's containing Room.

Figure 14B:
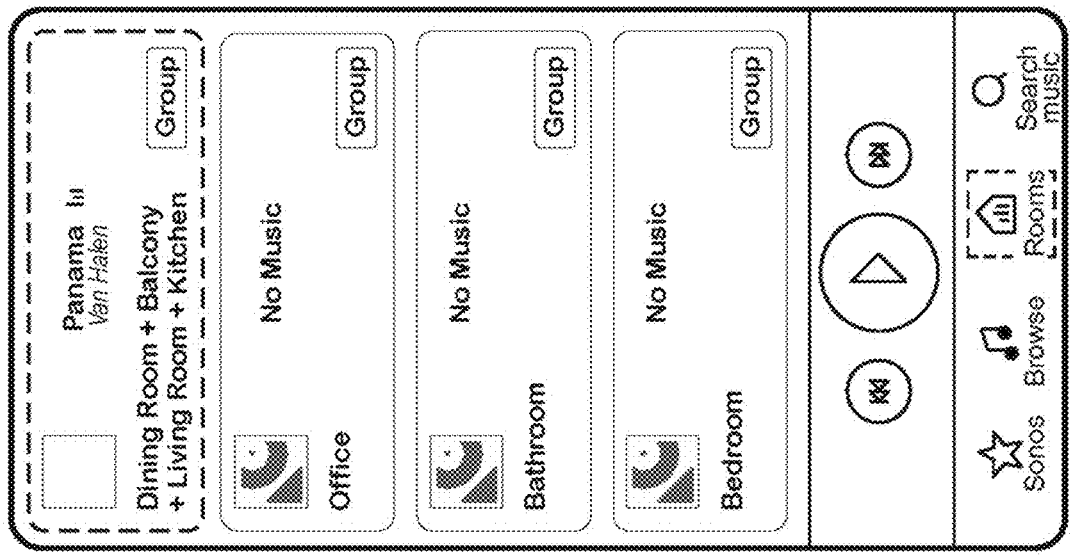
FIGS. 14A and 14B are diagrams showing example voice inputs for invoking a VAS in accordance with aspects of the disclosure.
Figure 14A:
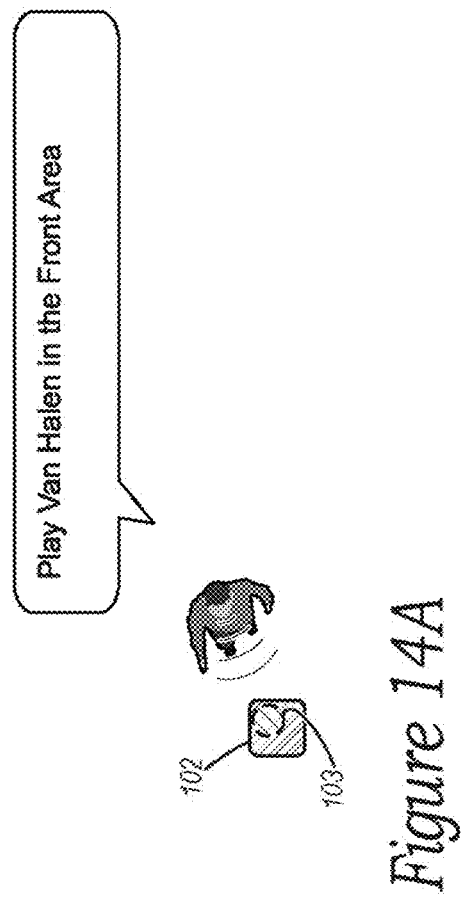

As another example of adding or forming groups, the user may instantiate a group using a voice input with a keyword associated with a custom target variable. For example, as discussed above, the user may pre-defined Areas within the Home that include a particular set of Rooms (e.g., "Front"). The user may instantiate the "Front" Area by speaking a voice input such as "play Van Halen in the Front Area," as shown in FIGS. 14A and 14B. The previous Dining Room group shown in FIG. 13B may be supplanted in response to the voice input shown in FIG. 14A.

Figure 15B:
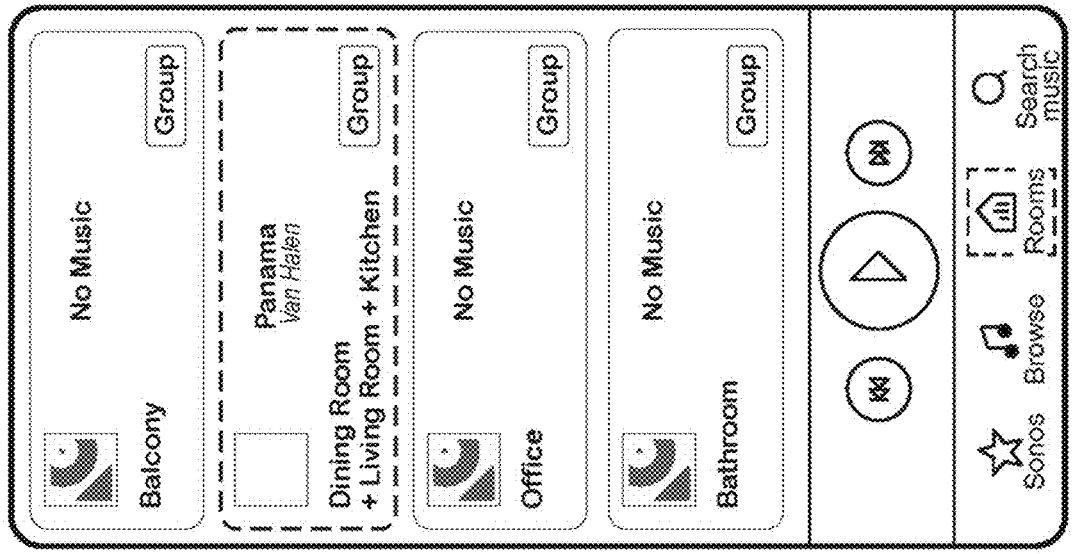
FIGS. 15A and 15B are diagrams showing example voice inputs for invoking a VAS in accordance with aspects of the disclosure.
Figure 15A:
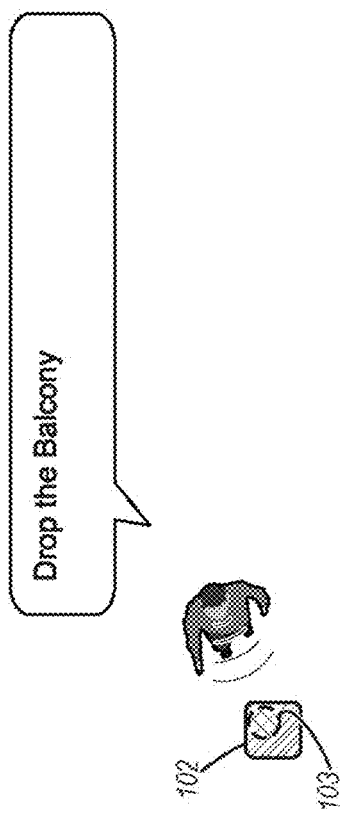

Command criteria may be configured to remove devices to existing groups using voice input commands. For example, the user may speak the voice input of "drop the Balcony" to remove the "Balcony" Room from the "Front" Area, as shown in FIGS. 15A and 15B. Other example cognates are possible, as discussed above. In yet another example, the user may speak directly to the NMD 103*c* in the "Balcony" Room shown in FIG. 1 to achieve the same result, such as by saying "stop here" or "stop in this room," assuming that the user is on the balcony.

VI. Example Control of Sets, Rooms, Areas, and Home Using GUI

Further example techniques involve control of the various Sets, Rooms, Areas within a Home using user interfaces, such as one or more GUIs. As described above, a GUI may work in tandem with a VUI for continuity of control. As noted above, the control device 103 may be configured to provide a controller interface 440. FIGS. 16A-H show additional controller interfaces that may be implemented by the control device 103 to control Sets, Rooms, Areas, and/or Home as defined by the home graph hierarchy.

For the purpose of illustration, FIGS. 16A-H relate to a Home that includes four Rooms, "Bedroom," "Dining Room," "Kitchen," and "Living Room." With the exception of the Dining Room, each Room in the Home includes one Set containing an individual playback device or bonded zone. The Dining Room includes two Sets ("Bookshelf" and "Credenza"), each containing an individual playback device or bonded zone. The Home also includes two pre-defined Areas ("Upstairs" and "Downstairs"). The "Bedroom" Room and "Dining Room" Room are in the "Upstairs" Area while the "Kitchen" Room and "Living Room" Room are in the "Downstairs" Area.

Figures 16A, 16B:
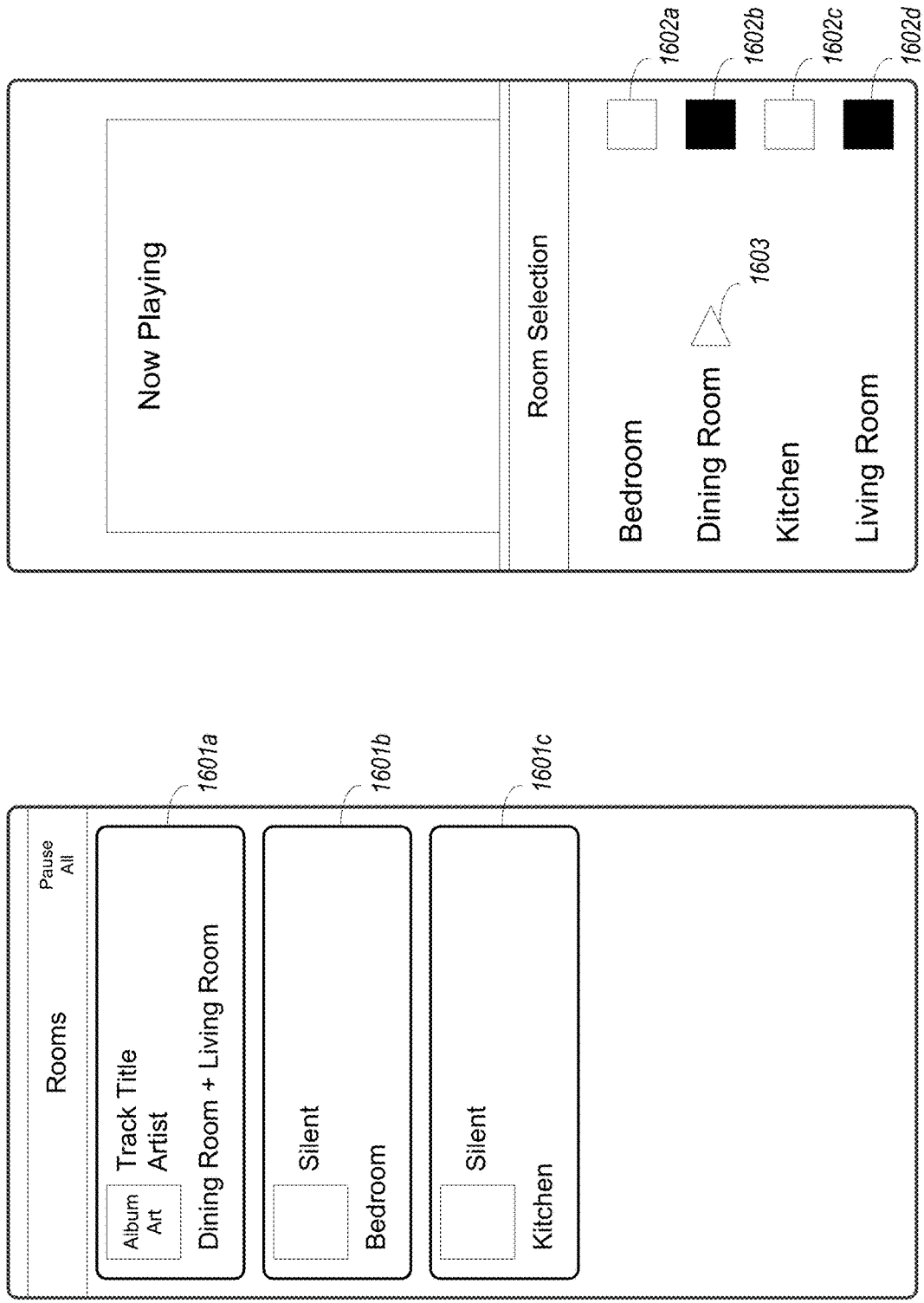

FIG. 16A shows an example of a Rooms control interface that indicates a current state of the Rooms by way of graphical elements 1601a, 1601b, and 1601c (referred to collectively as graphical element 1601). As shown by graphical element 1601a, the "Dining Room" Room and the "Living Room" Room are presently configured to play back in synchrony as part of a group configuration with the name "Dining Room+Living Room." The audio content being played back by the group configuration is indicated by way of the album art, track title, and artist. In contrast, as shown by graphical elements 1601b and 1601c, the "Bedroom" and "Kitchen" Rooms are not presently playing back audio content and are accordingly indicated as silent. In some implementations, graphical element 1601 is selectable. Selection of graphical element 1601 may show a now playing control interface for an individual Room, which may include further detail on now playing content and may include various transport and volume controls for that Room.

FIG. 16B shows an example of a Room Selection control interface that includes selectable controls 1602a, 1602b, 1602c, 1602d (referred to collectively as selectable control 1602) that indicate currently targeted Rooms. As noted above, in this example, the "Dining Room" Room and the "Living Room" Room are presently configured to play back in synchrony as part of a group configuration. As such, selectable controls 1602b and 1602d are shown as selected so as to distinguish from the non-targeted "Bedroom" and "Kitchen" Rooms, which have non-selected selectable controls 1602a and 1602d, respectively. Further, in this example, the Room picker control interface is overlaid over a now playing control interface, which is merely one example of how a Room picker interface may be displayed within a control interface comprising multiple interfaces corresponding to different control aspects of the media playback system 100.

Selectable control 1602 is dual function in that selectable control 1602 changes appearance (e.g., by changing color) to indicate a targeted Room and is selectable to toggle whether a given Room is targeted. In particular, selection of selectable control 1602a (e.g., by way of a touch input to control device 103) will toggle the "Bedroom" Room to targeted (given that the "Bedroom" Room was previously untargeted). Further, if a Room (e.g., the "Kitchen" Room) is targeted via a VUI (e.g., by a voice input such as "play music in Kitchen"), the corresponding selectable control 1602c changes appearance to indicate that the "Kitchen" Room is targeted for playback.

Within the Room Selection control interface, the "Dining Room" Room includes a control element 1603. The control element 1603 is displayed when a Room includes multiple Sets. When toggled, control element 1603 expands the Room Selection control interface to display the individual Sets in the corresponding Room, as shown in FIG. 16C. The expanded Room Selection control interface includes selectable controls 1604a and 1604b, which have similar dual function as selectable control 1602, but operate with respect to the "Bookshelf" and "Credenza" Sets instead of the Rooms.

FIG. 16D shows an alternate Room Selection interface that lists the Sets and Rooms of the Home. As illustrated by the "Dining Room" Room and "Bookshelf" and "Credenza" Sets, Sets within a Room are indicated in a single list element. This alternate Room Selection Interface includes selectable controls 1605a, 1605b, 1605c, 1605d, and 1605e (referred to collectively as selectable control 1605). Selectable control 1605 has a similar dual function as selectable controls 1602 and 1604.

In an example, the control interfaces shown in FIGS. 16C and 16D could be used to control the same media playback system 100. In this particular example, the controller interface shown in FIG. 16C is used with a first protocol or standard (perhaps via a first API) and FIG. 16D is used with a second protocol or standard (perhaps via a second API) to indicate the state of the same media playback system 100.

In some implementations, the Rooms control interface may also indicate Areas, perhaps only if an Area is targeted for playback. FIG. 16E shows an example of a Rooms control interface when the pre-defined "Downstairs" Area are targeted for playback. Recall that an Area can be targeted for playback via a VUI by way of a voice input such as "play the Beatles downstairs" or via a GUI as discussed below. Moreover, the control device 103 may display the Rooms control interface shown in FIG. 16E or the Room Selection interface in FIG. 16F in response to a voice input that targets the "Downstairs" Area for playback so as to provide visual feedback of the voice input. The control device 103 may display corresponding instances of Rooms and/or Room Selection control interfaces in response to voice inputs targeting particular Sets, Rooms, Areas, or combinations thereof.

As shown in FIG. 16E, the current state of the "Downstairs" Area (which includes the "Kitchen" and "Living Room" Rooms) is indicated by way of graphical elements 1601d. By targeting the "Downstairs" Area for playback, the "Kitchen" and "Living Room" Rooms are configured to play back in synchrony as part of a group configuration corresponding to the pre-defined "Downstairs" Area. The audio content being played back by the group configuration corresponding to the pre-defined "Downstairs" Area is indicated by way of the album art, track title, and artist. In contrast, as shown by graphical elements 1601e and 1601b, the "Dining Room" and "Bedroom" Rooms are not presently playing back audio content and are accordingly indicated as silent.

FIG. 16F shows an example of a Room Picker interface that includes a selectable control 1606 corresponding to the "Downstairs" Area. Like selectable controls 1602, 1604, and 1605, selectable control is dual function. In particular, selectable control 1606 changes appearance (e.g., by changing color) to indicate when the "Downstairs" Area is targeted and is selectable to toggle whether that Area is targeted. In particular, selection of selectable control 1606 (e.g., by way of a touch input to control device 103) will toggle the "Downstairs" Area and to targeted (given that the "Downstairs" Area was previously untargeted). Further, toggling the selectable control 1606 will also toggle selectable controls 1602c and 1602d, as these selectable controls 1602c and 1602d correspond to the "Kitchen" and "Living Room" Rooms, which are in the "Downstairs" Area.

Figure 16H:
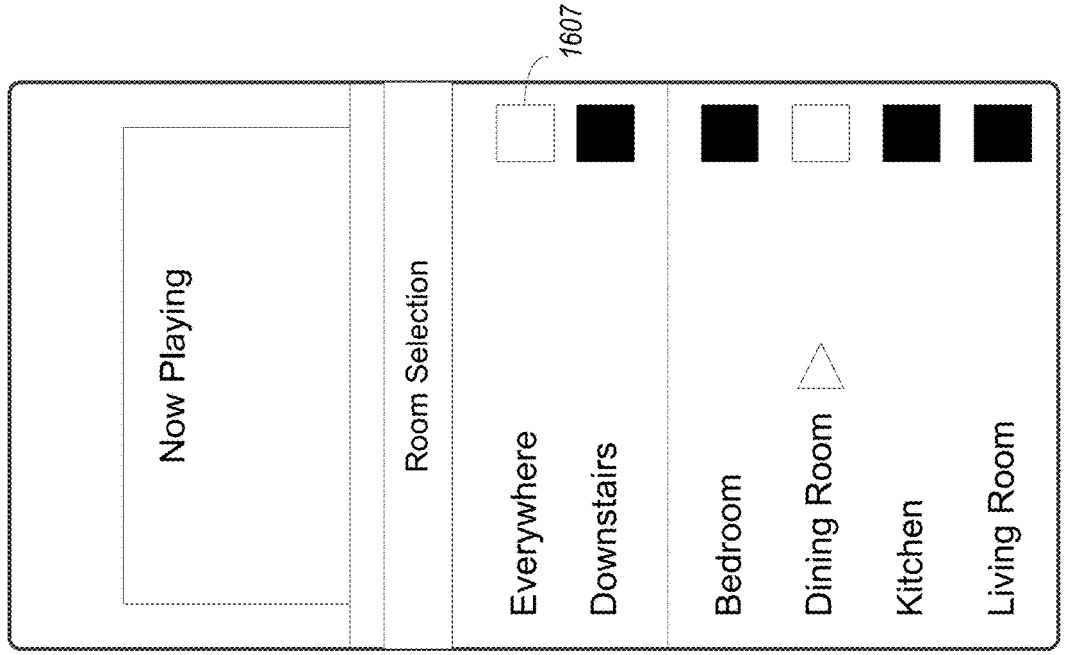
Figure 16G:
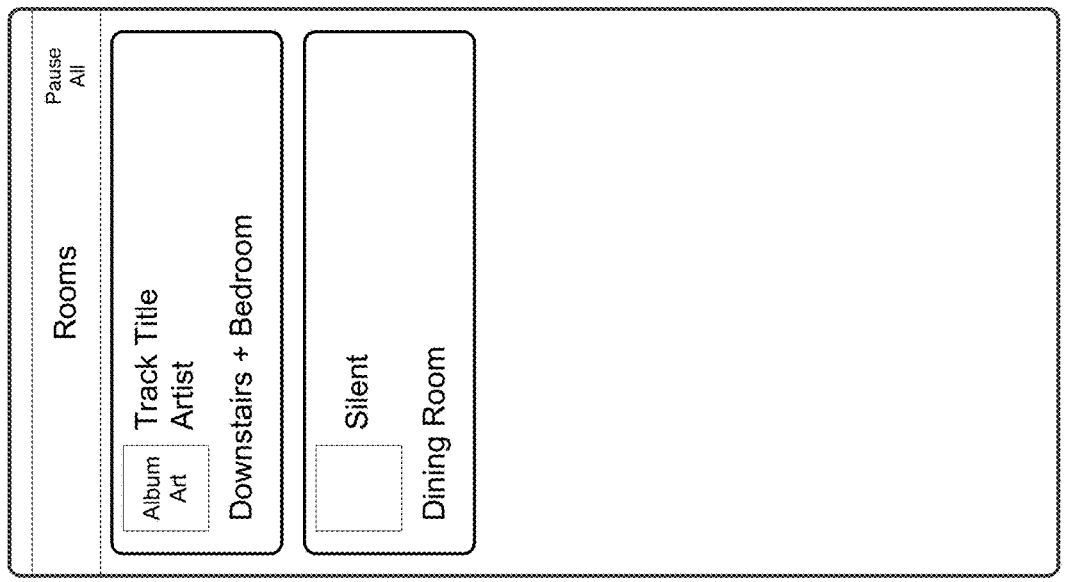

Still referring to FIG. 16F, by toggling a selectable control for a presently untargeted room (e.g., selectable control 1602 for the "Bedroom" Room), the untargeted Room is configured into a group configuration to play back in synchrony with the "Downstairs" Area. FIGS. 16G and 16H illustrate example states of the Rooms and Room Selection control interfaces after selectable control 1602 is toggled to target the "Bedroom" Room (in addition to the already-targeted "Downstairs" Area).

As shown in FIG. 16H, some implementations of the Room Selection control interface may include a selectable control 1607 that has a similar dual function as the selectable controls 1602, 1604, 1605 and 1606, but with respect to all Sets (i.e., all playback devices) within the Home.

As indicated by the FIGS. 16A-H, the Room Selection control interface can expand upward to overlay more of the now playing control interface to provide area to display controls corresponding to additional Rooms, Sets, or Areas. If all (or substantially all of the area of a display screen is used when a Home includes many Rooms, Sets, or Areas, then the Room Selection control interface may become vertically scrollable. Likewise, the Rooms control interface may become vertically scrollable when the graphical elements 1601 for various Rooms, Sets, and Areas use the available display area.

Figure 17B:
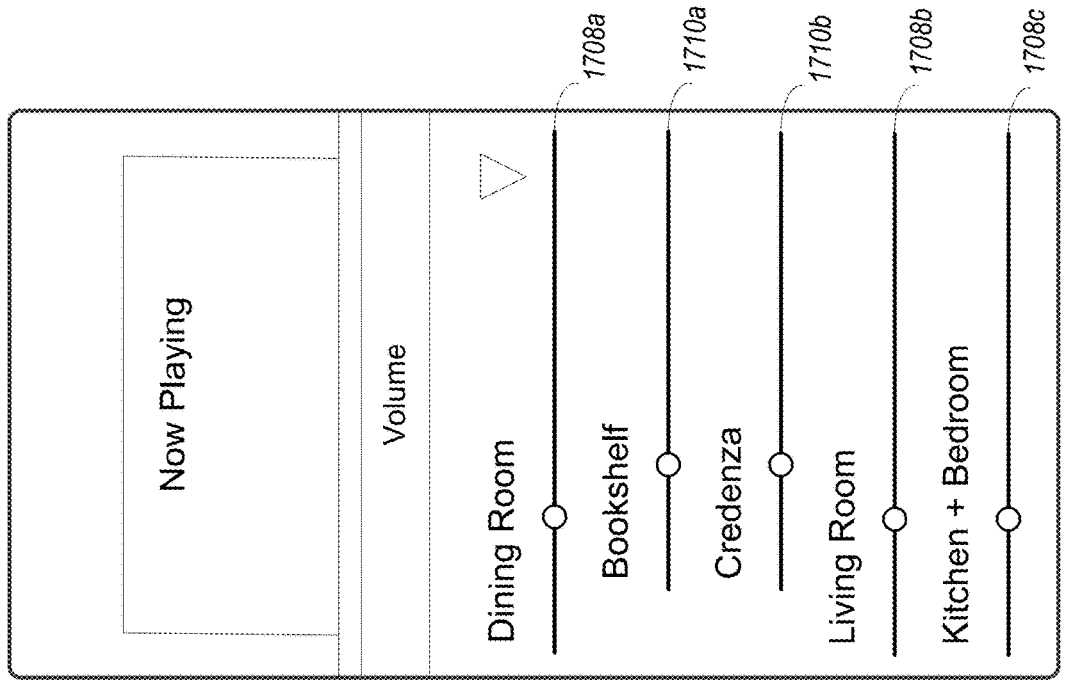
FIGS. 17A and 17B are diagrams showing example control interfaces for home graph volume control in accordance with aspects of the disclosure.
Figure 17A:
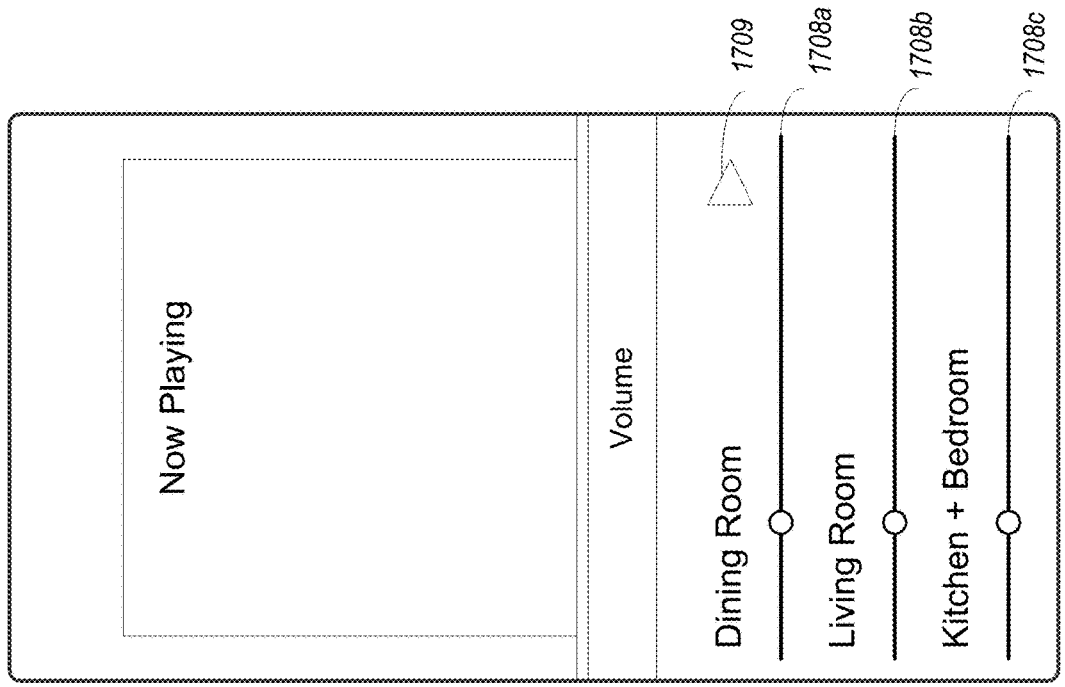

FIGS. 17A-B show additional controller interfaces that may be implemented by control device 103 to control volume of Sets, Rooms, Areas, and/or Home as defined by the home graph hierarchy. Like FIGS. 16A-H, FIGS. 17A-B relate to a Home that includes four Rooms, "Bedroom," "Dining Room," "Kitchen," and "Living Room." With the exception of the Dining Room, each Room in the Home includes one Set containing an individual playback device or bonded zone. The Dining Room includes two Sets ("Bookshelf" and "Credenza"), each containing an individual playback device or bonded zone. The Home also includes two pre-defined Areas ("Upstairs" and "Downstairs"). The "Bedroom" Room and "Dining Room" Room are in the "Upstairs" Area while the "Kitchen" Room and "Living Room" Room are in the "Downstairs" Area.

FIG. 17A shows an example of a Volume control interface that indicates current volume levels of the "Dining Room" and "Living Room" Rooms as well as a "Kitchen+Bedroom" group configuration (including the "Kitchen" Room and "Bedroom" Rooms in a synchrony group) by way of volume sliders 1708a, 1708b, and 1708c (referred to collectively as volume slider 1708). Via input to control device 103, volume slider 1708 may be slid to the right or left to adjust volume level for the corresponding Room or group configuration. As such, the volume slider 1708 is dual function in that the control both indicates current volume level and is controllable to adjust the volume level.

Within the Volume control interface, the "Dining Room" Room includes a control element 1709. The control element 1709 is displayed when a Room includes multiple Sets. When toggled, control element 1709 expands the Volume control interface to display the individual Sets in the corresponding Room, as shown in FIG. 17B. The expanded Volume control interface includes selectable controls 1710a and 1710b, which have similar dual function as selectable control 1708, but operate with respect to the "Bookshelf" and "Credenza" Sets instead of the Rooms.

As described in section IV above, a given control command (e.g., a volume adjustment) to a Set, Room, Area, or Home may be carried out by associated devices upwards or downwards in the home graph hierarchy. For instance, referring to FIG. 17B, a volume adjustment of the "Dining Room" Room via volume slider 1708a causes a corresponding volume adjustment of the "Bookshelf" and "Credenza" Sets (which is indicated by changes to volume sliders 1710a and 1710b), as these Sets are within the "Dining Room" Room. Likewise, a volume adjustment of a Set within a Room via the volume slider of the Set causes a corresponding volume adjustment of the Room. For example, referring again to FIG. 17B, a volume adjustment of the "Bookshelf" Set via volume slider 1710a causes a corresponding volume adjustment of the "Dining Room" Room (which is indicated by a change to volume sliders 1708a), as the "Bookshelf" Set is within the "Dining Room" Room.

Referring still to FIG. 17B, recall that the "Living Room" Room of the media playback system 100 includes a "Living Room TV" Set including a bonded zone of multiple physical playback devices 102a, 102b, 102j and 102k. As such, the volume slider 1708b indicates and controls volume for all four playback devices 102, treating the four physically distinct playback devices as one logical unit (i.e., a bonded zone).

Note that in FIGS. 17A and 17B, Rooms that include only one Set do not have a control element 1709 to expand the user interface to display the Set. Rather, the Room (e.g., the "Living Room" Room) serves as a stand-in for the "Living Room TV" Set. However, if the Room includes two Sets, then the control element 1709 is displayed to enable individual volume control of the each constituent Set.

If an Area is targeted for playback, the Volume control interface may include a volume slider for that Area. Volume adjustments to the volume slider for an Area cause corresponding volume adjustments to Rooms and Sets within that Area. Likewise, volume adjustments to Rooms and Sets within the Area cause a corresponding volume adjustment to the Area. The degree of volume adjustment made to a higher or lower level of the home graph hierarchy when volume of a Set, Room or Area is adjusted is controlled via a volume adjustment algorithm.

In some implementations, the volume adjustment algorithm is based on averaging of volume levels such that the volume level of a Room or Area is an average of the Sets and/or Rooms within that Room or Area. For example, referring to FIG. 17B, if the volume level of the "Bookshelf" Set within the "Dining Room" Room is adjusted upwards via the volume slider 1710a, the volume level of that the "Dining Room" Room is adjusted upwards as well such the its volume level is an average of the volume levels of the "Bookshelf" and "Credenza" Sets. As another example, if the volume level of the "Dining Room" Room is adjusted downwards via the volume slider 1708a, then the volume levels of both the "Bookshelf" and "Credenza" Sets are adjusted downwards proportionally such that the lower volume level of the "Dining Room" Room remains an average of the volume levels of the "Bookshelf" and "Credenza" Sets. The volume adjustment algorithm works on the same principle for Areas in that the volume slider for an Area is an average of the Rooms within that Area (which are in turn a function of the Sets within each Room).

Under another volume adjustment algorithm (referred to herein as the volume sliders for the lowest level of the home graph hierarchy indicate an absolute volume level for the playback device(s) 102 within that Set. If a Room includes only one Set, then the volume level of the Room is the same as the Set. When a volume level for a Room that includes multiple Sets is adjusted, the volume levels of the multiple Sets are adjusted in proportion to the adjustment of the Room control. For instance, referring to FIG. 17B, if the volume level of the "Dining Room" Room is adjusted downwards by 25% (i.e., a 25% reduction) via the volume slider 1708a, then the volume levels of both the "Bookshelf" and "Credenza" Sets are adjusted downwards proportionally by 25% as well. This volume adjustment algorithm works on the same principle for Areas in that a volume adjustment of an Area will cause a proportional change in volume levels of Rooms within that Area.

Under this algorithm, adjustments to volume levels for the lowest level of the home graph hierarchy indicate an absolute volume level for the playback device(s) 102 and do not cause proportional adjustments to higher levels of the home graph hierarchy, which allows individual volume levels (indicating absolute volume) to be de-coupled from higher levels of the home graph hierarchy. For instance, when a volume level for the "Bookshelf" Set is adjusted upwards, the volume level of the "Dining Room" Room is adjusted as well to match the volume level of the "Bookshelf" Set or to match the volume level of the "Credenza" Set if that volume level is higher. Conversely, when a volume level for the "Bookshelf" Set is adjusted downwards, the volume level of the "Dining Room" Room is adjusted as well to match the volume level of the "Bookshelf" Set or to match the volume level of the "Credenza" Set if that volume level is lower. The volume level for the "Credenza" Set remains unchanged by the volume adjustment to the "Bookshelf" Set.

Referring back to FIG. 17B, as noted above, the volume slider 1708c controls volume for the "Kitchen+Bedroom" Room Group. As described in section III, since the playback devices 102 in the "Kitchen" and "Bedroom" Rooms are configured to play back in synchrony as part of a Room Group, control commands directed to a constituent Room or Set in the Room Group are carried out by other Sets and Rooms in the Room Group. Accordingly, adjustments to the volume slider 1708c affect volume level of the "Kitchen" and "Bedroom" Rooms, as well as the Sets that are in those Rooms. As with Sets, Rooms, and Areas, a volume adjustment algorithm controls the degree of volume adjustment made to constituent Rooms or Sets of a group when the volume level of that group is adjusted. Any suitable volume adjustment algorithm, such as the volume adjustments algorithms described above, can control the volume level of the group and its constituent Rooms and Sets.

To illustrate, using an averaging volume adjustment algorithm, the volume level of a group is the average of its constituent Rooms and/or Sets. For instance, referring to FIG. 17B, the current volume level of the "Kitchen+Bedroom" Room Group is the average of the "Kitchen" and "Bedroom" Rooms. If the volume level of the "Kitchen+Bedroom" Room Group is adjusted upwards via volume slider 1708c, then volume levels of both the "Kitchen" and "Bedroom" Rooms are adjusted upwards proportionally such that the increased volume level of the "Kitchen+Bedroom" Room Group remains an average of the volume levels of the "Kitchen" and "Bedroom" Rooms. As another example, if a volume level of the "Kitchen" Room is increased via a voice command (e.g., "turn up the Kitchen"), then the volume level of the "Kitchen+Bedroom" Room Group is increased as well such the its volume level is an average of the volume levels of the such the its volume level is an average of the volume levels of the "Kitchen" and "Bedroom" Rooms.

In various embodiments, the media playback system 100 may incorporate example methods and systems for group volume control described in U.S. Pat. No. 9,654,073 filed Jun. 7, 2013, and titled "Group Volume Control," which is incorporated herein by reference in its entirety.

In various embodiments, the media playback system 100 may incorporate example methods and systems for group volume control described in application Ser. No. 14/205,347 filed Mar. 11, 2014, and titled "Group Volume Control," which is incorporated herein by reference in its entirety.

VII. Example Methods

Figure 18:
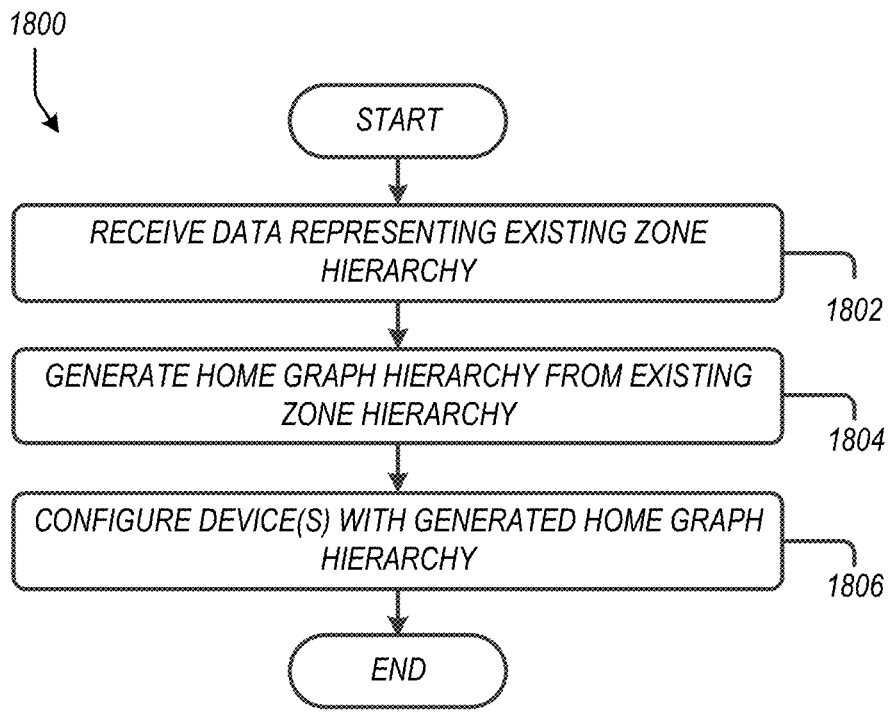
FIG. 18 shows a technique to generate a home graph hierarchy from an existing zone hierarchy.
Figure 19:
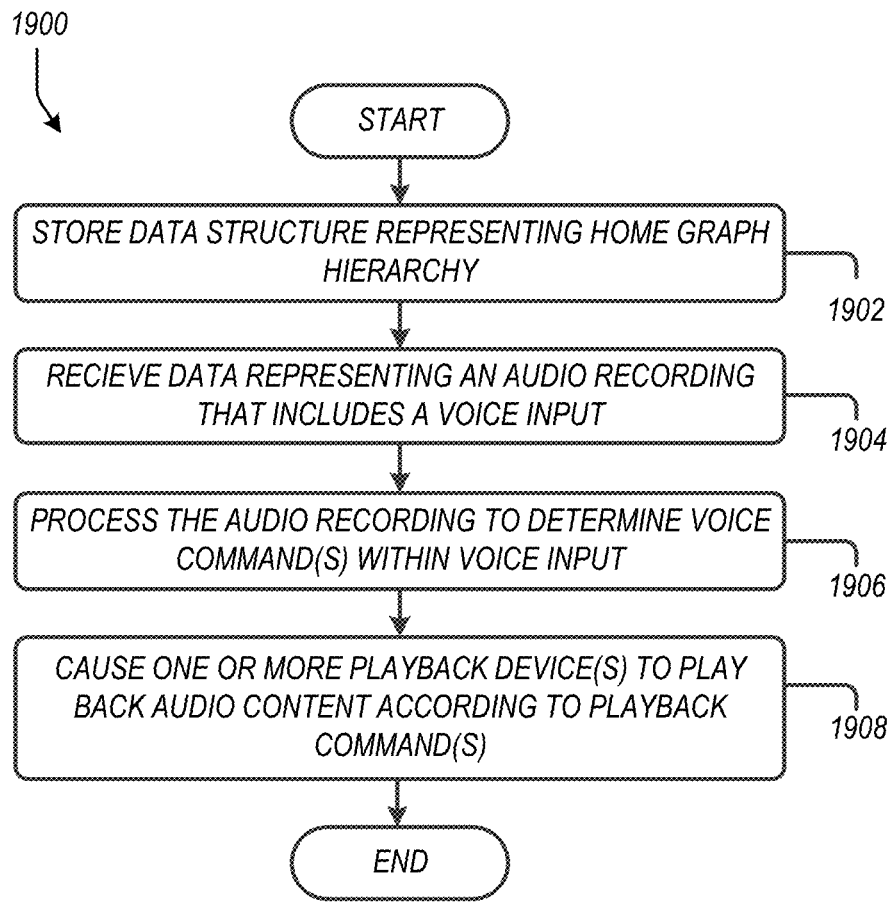
FIG. 19 shows a technique to facilitate VUI control via a home graph hierarchy.
Figure 20:
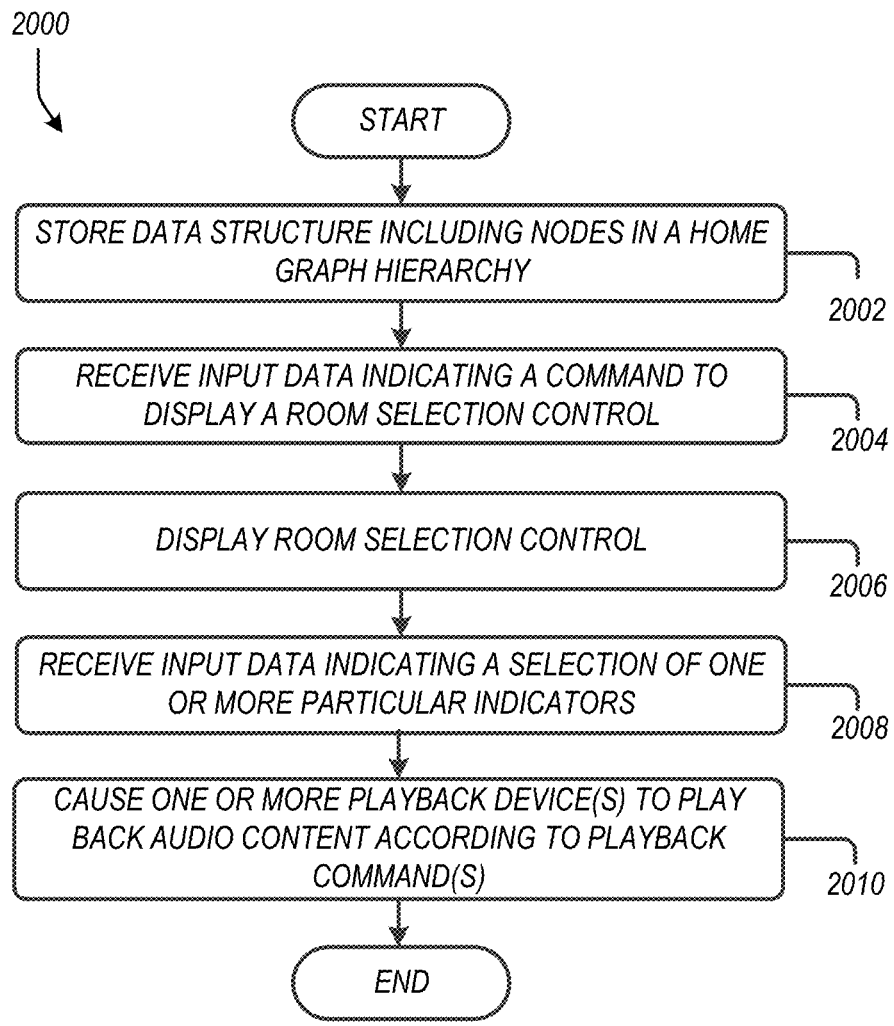
FIG. 20 shows a technique to facilitate GUI control via a home graph hierarchy.

Implementations 1800, 1900, and 2000 shown in FIGS. 18, 19, and 20, respectively present example embodiments of techniques described herein. Implementation 1800, 1900, and 2000 may include one or more operations, functions, or actions as illustrated by one or more of blocks shown in FIGS. 18, 19, and 20. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

a. Example Methods for Home Graph Conversion

As discussed above, embodiments described herein involve home graph conversion. FIG. 18 illustrates an example implementation 1800 of a method by which a system generates a home graph hierarchy from an existing zone hierarchy.

At block 1802, the implementation 1800 involves receiving data representing an existing home group hierarchy. For instance, as described above in connection with FIG. 8A, an auto-generation engine 800 may receive state variables (e.g., a state table) indicating the configuration of one or more playback devices of the media playback system 100 (e.g., one or more of the playback devices 102a-m). The state variables indicate the zone names of the respective zones and their configuration as individual devices or bonded zones.

At block 1804, the implementation 1800 involves generating a home graph hierarchy from an existing zone hierarchy. Continuing the example above, the auto-generation engine 800 may reads the configuration of the zones from the state variables and generates Rooms, Sets, Areas, and/or a Home from these configurations as output. For instance, based on the state variables, the auto-generation engine 800 may generate Rooms based on existing zones in the media playback system 100. As shown in FIG. 8A, the configuration of the Living Room zone in the state variables may cause the auto-generation engine 800 to form a Room. The auto-generation engine 800 may assign the new Room with the same name as the zone ("Living Room").

At block 1806, the implementation 1800 involves configuring one or more devices with the generated home graph hierarchy. For example, the auto-generation engine 800 may configure the playback devices 102a, 102b, 102j, and 102k in the Living Room as one or more Sets within the "Living Room" Room. If these devices are configured into a bonded zone, the auto-generation engine 800 may configure these devices as a single set (e.g., a "Living Room TV" Set). Alternatively, the auto-generation engine 800 may configure each device as a respective set (e.g., as "Front," "Right Surround," and "Left Surround" Sets).

b. Example Methods for Voice UI Control Via A Home Graph Hierarchy

As discussed above, embodiments described herein involve VUI control via a home graph hierarchy. FIG. 19 illustrates an example implementation 1900 of a method by which a system facilitates VUI control via a home graph hierarchy.

At block 1902, the implementation 1900 involves storing a data structure that represents a hierarchy, such as the home graph hierarchy described herein. A system may store a data structure that represents smart devices within a household (e.g., those connected via a local area network). As shown in FIG. 9F, the data structure may include nodes in a hierarchal arrangement, such as a tree data structure. The system may include one or more servers of a voice assistant service, as described in connection with FIG. 6. Such servers may store the data structure. Other devices may also or alternatively store the data structure.

In an example, the data structure includes a root node representing the media playback system as a Home of the home graph hierarchy. The data structure further includes one or more first nodes in a first level. The first nodes represent respective devices of the media playback system as Sets of the hierarchy. Other types of smart devices may also be represented as Sets. The data structure also includes one or more second nodes in a second level as parents to one or more respective child first nodes to represent Sets in respective Rooms of the hierarchy. The nodes in the hierarchy are assigned respective names to facilitate referring to the nodes using voice input. An example of such a home graph hierarchy is illustrated in FIG. 9F. In further examples, the home graph hierarchy may include one or more third nodes in a third level as parents to one or more respective child second nodes to represent Rooms in respective Areas of the hierarchy.

At block 1904, the implementation 1900 involves receiving data representing an audio recording. For instance, the system may receive data representing an audio recording from a NMD. The NMD may capture voice inputs in audio recordings as described in connection with FIG. 9A.

In an example, an NMD records, via a microphone array, audio into a buffer and monitors the recorded audio for wake-words. When a wake-word is detected in the recorded audio, the NMD sends, via a network interface to the voice assistant service, data representing an audio recording from the buffer of the NMD. The audio recording includes a voice input following the detected wake-word within the buffer.

At block 1906, the implementation 1900 involves processing the audio recording to determine one or more voice commands within the voice input. As described in connection with FIGS. 9A-9E, a voice input may include various types of commands such as playback, control, targeting, and inquiry commands, among others. Example processing is described in connection with these figures.

As noted above, the voice input may include targeting commands. In processing the voice input, the system may determine that one or more first voice commands within the voice input represent respective target variables. Further, the system may determine that the target variables indicate one or more particular nodes of the data structure by referencing a name assigned to a respective node of the data structure. These target variables may indicate nodes on any level of the home graph hierarchy, including nodes that represent Sets, Rooms, Areas, or the Home.

The system may perform a search of the nodes of the data structure to determine which nodes are indicated by the target variables. Using the target variable(s) as the search key, the system may look for nodes having values (i.e., assigned names) that match the target variables. In an example, the data structure defines a tree and the system searches by traversing the tree.

As also noted above, the voice input may include playback commands, such as playback initiation or control commands. The system may determine that one or more second voice commands within the voice input correspond to one or more playback commands. Example playback commands are described above.

At block 1908, the implementation 1900 involves causing one or more playback devices to play back audio content according to the one or more playback commands. The particular one or more playback devices that play back the audio content include all playback devices represented by the one or more particular nodes of the data structure, as well as all playback devices represented by child nodes of the one or more particular nodes of the data structure. For instance, referring back to FIG. 9F, if the target variables indicate the "Dining Room" Room, then the "Bookshelf" Set and the "Credenza" Set play back the audio content. As another example, the target variables indicate the "Nook" Set, then the "Nook" Set plays back the audio content.

As noted above, in further examples, the home graph hierarchy may include one or more third nodes in a third level as parents to one or more respective child second nodes to represent Rooms in respective Areas of the hierarchy. As illustrated in FIG. 9F, if the target variables indicate the "Front Area" then all child nodes of the Front Area play back the audio content (i.e., the "Living Room TV" Set, the "Bookshelf" Set, the "Credenza" Set, and the "Sink" Set. The target variable may also indicate the Home node (e.g., by reference to "Nick's Room" or "everywhere"), which causes all playback devices represented in the hierarchy to play back the audio content.

c. Example Methods for Graphical UI Control Via A Home Graph Hierarchy

As discussed above, embodiments described herein involve GUI control via a home graph hierarchy. FIG. 20 illustrates an example implementation 2000 of a method by which a system facilitates GUI control via a home graph hierarchy.

At block 2002, the implementation 2000 involves storing a data structure that represents a hierarchy, such as the home graph hierarchy described herein. A system may store a data structure that represents smart devices within a household (e.g., those connected via a local area network). As shown in FIG. 9F, the data structure may include nodes in a hierarchal arrangement, such as a tree data structure. In an example, a control device may store the data structure to facilitate GUI control via a home graph hierarchy. As described above, one or more servers of a voice assistant service may also or alternatively store the data structure.

In an example, the data structure includes a root node representing the media playback system as a Home of the home graph hierarchy. The data structure further includes one or more first nodes in a first level. The first nodes represent respective devices of the media playback system as Sets of the hierarchy. Other types of smart devices may also be represented as Sets. The data structure also includes one or more second nodes in a second level as parents to one or more respective child first nodes to represent Sets in respective Rooms of the hierarchy. The nodes in the hierarchy are assigned respective names to facilitate referring to the nodes using voice input. An example of such a home graph hierarchy is illustrated in FIG. 9F.

At block 2004, the implementation 2000 involves receiving input data indicating a command to display a room selection control. For instance, a control device may receive, via a control application, input data indicating a command to display a room selection control. In some implementations, control device includes a touch-screen graphical display and the input data includes touch-input data.

At block 2006, the implementation 2000 involves displaying the room selection control. For example, the control device may display, via the control application on a graphical display, the room selection control. Example room selection controls are described in connection with FIGS. 16B, 16C, 16D, 16f, and 16H.

The room selection control includes multiple indicators corresponding to respective nodes in the data structure representing the hierarchy. The multiple indicators may include first indicators corresponding to respective first nodes of the one or more first nodes in the data structure and second indicators corresponding to respective second nodes of the one or more second nodes in the data structure. The first indicators represent respective Sets via the assigned respective names and the second indicators represent respective Rooms via the assigned respective names. Example first indicators include selectable control 1602 and example second indicators include selectable control 1604 shown in FIGS. 16B and 16C. Selectable control 1605 shown in FIG. 16D is another example of first and second indicators.

In some examples, the multiple indicators may further include third indicators corresponding to respective third nodes of the one or more third nodes in the data structure. The third indicators represent respective Areas via the assigned respective names. Selectable control 1606 shown in FIG. 16F is an example of a third indicator.

Yet further, the multiple indicators may include a fourth indicator corresponding to the root node in the data structure. As noted above, the root node represents the entire Home in the Home Graph hierarchy. Selectable control 1607 shown in FIG. 16H is an example of a fourth indicator.

At block 2008, the implementation 2000 involves receiving input data indicating a selection of one or more particular indicators. For instance, the control device may receive, via the displayed room selection control, input data indicating a selection of one or more particular indicators of the multiple indicators. These one or more particular indicators correspond to one or more particular nodes of the hierarchy.

At block 2010, the implementation 2000 involves causing one or more playback devices to play back audio content according to the one or more playback commands. The particular one or more playback devices that play back the audio content include all playback devices represented by the one or more particular nodes of the data structure, as well as all playback devices represented by child nodes of the one or more particular nodes of the data structure.

For instance, referring back to FIG. 16B, if selectable controls 1602b and 1602d are selected, then the "Dining Room" Room and the "Living Room" Rooms play back the audio content. Since the "Dining Room" Room includes the "Bookshelf" Set and the "Credenza" Set, these playback devices play back the audio content. The "Living Room" Room includes the "Living Room" Set, so this set plays back the audio content in synchrony with the "Bookshelf" Set and the "Credenza" Set.

FIGS. 16F and 16H indicate further examples. If selectable control 1606 is selected, then all Rooms with the "Downstairs" Area play back the audio content (including all Sets including playback devices within those Rooms). If selectable control 1607 is selected, then all Sets that include a playback device play back the audio content.

As described above, the example control hierarchy may facilitate other types of control, such as volume control. In an example, the control device receives, via the control application, input data indicating a command to display a volume control and then displays, via the control application on the graphical display, the volume control. The volume control may include volume sliders, knobs, or other types of volume controls. Volume control may correspond to respective nodes in the data structure. FIGS. 17A and 17B illustrate example volume sliders 1708 and 1710. An adjustments to a volume slider representing a particular node cause adjustment of the playback device corresponding to that node as well as any playback devices represented by child nodes to the particular node.

VIII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A system comprising a network microphone device (NMD) of a media playback system, wherein the NMD comprises:
a microphone array;
a network interface;
at least one processor;
a tangible, computer-readable media; and
instructions stored in the tangible, computer-readable media, wherein the instructions, when executed by the at least one processor, cause the NMD to perform functions comprising:
storing a data structure comprising nodes in a hierarchy representing the media playback system, wherein the data structure comprises (i) a root node representing the media playback system as a Home of the hierarchy, (ii) one or more first nodes in a first level, the first nodes representing respective devices of the media playback system as Sets of the hierarchy, and (iii) one or more second nodes in a second level as parents to one or more respective child first nodes to represent Sets in respective Rooms of the hierarchy,
wherein the nodes in the hierarchy are assigned respective names;
recording, via the microphone array, audio into a buffer;
monitoring the recorded audio for keywords;
when a keyword is detected in the recorded audio, processing a voice input within a portion of the audio recording comprising the keyword, wherein processing the voice input comprises:
(i) determining, based on the data structure representing the media playback system, that one or more first keywords within the voice input represent respective target variables indicating one or more particular nodes of the data structure, each target variable referencing a name of a respective node of the data structure; and
(ii) determining that one or more second keywords within the voice input correspond to one or more playback commands; and
causing, via the network interface, one or more particular playback devices to play back audio content according to the one or more playback commands, wherein the one or more particular playback devices include (a) all playback devices represented by the one or more particular nodes of the data structure and (b) all playback devices represented by child nodes of the one or more particular nodes of the data structure.

2. The system of claim 1, wherein determining that one or more first keywords within the voice input represent respective target variables comprises determining that at least one first voice keywords within the voice input represents a target variable referencing a name of a particular second node representing a particular Room, the particular Room including a first Set consisting of a first playback device and a second Set consisting of a second playback device, and wherein causing the one or more particular playback devices to play back audio content according to the one or more playback commands comprises causing the first playback device and the second playback device to play back the audio content in synchrony.

3. The system of claim 1, wherein determining that one or more first keywords within the voice input represent respective target variables comprises determining that at least one first keyword within the voice input represents a target variable referencing a name of a particular first node representing a particular Set, the particular Set consisting of a first playback device and a second playback device in a bonded zone, and wherein causing the one or more particular playback devices to play back audio content according to the one or more playback commands comprises causing the first playback device and the second playback device to play back respective channels of the audio content in synchrony.

4. The system of claim 1,
wherein the data structure further comprises one or more third nodes in a third level as parents to one or more respective child second nodes to represent Rooms in respective Areas of the hierarchy,
wherein determining that the one or more first keywords within the voice input represent respective target variables comprises determining that at least one first voice keyword within the voice input represents a target variable referencing a name of a particular third node representing an Area including a first Room and a second Room, the first Room including a first Set that consists of a first playback device and the second Room including a second Set that consists of a second playback device, and
wherein causing the one or more particular playback devices to play back audio content according to the one or more playback commands comprises causing the first playback device and the second playback device to play back the audio content in synchrony.

5. The system of claim 4, wherein causing the one or more particular playback devices to play back audio content according to the one or more playback commands comprises causing the first playback device and the second playback device to form a synchrony group.

6. The system of claim 1, wherein determining that one or more first keywords within the voice input represent respective target variables comprises determining that at least one first voice command within the voice input represents a target variable referencing a name of the root node, and wherein causing the one or more particular playback devices to play back audio content according to the one or more playback commands comprises causing all playback devices represented by nodes within the data structure to play back the audio content in synchrony.

7. The system of claim 1, wherein determining that one or more first voice commands within the voice input represent respective target variables comprises:
searching the nodes of the data structure for nodes having assigned names that match target variables represented by the one or more first keywords; and
determining that the one or more first keywords match names assigned to the one or more particular nodes.

8. The system of claim 1, wherein the data structure defines a tree, and wherein determining that one or more first keywords within the voice input represent respective target variables comprises:
traversing the tree to search for nodes having assigned names that match target variables represented by the one or more first keywords; and
determining that the one or more first keywords match names assigned to the one or more particular nodes.

9. The system of claim 8, wherein traversing the tree to search for nodes comprises traversing the tree in level order beginning with the root node.

10. The system of claim 1, wherein the functions further comprise:
when another keyword is detected in the recorded audio, processing an additional voice input within a portion of the audio recording comprising the another keyword, wherein processing the additional voice input comprises:
   determining, based on the data structure representing the media playback system, that one or more third keywords within the additional voice input represent respective additional target variables indicating one or more additional nodes of the data structure, each additional target variable referencing a name of a respective node of the data structure; and
   determining that one or more fourth keywords within the voice input correspond to one or more smart device commands; and
causing, via the network interface, one or more particular smart devices to carry out the one or more smart device commands, wherein the one or more particular smart devices include (a) all smart devices represented by the one or more additional nodes of the data structure and (b) all smart illumination devices represented by child nodes of the one or more additional nodes of the data structure.

11. The system of claim 1, further comprising a given playback device comprising:
an amplifier configured to drive one or more speakers;
an additional network interface;
at least one additional processor;
an additional tangible, computer-readable media;
additional instructions stored in the additional tangible, computer-readable media, wherein the additional instructions, when executed by the at least one additional processor, cause the given playback device to perform functions comprising:
   receiving, via the network interface, data representing the one or more playback commands; and
   playing back audio content via the amplifier configured to drive the one or more speakers according to the received data representing the one or more playback commands.

12. A network microphone device (NMD) comprising:
a microphone array;
a network interface;
at least one processor;
a tangible, computer-readable media; and
instructions stored in the tangible, computer-readable media, wherein the instructions, when executed by the at least one processor, cause the NMD to perform functions comprising:
   storing a data structure comprising nodes in a hierarchy representing a media playback system, wherein the data structure comprises (i) a root node representing the media playback system as a Home of the hierarchy, (ii) one or more first nodes in a first level, the first nodes representing respective devices of the media playback system as Sets of the hierarchy, and (iii) one or more second nodes in a second level as parents to one or more respective child first nodes to represent Sets in respective Rooms of the hierarchy, wherein the nodes in the hierarchy are assigned respective names;
   recording, via the microphone array, audio into a buffer;
   monitoring the recorded audio for keywords;
   when a keyword is detected in the recorded audio, processing a voice input within a portion of the audio recording comprising the keyword, wherein processing the voice input comprises:
      determining, based on the data structure representing the media playback system, that one or more first keywords within the voice input represent respective target variables indicating one or more particular nodes of the data structure, each target variable referencing a name of a respective node of the data structure; and
      determining that one or more second keywords within the voice input correspond to one or more playback commands; and
   causing, via the network interface, one or more particular playback devices to play back audio content according to the one or more playback commands, wherein the one or more particular playback devices include (a) all playback devices represented by the one or more particular nodes of the data structure and (b) all playback devices represented by child nodes of the one or more particular nodes of the data structure.

13. The NMD of claim 12, wherein determining that one or more first keywords within the voice input represent respective target variables comprises determining that at least one first voice keywords within the voice input represents a target variable referencing a name of a particular second node representing a particular Room, the particular Room including a first Set consisting of a first playback device and a second Set consisting of a second playback device, and wherein causing the one or more particular playback devices to play back audio content according to the one or more playback commands comprises causing the first playback device and the second playback device to play back the audio content in synchrony.

14. The NMD of claim 12, wherein determining that one or more first keywords within the voice input represent respective target variables comprises determining that at least one first keyword within the voice input represents a target variable referencing a name of a particular first node representing a particular Set, the particular Set consisting of a first playback device and a second playback device in a bonded zone, and wherein causing the one or more particular playback devices to play back audio content according to the one or more playback commands comprises causing the first playback device and the second playback device to play back respective channels of the audio content in synchrony.

15. The NMD of claim 12,
   wherein the data structure further comprises one or more third nodes in a third level as parents to one or more respective child second nodes to represent Rooms in respective Areas of the hierarchy,
   wherein determining that the one or more first keywords within the voice input represent respective target variables comprises determining that at least one first voice keyword within the voice input represents a target variable referencing a name of a particular third node representing an Area including a first Room and a second Room, the first Room including a first Set that consists of a first playback device and the second Room including a second Set that consists of a second playback device, and
   wherein causing the one or more particular playback devices to play back audio content according to the one or more playback commands comprises causing the first playback device and the second playback device to play back the audio content in synchrony.

16. The NMD of claim 15, wherein causing the one or more particular playback devices to play back audio content according to the one or more playback commands comprises causing the first playback device and the second playback device to form a synchrony group.

17. The NMD of claim 12, wherein determining that one or more first keywords within the voice input represent respective target variables comprises determining that at least one first voice command within the voice input represents a target variable referencing a name of the root node, and wherein causing the one or more particular playback devices to play back audio content according to the one or more playback commands comprises causing all playback devices represented by nodes within the data structure to play back the audio content in synchrony.

18. The NMD of claim 12, wherein determining that one or more first voice commands within the voice input represent respective target variables comprises:
   searching the nodes of the data structure for nodes having assigned names that match target variables represented by the one or more first keywords; and
   determining that the one or more first keywords match names assigned to the one or more particular nodes.

19. The NMD of claim 12, wherein the functions further comprise:
   when another keyword is detected in the recorded audio, processing an additional voice input within a portion of the audio recording comprising the another keyword, wherein processing the additional voice input comprises:
      determining, based on the data structure representing the media playback system, that one or more third keywords within the additional voice input represent respective additional target variables indicating one or more additional nodes of the data structure, each additional target variable referencing a name of a respective node of the data structure; and
      determining that one or more fourth keywords within the voice input correspond to one or more smart device commands; and
   causing, via the network interface, one or more particular smart devices to carry out the one or more smart device commands, wherein the one or more particular smart devices include (a) all smart devices represented by the one or more additional nodes of the data structure and (b) all smart illumination devices represented by child nodes of the one or more additional nodes of the data structure.

20. A tangible, non-transitory computer-readable medium having instructions encoded therein that, when executed by at least one processor of a network microphone device (NMD), cause the NMD to perform functions comprising:
   storing a data structure comprising nodes in a hierarchy representing a media playback system, wherein the data structure comprises (i) a root node representing the media playback system as a Home of the hierarchy, (ii) one or more first nodes in a first level, the first nodes representing respective devices of the media playback system as Sets of the hierarchy, and (iii) one or more second nodes in a second level as parents to one or more respective child first nodes to represent Sets in respective Rooms of the hierarchy, wherein the nodes in the hierarchy are assigned respective names;
   recording, via a microphone array, audio into a buffer;
   monitoring the recorded audio for keywords;
   when a keyword is detected in the recorded audio, processing a voice input within a portion of the audio recording comprising the keyword, wherein processing the voice input comprises:
      (i) determining, based on the data structure representing the media playback system, that one or more first keywords within the voice input represent respective target variables indicating one or more particular nodes of the data structure, each target variable referencing a name of a respective node of the data structure; and
      (ii) determining that one or more second keywords within the voice input correspond to one or more playback commands; and
   causing, via a network interface, one or more particular playback devices to play back audio content according to the one or more playback commands, wherein the one or more particular playback devices include (a) all playback devices represented by the one or more particular nodes of the data structure and (b) all playback devices represented by child nodes of the one or more particular nodes of the data structure.

* * * * *

UNITED STATES PATENT AND TRADEMARK OFFICE
CERTIFICATE OF CORRECTION

PATENT NO. : 11,676,590 B2
APPLICATION NO. : 17/077974
DATED : June 13, 2023
INVENTOR(S) : Lambourne et al.

It is certified that error appears in the above-identified patent and that said Letters Patent is hereby corrected as shown below:

In the Claims

In Column 48, in Claim 12, Line 1, delete "determining," and insert -- (i) determining, --, therefor.

In Column 48, in Claim 12, Line 8, delete "determining" and insert -- (ii) determining --, therefor.

Signed and Sealed this
Eleventh Day of July, 2023

Katherine Kelly Vidal
*Director of the United States Patent and Trademark Office*